US010764765B2

(12) United States Patent
Norita et al.

(10) Patent No.: US 10,764,765 B2
(45) Date of Patent: Sep. 1, 2020

(54) COMMUNICATION SYSTEM, SERVER APPARATUS, BASE STATION APPARATUS AND COMMUNICATION CONTROL METHOD

(71) Applicant: PANASONIC CORPORATION, Osaka (JP)

(72) Inventors: Sojiro Norita, Kanagawa (JP); Noriyuki Shimizu, Kanagawa (JP); Hiroaki Asano, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 117 days.

(21) Appl. No.: 16/130,456

(22) Filed: Sep. 13, 2018

(65) Prior Publication Data
US 2019/0059004 A1 Feb. 21, 2019

Related U.S. Application Data

(63) Continuation of application No. PCT/JP2016/001698, filed on Mar. 23, 2016.

(30) Foreign Application Priority Data

Mar. 14, 2016 (JP) ................................ 2016-050069

(51) Int. Cl.
H04W 16/28 (2009.01)
H04W 84/12 (2009.01)
(Continued)

(52) U.S. Cl.
CPC ........... H04W 16/28 (2013.01); H04W 64/00 (2013.01); H04W 84/12 (2013.01); H04W 4/023 (2013.01); H04W 88/06 (2013.01)

(58) Field of Classification Search
CPC ..... H04W 16/28; H04W 84/12; H04W 4/023; H04W 88/06; H04W 76/14; H04W 76/15; H04W 48/16; H04B 7/0617
See application file for complete search history.

(56) References Cited

U.S. PATENT DOCUMENTS 8,971,817 B2 3/2015 Morioka et al.
2015/0230263 A1 8/2015 Roy et al.
(Continued)

FOREIGN PATENT DOCUMENTS

JP 2014-036317 2/2014
JP 5434137 3/2014
(Continued)

OTHER PUBLICATIONS

Official Communication issued in International WIPO Pat. Appl. No. PCT/JP2016/001698, dated May 10, 2016.

Primary Examiner — Jackie Zuniga Abad
(74) Attorney, Agent, or Firm — Greenblum & Bernstein, P.L.C.

(57) ABSTRACT

In order to quickly establish a communication link between a user terminal and an access point, a communication system comprises: a user terminal; an access point configured to transmit and receive user data to and from the user terminal; a cellular base station assisting wireless communication between the user terminal and the access point; and a control server 4. The user terminal comprises a cellular communicator configured to transmit location information of the user terminal to the control server via the cellular base station. The control server comprises a controller configured to generate communication control information; and a network communicator configured to transmit notification information including the communication control information. The access point comprises a beam controller configured to control a beam pattern used for wireless communication (Continued)

between the access point and the user terminal based on the communication control information.

6 Claims, 43 Drawing Sheets

(51) Int. Cl.
*H04W 64/00* (2009.01)
*H04W 4/02* (2018.01)
*H04W 88/06* (2009.01)

(56) References Cited

U.S. PATENT DOCUMENTS

2016/0227501 A1 8/2016 Shen et al.
2018/0288826 A1* 10/2018 Chiba .................. H04W 76/15

FOREIGN PATENT DOCUMENTS

| JP | 2015-053615 | 3/2015 |
| JP | 2015-527026 | 9/2015 |

* cited by examiner

COMMUNICATION SYSTEM, SERVER APPARATUS, BASE STATION APPARATUS AND COMMUNICATION CONTROL METHOD

CROSS-REFERENCE TO RELATE APPLICATIONS

The present application is a Continuation of International Application No. PCT/JP2016/001698 filed Mar. 23, 2016, which claims priority of Japan Application No. JP 2016-050069 filed Mar. 14, 2016, the disclosures of which are expressly incorporated by reference herein in their entireties.

TECHNICAL FIELD

The present invention relates to a communication system including a terminal apparatus and a base station apparatus configured to communicate with the terminal apparatus, a base station apparatus configured to communicate with a terminal apparatus, and a communication control method for controlling communication between a terminal apparatus and a base station apparatus.

BACKGROUND ART

In recent years, a wireless communication standard WiGig (Registered Trademark) (Wireless Gigabit), which is also known as IEEE802.11ad, was established. WiGig is a standardized technology for implementing wireless LAN using the 60 GHz band, which is included in the millimeter band, to thereby support high-speed data transfer at multi-Gbps speeds. However, since the millimeter band is used, WiGig technology can only provide short transmission ranges and make signals vulnerable to obstacles, which inconveniently limits its use.

In order to solve this problem of millimeter band wireless communication, some known prior art systems include a wireless communicator configured to perform wireless communication in conformity with a first communication method using micro waves, and another wireless communicator configured to perform wireless communication in conformity with a second communication method using millimeter waves, wherein a high speed data communication can be carried out in conformity with the second communication method, and simultaneously with being assisted by transmitting and receiving control signals (beacon signals) in conformity with the first communication method which implements a non-directional communication having no short-range problem. (See Patent Document 1)

PRIOR ART DOCUMENT(S)

Patent Document(s)

Patent Document 1: JP5434137B

SUMMARY OF THE INVENTION

Task to be Accomplished by the Invention

The above prior art teaches a system in which both a user terminal and a base station apparatus (access point) are provided with respective wireless communicators configured to perform non-directional micro wave wireless communication which involves no short-range problem, such that notification information notifying a presence of a user terminal can be transmitted from the user terminal to the base station apparatus. However, this configuration can disadvantageously increase the cost of a base station apparatus because the base station apparatus as well as the user terminal must be equipped with a communicator feature capable of performing micro wave wireless communication.

The present invention has been made in view of such problems of the prior art, and a primary object of the present invention is to provide a communication system, a server apparatus, a base station apparatus, and a communication control method which are configured to enable quick establishment of a communication link between a terminal apparatus and a base station apparatus under an appropriate communication condition without the need to directly transmit notification information notifying a presence of a user terminal from the user terminal to the base station apparatus, thereby reducing communication time.

Means to Accomplish the Task

A communication system of the present invention is configured to include a terminal apparatus and a base station apparatus, the base station being configured to perform wireless communication with the terminal apparatus, and comprises:

a terminal apparatus;

a first base station apparatus configured to perform wireless communication with the terminal apparatus in conformity with a first communication method, the first base station apparatus being configured to transmit and receive user data to and from the terminal apparatus;

a second base station apparatus configured to perform wireless communication with the terminal apparatus in conformity with a second communication method so as to assist wireless communication between the terminal apparatus and the first base station apparatus; and a server apparatus, wherein the terminal apparatus comprises:

a communicator configured to transmit terminal information including location information of the terminal apparatus itself to the server apparatus via the second base station apparatus, wherein the server apparatus comprises:

a controller configured to generate communication control information based on the location information of the terminal apparatus; and a communicator configured to transmit notification information including the communication control information to the first base station apparatus, and wherein the first base station apparatus comprises:

a communication controller configured to control wireless communication between the first base station and the terminal apparatus based on the communication control information.

A server apparatus of the present invention is configured to comprise:

a communicator configured to perform wireless communication with first and second base station apparatuses, wherein the first base station apparatus is configured to perform wireless communication with a terminal apparatus in conformity with a first communication method, and wherein the second base station apparatus is configured to perform wireless communication with the terminal apparatus in conformity with a second communication method; and a controller, wherein the communicator is configured to receive terminal information transmitted from the terminal apparatus via the second base station apparatus, wherein the controller is configured to generate communication control information based on location information of the terminal apparatus, the location information being included in the terminal information, wherein the communicator is configured to transmit notification information including the communication control information to the first base station apparatus, and wherein the first base station apparatus is configured to control wireless communication between the first base station and the terminal apparatus based on the communication control information.

A base station apparatus of the present invention is configured to perform wireless communication with a terminal apparatus, and comprises:

a first communicator configured to transmit and receive data to and from the terminal apparatus;

a second communicator configured to receive notification information transmitted from a server apparatus; and a controller, wherein the second communicator is configured to receive the notification information including communication control information, the communication control information being generated by the server apparatus based on location information of the terminal apparatus, and wherein the controller is configured to control wireless communication between the first base station and the terminal apparatus based on the communication control information.

A communication control method of the present invention is a method for controlling communication between a terminal apparatus and a base station apparatus, the base station apparatus including a first base station apparatus configured to perform wireless communication with the terminal apparatus in conformity with a first communication method, wherein a second base station apparatus is configured to perform wireless communication with the terminal apparatus in conformity with a second communication method which is different from the first communication method, and the method comprising:

the terminal apparatus transmitting terminal information including location information of the terminal apparatus to a server apparatus via the second base station apparatus in conformity with the second communication method;

the server apparatus transmitting notification information including communication control information to the first base station apparatus, the communication control information being generated by the server apparatus based on the location information of the terminal apparatus; and the first base station apparatus controlling wireless communication between the first base station and the terminal apparatus based on the communication control information.

EFFECT OF THE INVENTION

According to the present invention, wireless communication between a terminal apparatus and a first base station apparatus is controlled based on communication control information generated based on location information of the terminal apparatus. This enables quick establishment of a communication link between the terminal apparatus and the base station apparatus under an appropriate communication condition without the need to directly transmit notification information on the presence of the terminal apparatus from the user terminal apparatus to the base station apparatus, thereby reducing communication time.

DESCRIPTION OF THE PREFERRED EMBODIMENT(S)

Figure 1:
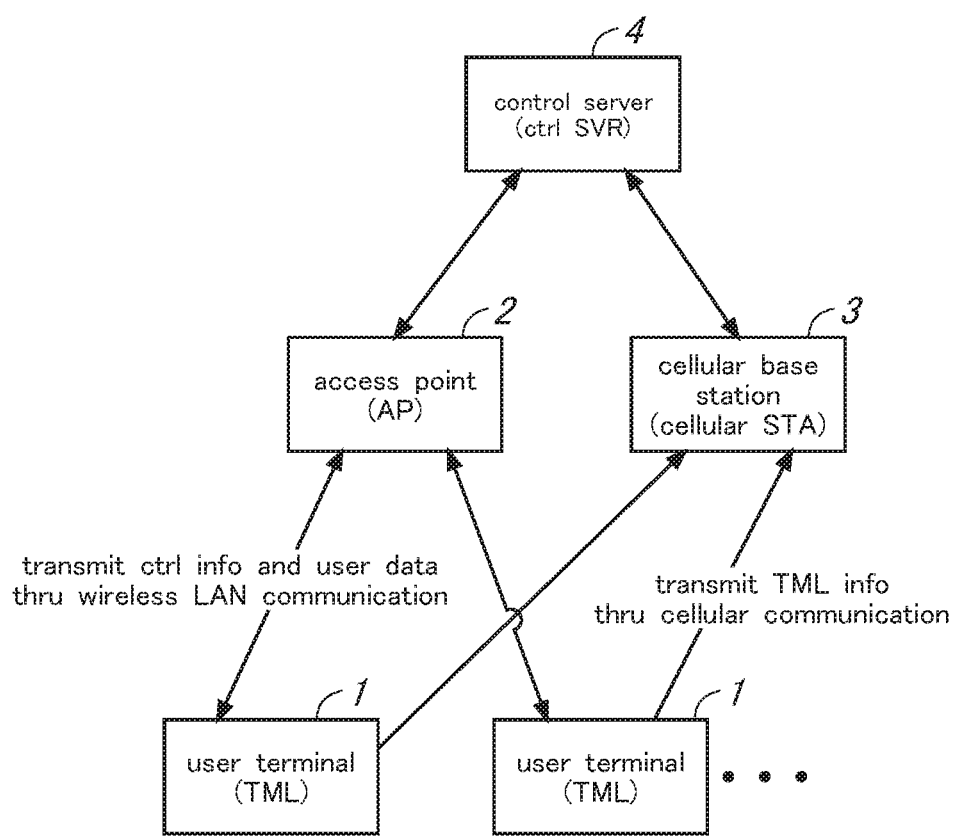
FIG. 1 is a diagram showing a general configuration of a communication system according to a first embodiment of the present invention.

A first aspect of the present invention made to achieve the above-described object thereof is a communication system including a terminal apparatus and a base station apparatus, the base station being configured to perform wireless communication with the terminal apparatus, the communication system comprising:

a terminal apparatus;

a first base station apparatus configured to perform wireless communication with the terminal apparatus in conformity with a first communication method, the first base station apparatus being configured to transmit and receive user data to and from the terminal apparatus;

a second base station apparatus configured to perform wireless communication with the terminal apparatus in conformity with a second communication method so as to assist wireless communication between the terminal apparatus and the first base station apparatus; and a server apparatus, wherein the terminal apparatus comprises:

a communicator configured to transmit terminal information including location information of the terminal apparatus itself to the server apparatus via the second base station apparatus, wherein the server apparatus comprises:

a controller configured to generate communication control information based on the location information of the terminal apparatus; and a communicator configured to transmit notification information including the communication control information to the first base station apparatus, and wherein the first base station apparatus comprises:

a communication controller configured to control wireless communication between the first base station and the terminal apparatus based on the communication control information.

According to the first aspect of the present invention, wireless communication between the terminal apparatus and the first base station apparatus is controlled based on the communication control information generated based on the location information of the terminal apparatus. This enables quick establishment of a communication link between the terminal apparatus and the base station apparatus under an appropriate communication condition without the need to directly transmit notification information on the presence of the terminal apparatus from the user terminal apparatus to the base station apparatus, thereby reducing communication time.

A second aspect of the present invention is a communication system including a terminal apparatus and a base station apparatus, the base station being configured to perform wireless communication with the terminal apparatus, the communication system comprising:

a terminal apparatus;

a first base station apparatus configured to perform wireless communication with the terminal apparatus in conformity with a first communication method, the first base station apparatus being configured to transmit and receive user data to and from the terminal apparatus;

a second base station apparatus configured to perform wireless communication with the terminal apparatus in conformity with a second communication method so as to assist wireless communication between the terminal apparatus and the first base station apparatus; and a server apparatus, wherein the terminal apparatus comprises:

a communicator configured to transmit terminal information including location information of the terminal apparatus itself to the server apparatus via the second base station apparatus, wherein the server apparatus comprises:

a communicator configured to transmit notification information including the location information of the terminal apparatus to the first base station apparatus, and wherein the first base station apparatus comprises:

a controller configured to generate communication control information based on the location information of the terminal apparatus; and a communication controller configured to control wireless communication between the first base station and the terminal apparatus based on the communication control information.

This configuration, as with the first aspect of the present invention, enables quick establishment of a communication link between the terminal apparatus and the base station apparatus under an appropriate communication condition without the need to directly transmit notification information on the presence of the terminal apparatus from the user terminal apparatus to the base station apparatus, thereby reducing communication time.

A third aspect of the present invention is the communication system of the first or second aspect, wherein the controller acquires a distance from the first base station apparatus to the terminal apparatus based on the location information of the terminal apparatus, and wherein, when the distance is not less than a prescribed threshold value, the first base station performs wireless communication with the terminal apparatus using a directional beam pattern, and when the distance is below the prescribed threshold value, the first base station apparatus performs wireless communication with the terminal apparatus using a non-directional beam pattern, and the controller acquires a direction from the first base station apparatus to the terminal apparatus based on the location information and, based on the direction, generate the communication control information in which a beam angle of the directional beam pattern is set.

This configuration eliminates the need for a process to establish a communication link such as one for a negotiation to acquire an optimal beam angle when performing communication using a directional beam pattern.

A fourth aspect of the present invention is the communication system of the first or second aspect, wherein the controller determines, based on the location information of the terminal apparatus, which terminal apparatus is moving out of a coverage area of the first base station apparatus, and generates the communication control information in which the terminal apparatus determined to be moving out of the coverage area is excluded from one or more transmitting targets.

Since, it is useless to transmit control information to a terminal apparatus which is moving out of the coverage area of the first base station apparatus, this configuration enables the first base station apparatus to avoid an unnecessary transmission of control information to such a terminal apparatus by excluding the terminal apparatus from one or more transmitting targets to thereby improve the efficiency of transmission of control information, enabling the reduction of communication time.

A fifth aspect of the present invention is the communication system of the first or second aspect, wherein the controller determines, based on the location information of the terminal apparatus, which terminal apparatus is moving into a coverage area of the first base station apparatus, and generates the communication control information in which the terminal apparatus determined to be moving into the coverage area is added to one or more transmitting targets.

This configuration enables the first base station apparatus to quickly transmit control information to a terminal apparatus which is moving into the coverage area of the first base station apparatus.

A sixth aspect of the present invention is the communication system of the first or second aspect, wherein the controller, based on the location information of the terminal apparatus, acquires a direction to the terminal apparatus from the first base station apparatus, and wherein when directions of two or more terminal apparatuses are closed to each other, the controller determines a beam control condition which allows the first base station to transmit control information to the two or more terminal apparatuses using a single directional beam, and generates the communication control information including the beam control condition.

This configuration enables the first base station apparatus to transmit control information to multiple terminal apparatuses simultaneously, thereby reducing communication time.

A seventh aspect of the present invention is the communication system of the first or second aspect, wherein the server apparatus comprise an information storage, wherein, when the terminal apparatus performs communication with the first base station, the server apparatus associates each piece of the communication control information with a corresponding piece of the location information of the terminal apparatus, and then accumulates the associated pieces of information in the information storage as pieces of historical information, and wherein the controller acquires a piece of the communication control information associated with each piece of the location information from the historical information, the acquired piece of the communication control information being used as current communication control information.

This configuration eliminates the need for a process to establish a communication link such as one for a negotiation to acquire an optimal beam angle when performing communication using a directional beam pattern.

An eighth aspect of the present invention is the communication system of the first or second aspect, wherein the controller determines whether or not the terminal apparatus is moving based on the location information of the terminal apparatus, and wherein, when the number of the terminal apparatuses is more than a prescribed threshold value, the controller generates the communication control information which causes the first base station apparatus to perform transmission to the terminal apparatuses using a directional beam simultaneously with rotating the directional beam.

This configuration eliminates the need for the first base station apparatus to separately perform a negotiation with each terminal apparatus even when multiple terminal apparatuses are moving, which thereby enables reduction of communication time.

A ninth aspect of the present invention is the communication system of the first or second aspect, wherein the server apparatus determines whether or not the terminal apparatus is moving based on the location information of the terminal apparatus, and wherein, when the number of one or more terminal apparatuses is not more than a prescribed threshold value, the server apparatus transmits notification information to the terminal apparatus via the second base station apparatus, the notification information instructing the one or more terminal apparatuses to start a negotiation to acquire a communication condition, and wherein the terminal apparatus starts the negotiation with the first base station apparatus based on the notification information.

This configuration allows the first base station apparatus to start an individual negotiation with each terminal apparatus only when the number of moving terminal apparatuses is small, which reduces total communication time although enabling optimal communication with terminal apparatuses through negotiations.

A tenth aspect of the present invention is an apparatus comprising:

a communicator configured to perform wireless communication with first and second base station apparatuses, wherein the first base station apparatus is configured to perform wireless communication with a terminal apparatus in conformity with a first communication method, and wherein the second base station apparatus is configured to perform wireless communication with the terminal apparatus in conformity with a second communication method; and a controller, wherein the communicator is configured to receive terminal information transmitted from the terminal apparatus via the second base station apparatus, wherein the controller is configured to generate communication control information based on location information of the terminal apparatus, the location information being included in the terminal information, wherein the communicator is configured to transmit notification information including the communication control information to the first base station apparatus, and wherein the first base station apparatus is configured to control wireless communication between the first base station and the terminal apparatus based on the communication control information.

This configuration, as with the first aspect of the present invention, enables quick establishment of a communication link between the terminal apparatus and the base station apparatus under an appropriate communication condition without the need to directly transmit notification information on the presence of the terminal apparatus from the user terminal apparatus to the base station apparatus, thereby reducing communication time.

An eleventh aspect of the present invention is an apparatus comprising:

a communicator configured to perform wireless communication with first and second base station apparatuses, wherein the first base station apparatus is configured to perform wireless communication with a terminal apparatus in conformity with a first communication method, and the second base station apparatus is configured to perform wireless communication with the terminal apparatus in conformity with a second communication method; and a controller, wherein the communicator is configured to receive terminal information transmitted from the terminal apparatus via the second base station apparatus, wherein the communicator is configured to transmit notification information including location information of the terminal apparatus to the first base station apparatus, and wherein the first base station apparatus is configured to generate communication control information based on the location information of the terminal apparatus, and control wireless communication between the first base station apparatus and the terminal apparatus based on the communication control information.

This configuration, as with the first aspect of the present invention, enables quick establishment of a communication link between the terminal apparatus and the base station apparatus under an appropriate communication condition without the need to directly transmit notification information on the presence of the terminal apparatus from the user terminal apparatus to the base station apparatus, thereby reducing communication time.

A twelfth aspect of the present invention is a base station apparatus configured to perform wireless communication with a terminal apparatus, the base station apparatus comprising:

a first communicator configured to transmit and receive data to and from the terminal apparatus;

a second communicator configured to receive notification information transmitted from a server apparatus; and a controller, wherein the second communicator is configured to receive the notification information including communication control information, the communication control information being generated by the server apparatus based on location information of the terminal apparatus, and wherein the controller is configured to control wireless communication between the first base station and the terminal apparatus based on the communication control information.

This configuration, as with the first aspect of the present invention, enables quick establishment of a communication link between the terminal apparatus and the base station apparatus under an appropriate communication condition without the need to directly transmit notification information on the presence of the terminal apparatus from the user terminal apparatus to the base station apparatus, thereby reducing communication time.

A thirteenth aspect of the present invention is a base station apparatus configured to perform wireless communication with a terminal apparatus, the base station apparatus comprising:

a first communicator configured to transmit and receive data to and from the terminal apparatus;

a second communicator configured to receive notification information transmitted from a server apparatus; and a controller, wherein the second communicator is configured to receive the notification information including location information of the terminal apparatus, the location information being acquired by the server apparatus, and wherein the controller is configured to generate communication control information based on the location information of the terminal apparatus, and control wireless communication between the first communicator and the terminal apparatus based on the communication control information.

This configuration, as with the first aspect of the present invention, enables quick establishment of a communication link between the terminal apparatus and the base station apparatus under an appropriate communication condition without the need to directly transmit notification information on the presence of the terminal apparatus from the user terminal apparatus to the base station apparatus, thereby reducing communication time.

A fourteenth aspect of the present invention is a communication control method for controlling communication between a terminal apparatus and a base station apparatus, the base station apparatus including a first base station apparatus configured to perform wireless communication with the terminal apparatus in conformity with a first communication method, wherein a second base station apparatus is configured to perform wireless communication with the terminal apparatus in conformity with a second communication method which is different from the first communication method, the communication control method comprising:

the terminal apparatus transmitting terminal information including location information of the terminal apparatus to a server apparatus via the second base station apparatus in conformity with the second communication method;

the server apparatus transmitting notification information including communication control information to the first base station apparatus, the communication control information being generated by the server apparatus based on the location information of the terminal apparatus; and the first base station apparatus controlling wireless communication between the first base station and the terminal apparatus based on the communication control information.

This configuration, as with the first aspect of the present invention, enables quick establishment of a communication link between the terminal apparatus and the base station apparatus under an appropriate communication condition without the need to directly transmit notification information on the presence of the terminal apparatus from the user terminal apparatus to the base station apparatus, thereby reducing communication time.

A fifteenth aspect of the present invention is a communication control method for controlling communication between a terminal apparatus and a base station apparatus, the base station apparatus including a first base station apparatus configured to perform wireless communication with the terminal apparatus in conformity with a first communication method, wherein a second base station apparatus is configured to perform wireless communication with the terminal apparatus in conformity with a second communication method which is different from the first communication method, the communication control method comprising:

the terminal apparatus transmitting terminal information including location information of the terminal apparatus to a server apparatus via the second base station apparatus in conformity with the second communication method;

the server apparatus transmitting notification information including the location information of the terminal apparatus to the first base station apparatus; and the first base station generating communication control information based on the location information of the terminal apparatus, and controlling wireless communication between the first base station and the terminal apparatus based on the communication control information.

This configuration, as with the first aspect of the present invention, enables quick establishment of a communication link between the terminal apparatus and the base station apparatus under an appropriate communication condition without the need to directly transmit notification information on the presence of the terminal apparatus from the user terminal apparatus to the base station apparatus, thereby reducing communication time.

Embodiments of the present invention will be described in the following with reference to the appended drawings.

First Embodiment

FIG. 1 is a diagram showing a general configuration of a communication system according to a first embodiment of the present invention.

The communication system includes one or more user terminals 1 (terminal apparatuses 1), an access point 2 (first base station apparatus 2), a cellular base station 3 (second base station apparatus 3), and a control server 4 (server apparatus 4).

Examples of user terminals include smartphones, tablet terminals, wearable terminals, personal computers, and a user terminal is required to have a communication function for WiGig communication systems (i.e. for communication in conformity with a first communication method) and a communication function for cellular communication systems (i.e. for communication in conformity with a second communication method). The access point 2 performs WiGig-based communication with a user terminal 1 and transmits and receives user data to and from the user terminal 1. The cellular base station 3 performs cellular-based wireless communication with the user terminal to assist wireless communication between the user terminal 1 and the access point 2. The control server 4 controls wireless communication between the user terminal 1 and the access point 2 to be performed in an efficient manner.

Wireless LAN systems such as WiGig communication systems involve what is called the hidden node problem; that is, packet collisions occurring due to the presence of hidden nodes or terminals. Specifically, the hidden node problem is that a user terminal 1 and a hidden user terminal 1 which is out of a coverage area of the user terminal 1 transmit packets simultaneously to the access point 2, which results in packet collisions occurring in the access point 2.

In the present embodiment, RTS/CTS is used to overcome the hidden node problem. For example, when uploading user data, a user terminal 1 which needs to transmit user data transmits RTS (Request to Send) to the access point 2, and then, in response, the access point 2 transmits CTS (Clear to Send) to the user terminal 1 which has transmitted the RTS, to thereby grant a transmission right to the user terminal 1. Although other user terminals 1 located near the user terminal 1 which has transmitted RTS can also receive the CTS transmitted from the access point, the other user terminals 1 recognize from the terminal ID included in the CTS that they are not granted transmission rights and refrain from transmitting packets during a transmission inhibition period (NAV: Network Allocation Vector) included in the CTS. This scheme avoids packet collisions from occurring in the access point 2.

When user data is downloaded, the access point 2 which needs to transmit the user data transmits RTS to the user terminal 1, and then, in response, the user terminal 1 transmits CTS to the access point 2 which has transmitted the RTS to thereby grant a transmission right to the access point 2.

When a directional beam pattern is used for transmission, the transmission of control information such as RTS/CTS can be controlled such that the information is transmitted only to one or more entities set as transmitting targets. When a non-directional beam pattern (omni pattern) is used for transmission, the transmission of control information can be controlled such that transmission rights are granted only to particular user terminals 1 by adding or deleting terminal IDs to or from a list of terminal IDs to which the transmission rights are granted.

WiGig used in communication between a user terminal and the access point is a technology for implementing wireless LAN standardized as IEEE802.11ad; that is, a standard high-speed wireless communication technology using the 60 GHz band, which allows communication at multi-Gbps speeds, but provides short transmission ranges and makes signals vulnerable to obstacles. Thus, the application of beam forming techniques to a WiGi system effectively extends the transmission range of the system.

Beam forming is a technique used to extend transmission ranges by radiating radio waves in a specific direction; that is, by making a directional beam narrow. When the beam forming technology is used, optimal beam angles are determined on both transmitter and receiver sides, i.e. at a user terminal 1 and the access point 2, through a negotiation, and use the combination of the optimal beam angles on both transmitter and receiver sides to perform communication therebetween.

Figure 2A:
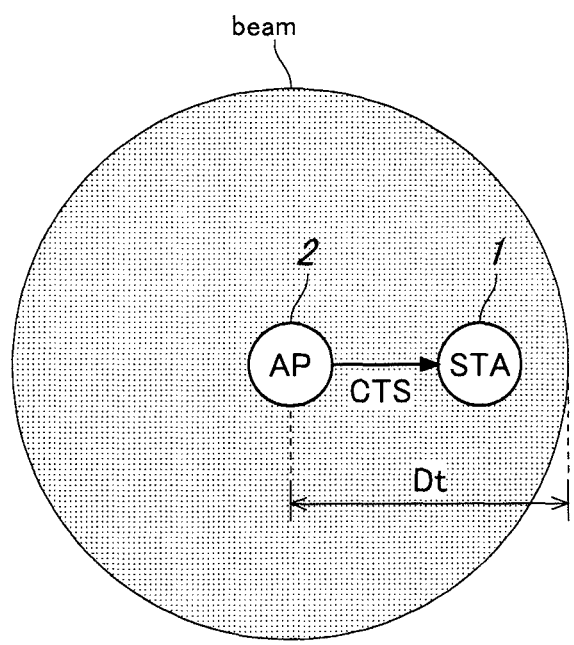
FIGS. 2A and 2B are explanatory diagrams showing how control information is transmitted in the communication system according to the first embodiment of the present invention.
Figure 2B:
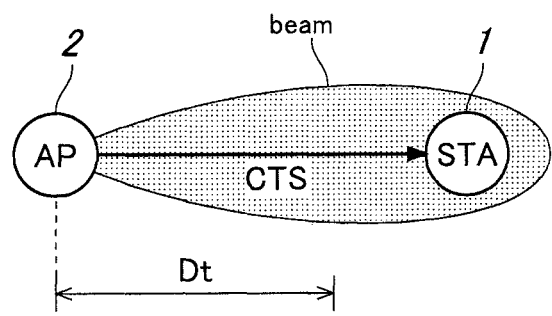

Next, what will be described is how control information is transmitted in the communication system according to the first embodiment of the present invention. FIG. 2 is an explanatory diagram showing how control information is transmitted in the present communication system. Although CTS is used here as an example of control information to explain how control information is transmitted, the description will also apply to the transmission of RTS.

In the present embodiment, the direction of the transmission beam is controlled by the access point 2 according to the distance from the access point 2 to the user terminal 1. That is, when the distance from the access point 2 to the user terminal 1 is less than a prescribed threshold value Dt as shown in FIG. 2A, the control information (CTS) is transmitted by using the non-directional beam pattern (omni pattern), whereas, when the distance from the access point 2 to the user terminal 1 is equal to or greater than the prescribed threshold value Dt, the control information is transmitted using a directional beam pattern. When a directional beam pattern is used for communication, the direction towards the user terminal 1 as viewed from the access point 2 is determined and the beam angle (sector ID) is set based on the determined direction.

In this way, when a directional beam pattern is used for communication in the present embodiment, the direction of a transmission beam is controlled based on location information of the user terminal 1 and that of the access point 2, which eliminates the need for a negotiation in order to determine the optimal beam angle.

However, even when a directional beam pattern is used for communication, a negotiation on beam forming may be performed in order to determine the optimal beam angle to thereby ensure more reliable communication.

Figure 3:
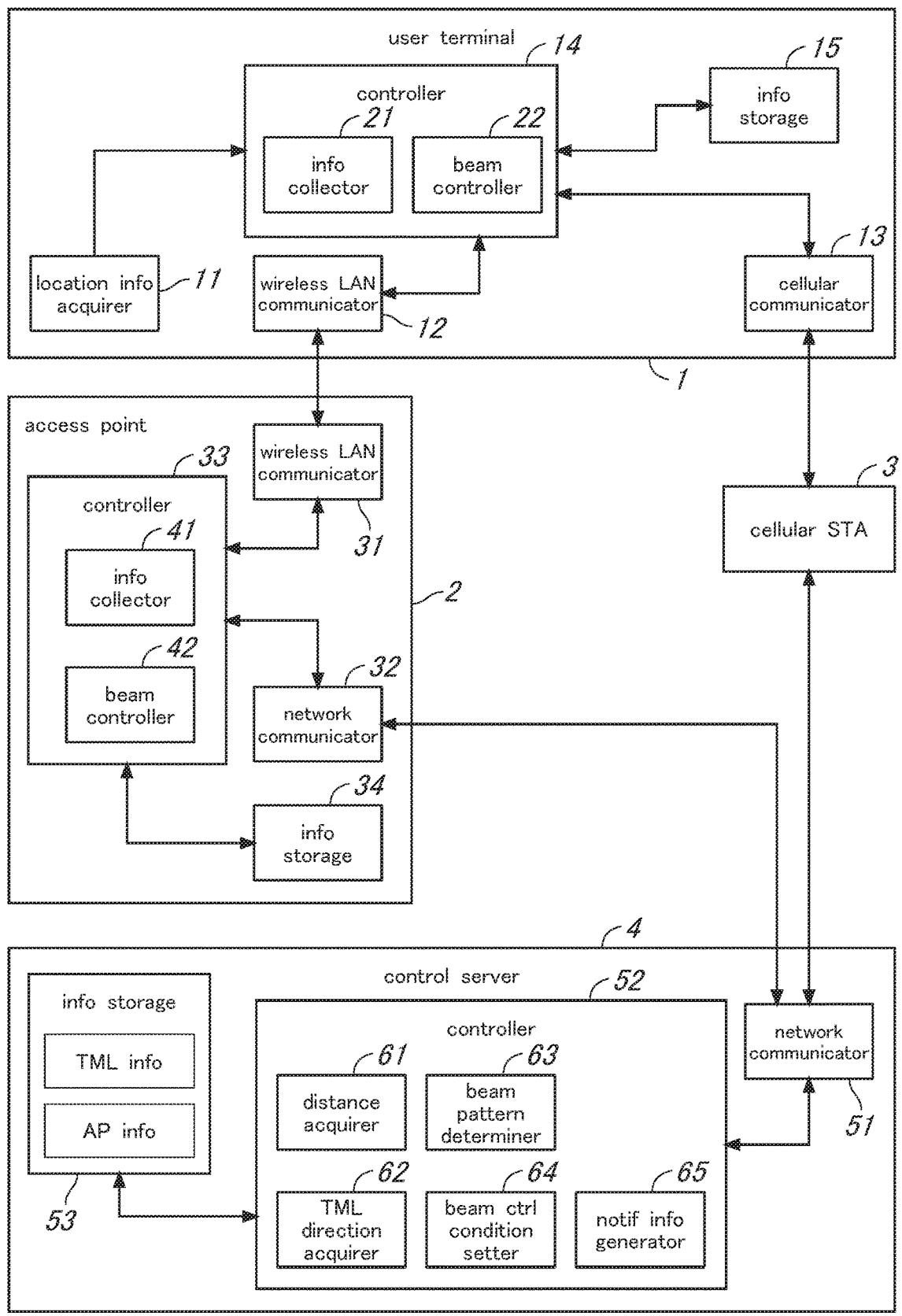
FIG. 3 is a block diagram showing schematic general configurations of a user terminal 1, an access point 2, and a control server 4 according to the first embodiment of the present invention.

Next, schematic general configurations of the user terminal 1, the access point 2, and the control server 4 according to the first embodiment of the present invention will be described. FIG. 3 is a block diagram showing schematic general configurations of the user terminal 1, the access point 2, and the control server 4.

The user terminal 1 includes a location information acquirer 11, a wireless LAN communicator 12, a cellular communicator 13, a controller 14, and an information storage 15.

The location information acquirer 11 acquires information on the user terminal's own location, i.e. location information, by using a satellite positioning system such as GPS (Global Positioning System).

The wireless LAN communicator 12 transmits and receives control information (such as RTS/CTS) and user data to and from the access point 2 using a wireless LAN system, in particular, a WiGig based wireless communication system. The wireless LAN communicator 12 is provided with a smart antenna which is capable of adjusting the direction of a beam. The cellular communicator 13 transmits terminal information, which includes the location information and terminal ID (terminal identification information) of the user terminal, to the cellular base station 3 using a cellular communication system. The cellular base station 3 may be a base station for any other communication system such as a WiFi (Registered Trademark) base station for WiFi communication.

The information storage 15 stores terminal IDs of user terminals and location information of the user terminals acquired by the location information acquirer 11, and one or more programs executed by the controller 14.

The controller 14 includes an information collector 21 and a beam controller 22. The controller 14 is comprised primarily of a processor, and each part of the controller 14 is implemented by causing the processor to execute a programs stored in the information storage 15.

The information collector 21 collects terminal information, which includes the user terminal's location information acquired by the location information acquirer 11 and the terminal ID stored in the information storage 15. The beam controller 22 controls transmitting and receiving beams to and from the smart antenna of the wireless LAN communicator 12.

The access point 2 includes a wireless LAN communicator (first communicator) 31, a network communicator (second communicator) 32, a controller 33, and an information storage 34.

The wireless LAN communicator 31 transmits and receives control information (such as RTS/CTS) and user data to and from the user terminal 1 using a WiGig based wireless communication system. The wireless LAN communicator 31 is provided with a smart antenna capable of adjusting the direction of a beam.

The network communicator 32 transmits access point information, which includes the user terminal's location information, coverage area information on a coverage area of the access point, and an access point ID, to the control server 4. The network communicator 32 receives notification information transmitted from the control server 4.

The information storage 34 stores the access point ID and the coverage area information, and one or more programs executed by the controller 33.

The controller 33 includes an information collector 41 and a beam controller (communication controller) 42. The controller 33 is comprised primarily of a processor, and each part of the controller 33 is implemented by causing the processor to execute a programs stored in the information storage 34.

The information collector 41 collects the access point's location information stored in the information storage 34 as the access point information. The beam controller 42 controls transmitting and receiving beams to and from the smart antenna of the wireless LAN communicator 31 based on beam control information included in the notification information received by the network communicator 32; that is, a beam pattern determination result for determining which of the directional and non-directional beam patterns is to be used, and a beam angle for when the directional beam pattern is used.

The control server 4 includes a network communicator 51, a controller 52, and an information storage 53.

The network communicator 51 receives the terminal information transmitted from the cellular base station 3 and the access point information transmitted from the access point 2. The network communicator 51 transmits notification information generated by the controller 52 to the access point 2.

The information storage 53 stores the terminal information and the access point information received by the network communicator 51, one or more programs executed by the controller 52, and other information.

The controller 52 includes a distance acquirer 61, a terminal direction acquirer 62, a beam pattern determiner 63, a beam controlling condition setter 64, and a notification information generator 65. The controller 52 is comprised primarily of a processor, and each part of the controller 52 is implemented by causing the processor to execute a programs stored in the information storage 53.

The distance acquirer 61 calculates the distance from the access point 2 to the user terminal 1 based on the respective location information of the user terminal 1 and the access point 2. The terminal direction acquirer 62 acquires the direction towards the user terminal 1 as viewed from the access point 2 based on the respective location information of the access point 2 and the user terminal 1.

The beam pattern determiner 63 compares the distance acquired by the distance acquirer 61 with a prescribed threshold value to determine a beam pattern to be used. Specifically, when the distance is equal to or greater than the prescribed threshold value Dt, the beam pattern determination determines that a directional beam pattern is to be used, and when the distance is less than the threshold value Dt, it determines that a non-directional beam pattern (omni pattern) is to be used. When a directional beam pattern is to be used, the beam controlling condition setter 64 sets a beam angle based on the direction towards the user terminal 1 as viewed from the access point 2, which direction has been acquired by the terminal direction acquirer 62.

The notification information generator 65 generates notification information to be transmitted to the access point 2. The notification information includes the terminal ID, the beam pattern determination result for determining which of the directional and non-directional beam patterns is to be used, and beam control information (communication control information) on the beam control condition (beam angle (sector ID)) for when a directional beam pattern is used.

Although a configuration of the cellular base station 3 is not shown in FIG. 3, the cellular base station 3 includes a cellular communicator and a network communicator. The cellular communicator receives the terminal information transmitted from the user terminal 1. The network communicator transmits the terminal information received by the cellular communicator to the control server 4.

Figure 4:
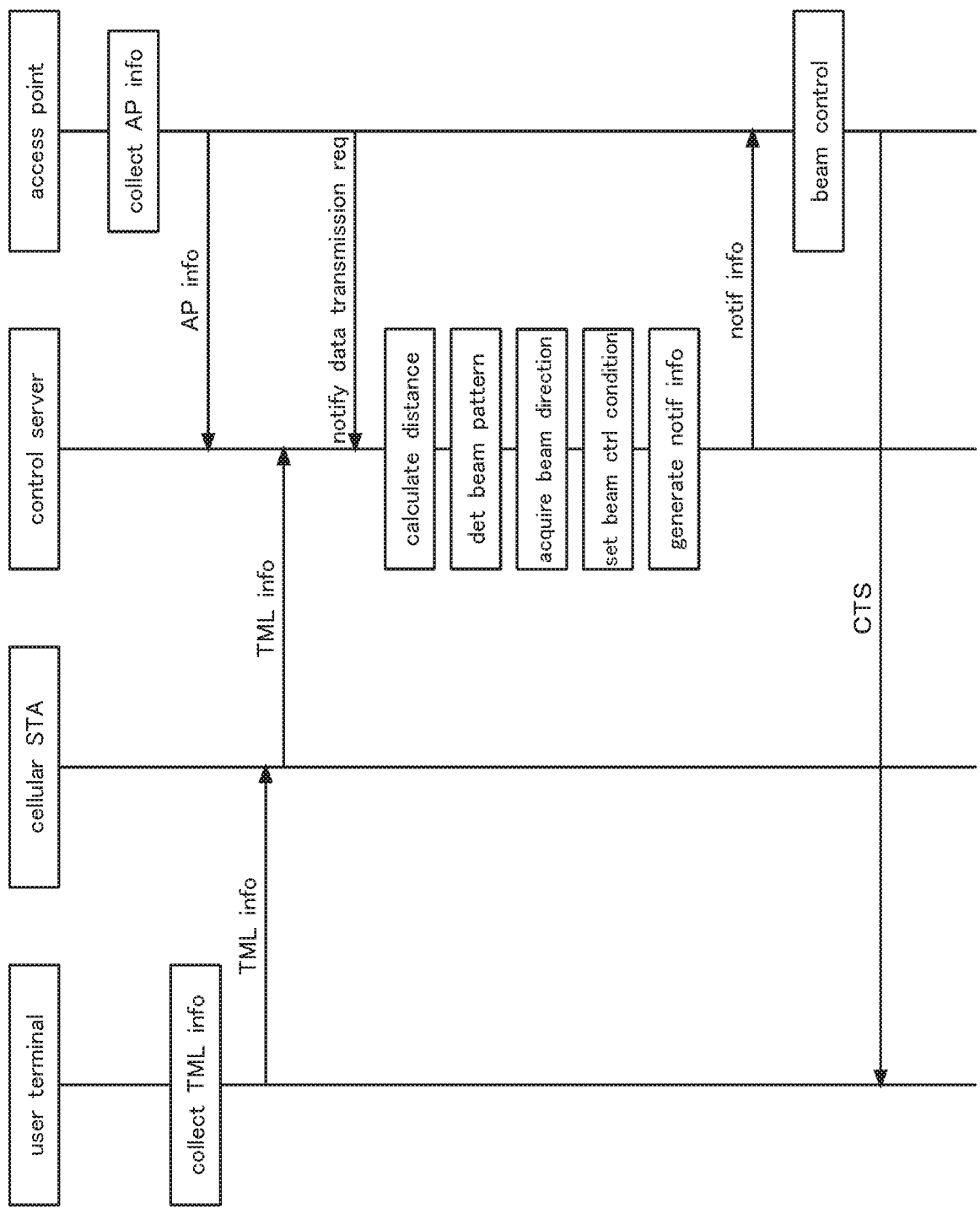
FIG. 4 is a sequence diagram showing processing procedures performed by a user terminal 1, the access point 2, a cellular base station 3, and the control server 4 according to the first embodiment of the present invention.
Figure 5:
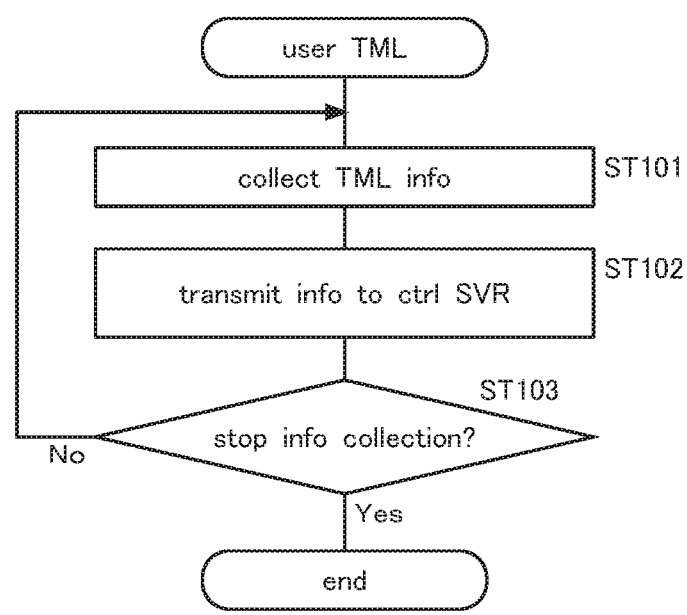
FIG. 5 is a flow diagram showing a processing procedure performed by a user terminal 1 according to the first embodiment of the present invention.
Figure 6:
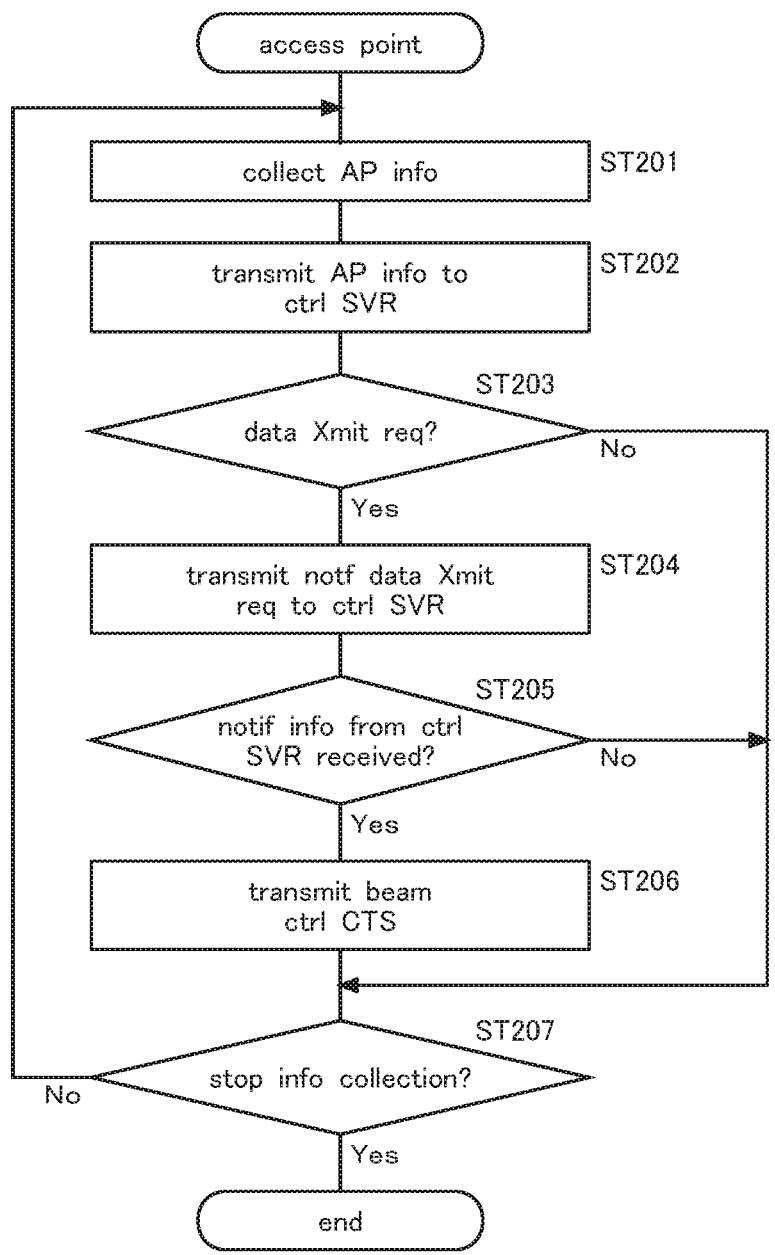
FIG. 6 is a flow diagram showing a processing procedure performed by the access point 2 according to the first embodiment of the present invention.
Figure 7:
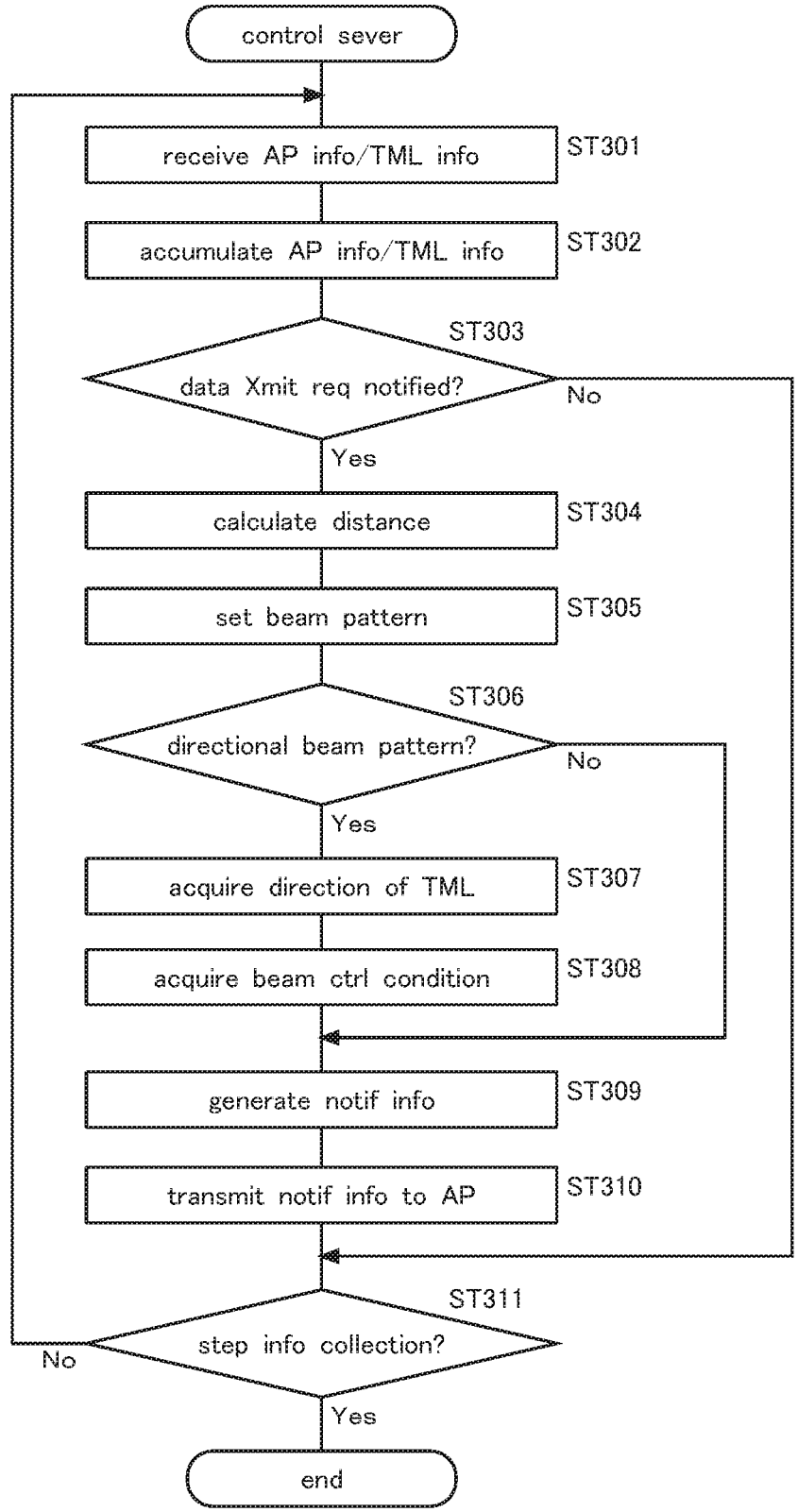
FIG. 7 is a flow diagram showing a processing procedure performed by the control server 4 according to the first embodiment of the present invention.

Next, processing procedures performed by a user terminal 1, the access point 2, the cellular base station 3 and the control server 4 according to the first embodiment of the present invention will be described. FIG. 4 is a sequence diagram showing processing procedures performed by a user terminal 1, the access point 2, a cellular base station 3, and the control server 4 according to the first embodiment of the present invention. FIG. 5 is a flow diagram showing a processing procedure performed by a user terminal 1. FIG. 6 is a flow diagram showing a processing procedure performed by the access point 2. FIG. 7 is a flow diagram showing a processing procedure performed by the control server 4.

In the user terminal 1, the information collector 21 collects the user terminal's terminal information (location information, terminal ID) (ST101 in FIG. 5). Then, the cellular communicator 13 transmits the terminal information to the control server 4 via the cellular base station 3 (ST102 in FIG. 5).

In the access point 2, the information collector 41 collects its own access point information (location information, access point ID) (ST201 in FIG. 6). Then, the network communicator 32 transmits the access point information to the control server 4 (ST202 in FIG. 6). Along with this transmission, the network communicator 32 also transmits the list of nearby access points 2 held by the access point 2 or the location information of the nearby access points 2.

In some embodiments, the user terminal 1 may be configured to periodically transmit the terminal information. In other embodiments, the user terminal 1 may be configured to transmit the terminal information when there is a change in the location information; that is, when the user terminal 1 moves. In this case, the control server 4 can maintain the latest location information by updating the location information therein upon receiving the terminal information. On the other hand, since the access point 2 does not move, the access point 2 may be configured to transmit access point information to the control server 4 at the time of installation or other appropriate times.

In the control server 4, when the network communicator 51 receives the terminal information and the access point information transmitted from the user terminal 1 and the access point 2, respectively (ST301 in FIG. 7), the terminal information and the access point information are stored and accumulated in the information storage 53 (ST302 in FIG. 7).

In the access point 2, the controller 33 determines whether there is a data transmission request (RTS) from the user terminal 1 or a data transmission request from the network (ST203 in FIG. 6), and when there is a data transmission request (Yes at ST203 in FIG. 6), the network communicator 32 transmits a notification notifying the data transmission request to the control server 4 (ST204 in FIG. 6).

In the control server 4, when the network communicator 51 receives a notification information notifying the data transmission request transmitted from the access point 2 (Yes at ST303 in FIG. 7), the distance acquirer 61 acquires the distance from the access point 2 to the user terminal 1 based on the location information of the terminal information and the location information of the access point information (ST304 in FIG. 7). The beam pattern determiner 63 compares the distance acquired by the distance acquirer 61 with a prescribed threshold value to determine which of the directional beam pattern and the non-directional beam pattern (omni pattern) is to be used (ST305 in FIG. 7).

When the directional beam pattern is used for communication (Yes at ST306 in FIG. 7), the terminal direction acquirer 62 acquires the direction towards the user terminal 1 as viewed from the access point 2 (ST307 in FIG. 7). Then, the beam controlling condition setter 64 sets a beam angle (sector ID) based on the direction towards the user terminal 1 as viewed from the access point 2 acquired by the terminal direction acquirer 62 (ST308 in FIG. 7).

When the non-directional beam pattern is used for communication (No at ST306 in FIG. 7), the processing for acquiring a direction towards the terminal (ST307 in FIG. 7) and the processing for setting a beam control condition (ST308 in FIG. 7) are omitted.

Next, the notification information generator 65 generates notification information including the terminal ID, the beam pattern determination result for determining which of the directional and non-directional beam patterns is to be used, and the beam control information on the beam control condition set by beam controlling condition setter 64 (ST309 in FIG. 7). Then, the network communicator 51 transmits the notification information generated by the notification information generator 65 to the access point 2 (ST310 in FIG. 7).

In the access point 2, when the network communicator 32 receives the notification information transmitted from the control server 4 (Yes at ST205 of FIG. 6), the beam controller 42 sets which of the directional or non-directional beam patterns is to be used based on the beam pattern determination result and the beam control information included in the notification information, and the beam controller performs beam control to set the beam angle when the directional beam pattern is used, and then the wireless LAN communicator 31 transmits control information (CTS) to the user terminal 1 (ST206 in FIG. 6).

The above-described processing is repeated until each of the user terminal 1, the access point 2, and the control server 4 stops collecting information (Yes at ST103, ST207, ST311).

Modification of First Embodiment

Figure 8:
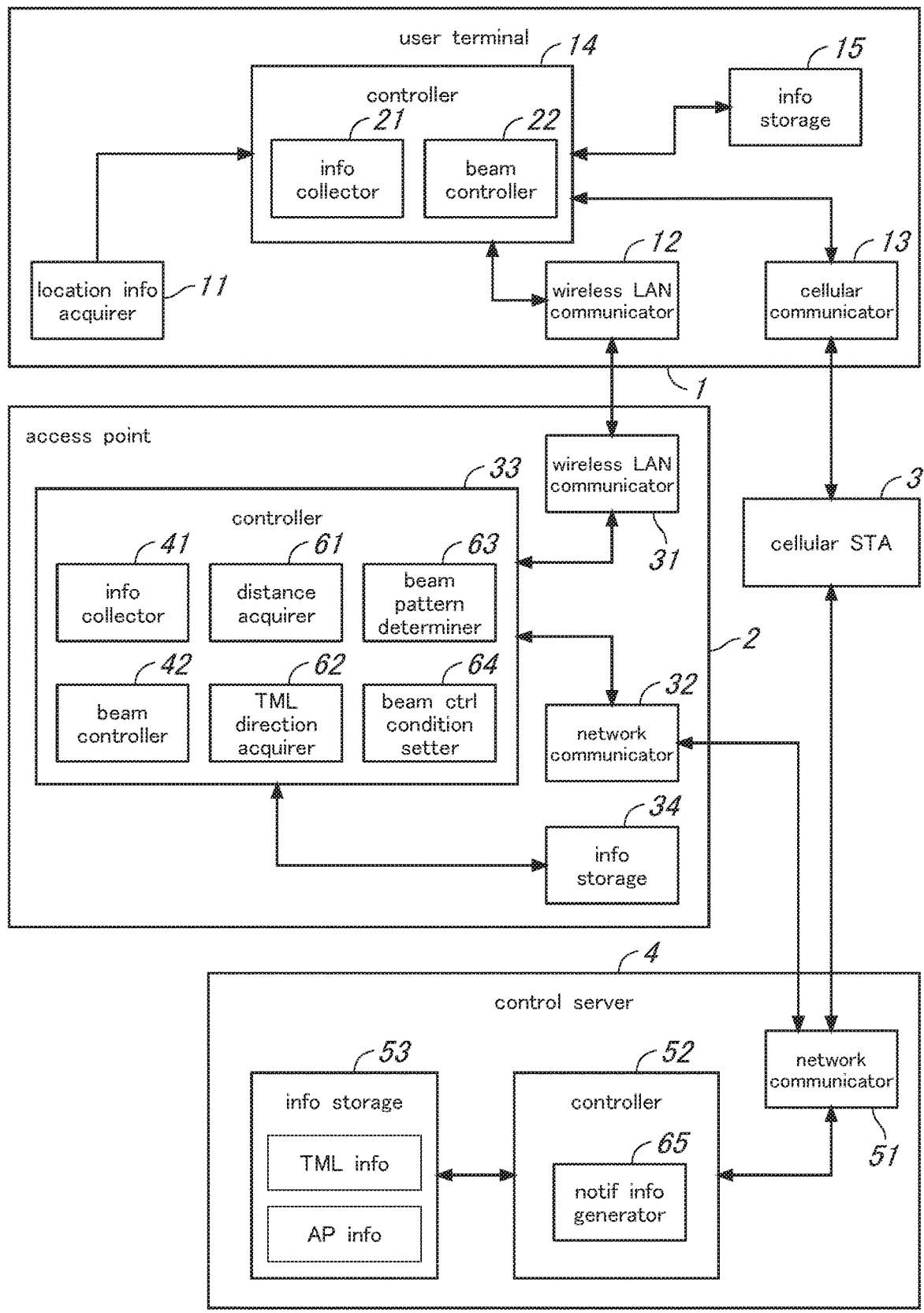
FIG. 8 is a block diagram showing schematic general configurations of a user terminal 1, an access point 2, and a control server 4 according to a modification of the first embodiment of the present invention.

Next, a modification of the first embodiment of the present invention will be described. Except for what will be discussed here, this modification is the same as the above-described embodiment. FIG. 8 is a block diagram showing schematic general configurations of a user terminal 1, an access point 2, and a control server 4 according to the modification of the first embodiment of the present invention.

In the above-described first embodiment of the present invention, the control server 4 is configured to perform each of the distance acquisition processing, beam pattern determination processing, terminal direction acquisition processing, and beam control condition setting processing, and then transmit the results of all these processing, i.e., notification information, to the access point 2. In in this modification of the first embodiment of the present invention, the access point 2 is configured to perform each of the distance acquisition processing, beam pattern determination processing, terminal direction acquisition processing, and beam control condition setting processing.

Thus, in the modification of the first embodiment of the present invention, the access point 2 includes a distance acquirer 61, a terminal direction acquirer 62, a beam pattern determiner 63, and a beam controlling condition setter 64, which are included in the control server 4 in the first embodiment, and in the modification, notification information including location information of the user terminal 1 is transmitted from the control server 4 to the access point 2, which performs each of the distance acquisition processing, beam pattern determination processing, terminal direction acquisition processing, and beam control condition setting processing.

In the modification of the first embodiment, the access point 2 is configured to perform all the processing including the distance acquisition processing, beam pattern determination processing, terminal direction acquisition processing, and beam control condition setting processing. However, in other possible embodiments, the control server 4 performs some of the distance acquisition processing, beam pattern determination processing, terminal direction acquisition processing, and beam control condition setting processing, and the access point 2 performs the other processing.

Second Embodiment

Figure 9:
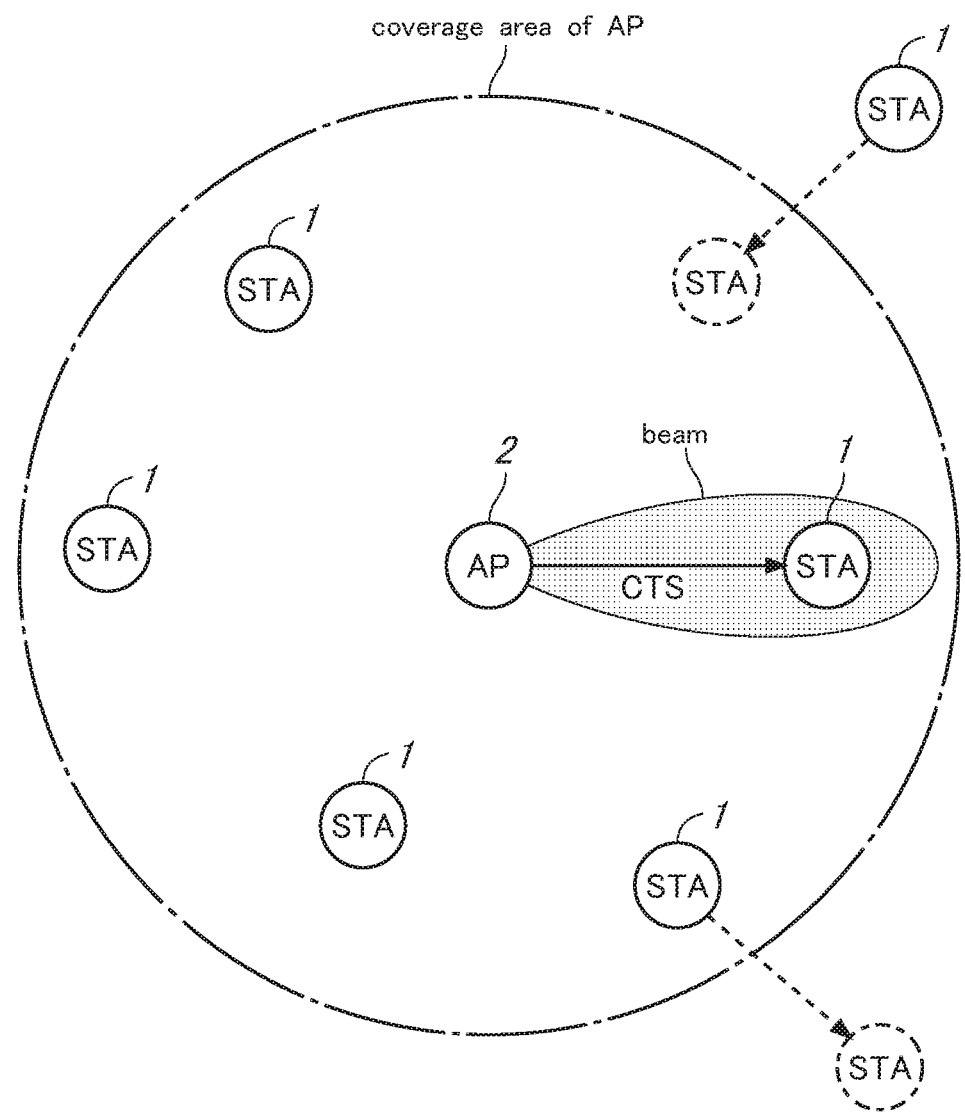
FIG. 9 is an explanatory diagram showing how control information is transmitted in a communication system according to a second embodiment of the present invention.

Next, a second embodiment of the present invention will be described. Except for what will be discussed here, this embodiment is the same as the above-described embodiments. FIG. 9 is an explanatory diagram showing how control information is transmitted in a communication system according to the second embodiment of the present invention. Although CTS is used here as an example of control information to describe how control information is transmitted, the description will also apply to the transmission of RTS.

A user terminal 1 located within a coverage area of an access point 2 may move out of the coverage area, and it is useless to transmit control information (CTS) to a user terminal 1 which is going to move outside the coverage area. Thus, in the present embodiment, when a user terminal 1 which is likely to move out of the coverage area of the access point 2 is found, the user terminal is excluded from one or more transmitting targets so as to prevent control information to be transmitted to the user terminal.

A user terminal 1 located outside the coverage area of the access point 2 may move into the coverage area, and it is desirable to transmit control information to a user terminal 1 that is going to move into the coverage area. Thus, in the present embodiment, when a user terminal 1 which is likely to move into the coverage area of the access point 2 is found, the user terminal is added to one or more transmitting targets so as to cause control information to be transmitted to the user terminal.

Figure 10:
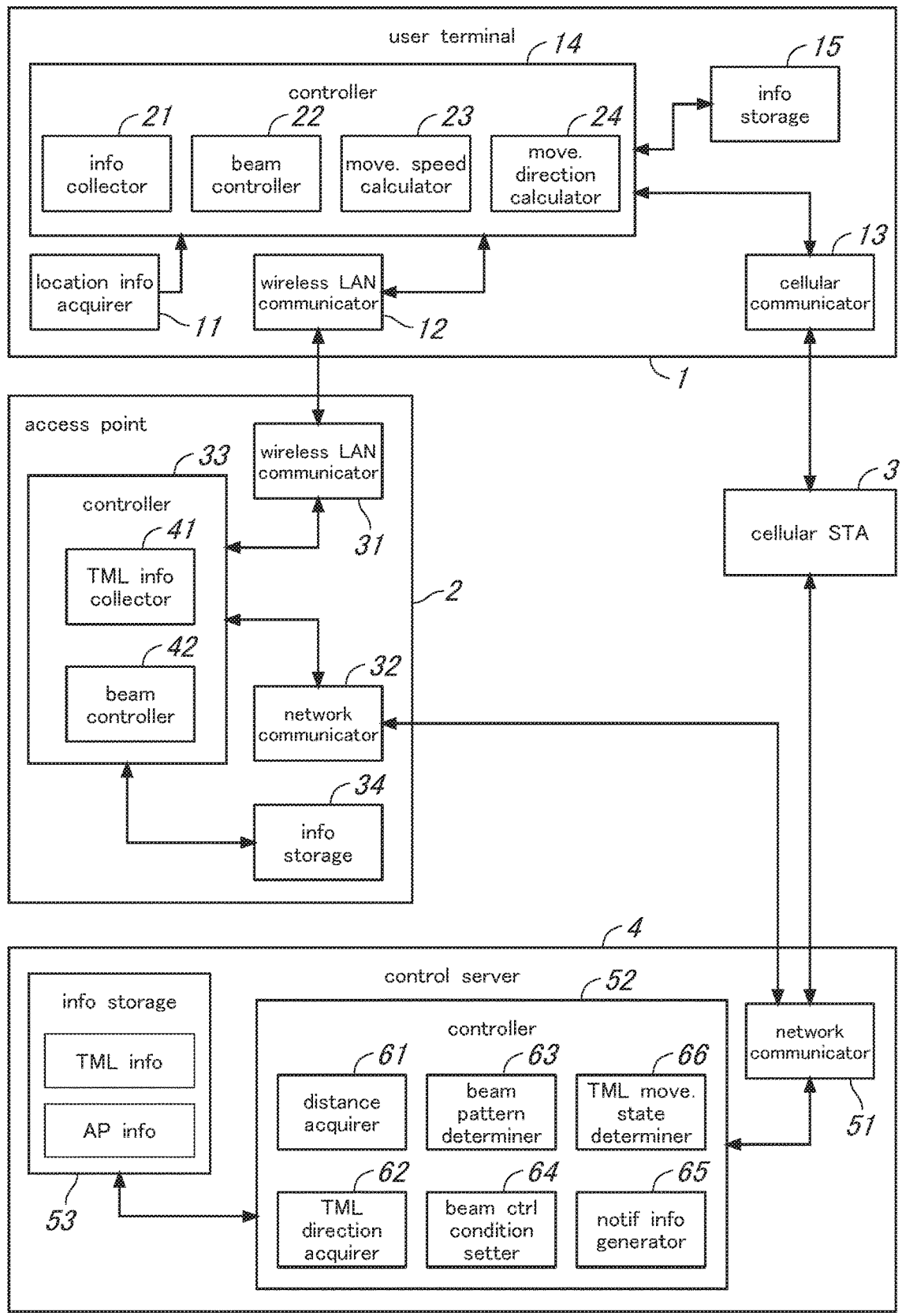
FIG. 10 is a block diagram showing schematic general configurations of a user terminal 1, an access point 2, and a control server 4 according to the second embodiment of the present invention.

Next, schematic general configurations of the user terminal 1, the access point 2, and a control server 4 according to the second embodiment of the present invention will be described. FIG. 10 is a block diagram showing schematic general configurations of the user terminal 1, the access point 2, and the control server 4 according to the second embodiment of the present invention. In the following description, the description of the same parts as in the first embodiment will be omitted as appropriate.

A controller 14 of the user terminal 1 includes a terminal information collector 21 and a beam controller 22, as well as a movement speed calculator 23 and a movement direction calculator 24.

The movement speed calculator 23 calculates the moving speed of the user terminal itself on the basis of the user terminal's current location information and the current time acquired by a location information acquirer 11 as well as past location information and associated time information stored in an information storage 15.

The terminal information collector 21 collects location information acquired by the location information acquirer 11, speed information acquired by the movement speed calculator 23, and direction information acquired by the movement direction calculator 24, as the user terminal's terminal information.

In the access point 2, based on the notification information received by a network communicator 32, a controller 33 of the access point 2 exercises control so as to exclude a user terminal 1 designated by the control server 4 from one or more transmitting targets of the control information (CTS) so that the control information is prevented from being transmitted to the user terminal, and exercises control so as to add a user terminal 1 designated by the control server 4 to the one or more transmitting targets so that the control information is transmitted to the user terminal. In this case, the transmission is performed in a specific direction using a directional beam pattern and not in the direction towards the user terminal 1 excluded from the one or more transmitting targets. When a non-directional beam pattern (omni pattern) is used for transmission, control information (CTS) will be broadcasted. However, in this case, by excluding a terminal ID of an untargeted user terminal from the list of terminal IDs to be granted transmission rights, control information (CTS) can be made so as not to give permission for transmission to the untargeted user terminal.

A controller 52 of the control server 4 includes a distance acquirer 61, a terminal direction acquirer 62, a beam pattern determiner 63, a beam controlling condition setter 64, and a notification information generator 65. In addition, the controller 52 includes a terminal movement state determiner 66.

The terminal movement state determiner 66 determines, based on coverage area information on the coverage area range of an access point 2 and terminal information (information on location, movement speed, and movement direction), whether or not there is a high possibility that a user terminal 1 currently located within the coverage area of the access point 2 will move out of the coverage area, and also determines, based on the coverage area information, whether or not there is a high possibility that a user terminal 1 currently located outside the coverage area of the access point 2 will enter into the coverage area from the outside.

When there is a user terminal 1 that is highly likely to move out of the coverage area of the access point 2, the notification information generator 65, based on the determination result of the terminal movement state determiner 66, generates notification information including the user terminal's terminal ID and information including an instruction to exclude the user terminal from one or more transmitting targets of control information (CTS) so as not to transmit the control information to the user. When there is a user terminal 1 highly likely to enter into the coverage area of the access point 2, the notification information generator 65, based on the determination result, generates notification information including an instruction to add the user terminal to one or more transmitting targets of control information so as to transmit the control information to the user.

Alternatively, instead of excluding or adding a user terminal from or to the transmitting targets, the notification information generator 65 may exclude or add terminal IDs from or to the list of the terminal IDs of user terminals to be granted transmission rights; that is, the notification information generator 65 may exclude the terminal ID of a user terminal 1 which is highly likely to move out of the coverage area from the list of the terminal IDs to be granted transmission rights, or add the terminal ID of a user terminal 1 which is highly likely to enter into the coverage area to the list of the terminal IDs to be granted transmission rights.

Figure 11:
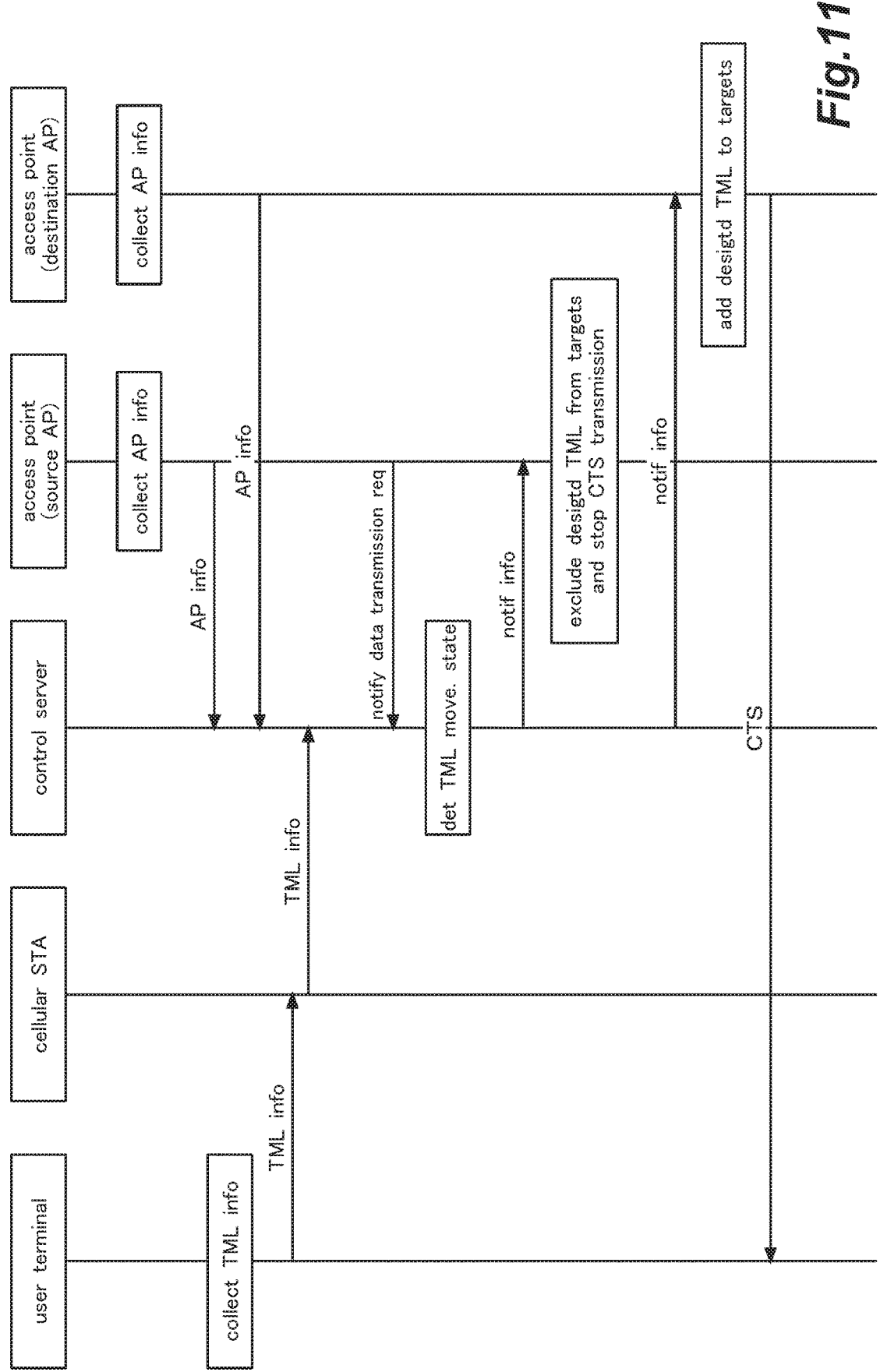
FIG. 11 is a sequence diagram showing processing procedures performed by a user terminal 1, the access point 2, a cellular base station 3, and the control server 4 according to the second embodiment of the present invention.
Figure 12:
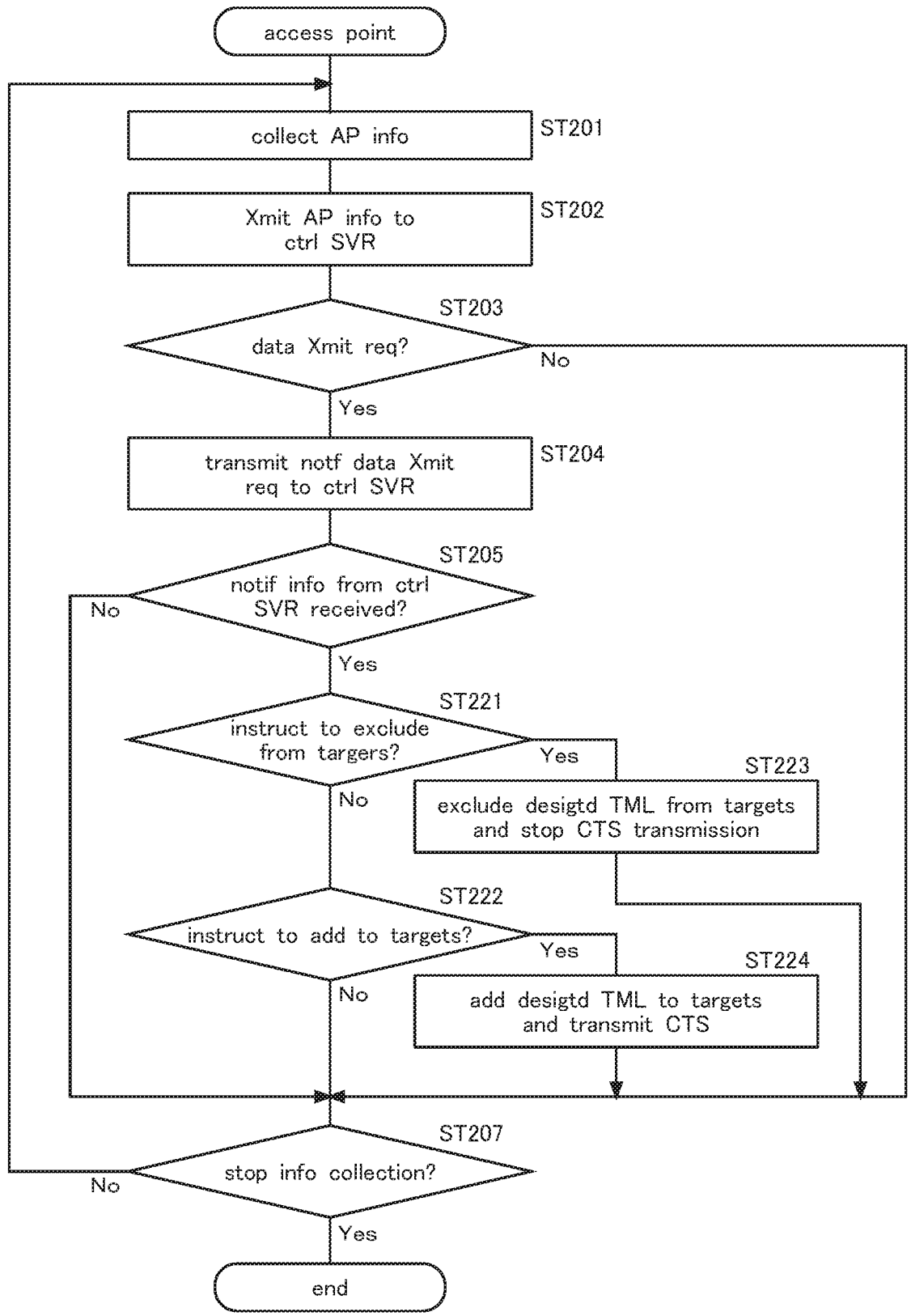
FIG. 12 is a flow diagram showing a processing procedure performed by the access point 2 according to the second embodiment of the present invention.
Figure 13:
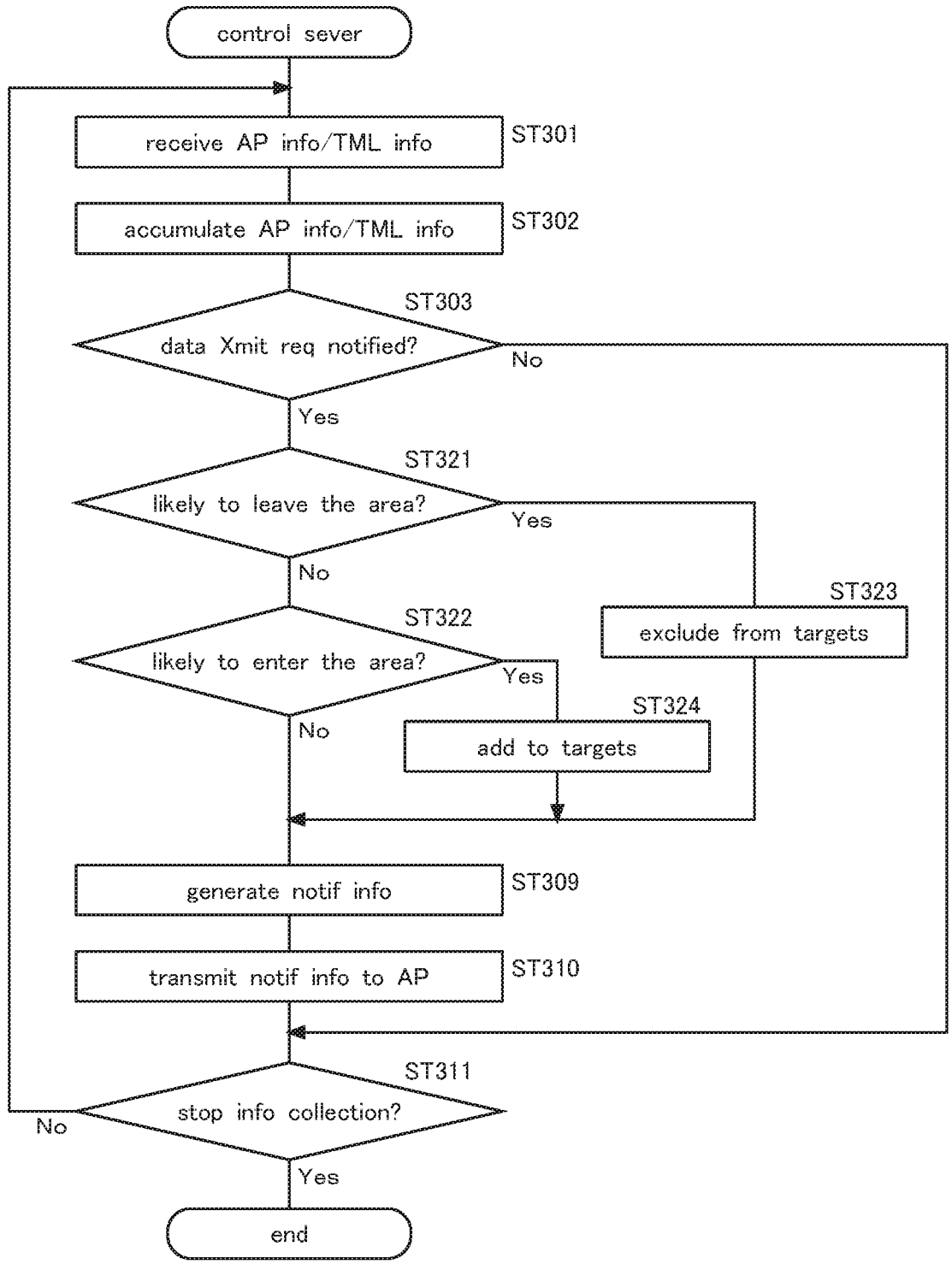
FIG. 13 is a flow diagram showing a processing procedure performed by the control server 4 according to the second embodiment of the present invention.

Next, processing procedures performed by a user terminal 1, the access point 2, the cellular base station 3 and the control server 4 according to the second embodiment of the present invention will be described. FIG. 11 is a sequence diagram showing processing procedures performed by a user terminal 1, the access point 2, the cellular base station 3, and the control server 4 according to the second embodiment of the present invention. FIG. 12 is a flow diagram showing a processing procedure performed by the access point 2. FIG. 13 is a flow diagram showing a processing procedure performed by the control server 4.

With reference to FIG. 11, what will be described here is a case that a user terminal 1 moves out of the coverage area of an access point 2 (Source AP) and moves into the coverage area of another access point 2 (Destination AP) form the outside. The processing procedure performed by a user terminal 1 is the same as in the first embodiment (shown in FIG. 5), and thus a flow diagram showing the procedure is omitted. In the following description, the description of the same procedures as in the first embodiment will be omitted as appropriate.

In the control server 4, when a network communicator 51 receives a notification notifying a data transmission request transmitted from the access point 2 (Yes at ST303 in FIG. 13), the terminal movement state determiner 66 determines whether or not there is a high possibility that a user terminal 1 currently located within the coverage area of the access point 2 moves out of the coverage area (ST321 in FIG. 13), and determines whether or not there is a high possibility that a user terminal 1 currently located outside the coverage area of the access point 2 enters into the coverage area from the outside (ST322 in FIG. 13).

When there is a user terminal 1 that is highly likely to move out the coverage area of the access point 2 (Yes at ST321 in FIG. 13), the user terminal 1 is excluded from the transmitting targets of the control information (CTS) (ST323 in FIG. 13). When there is a user terminal 1 that is highly likely to enter into the coverage area of the access point 2 (Yes at ST322 in FIG. 13), the user terminal 1 is added to the transmitting targets of the control information (CTS) (ST324 in FIG. 13).

Next, based on the determination result of the terminal movement state determiner 66, the notification information generator 65 generates notification information including an instruction to designate the user terminal 1 and exclude it from the transmitting targets of the control information, or an instruction to designate the user terminal 1 and add it to the transmitting targets of the control information (ST309 in FIG. 13). Then, the network communicator 51 transmits the notification information generated by the notification information generator 65 to the access point 2 (ST310 in FIG. 13).

Next, when the access point 2 receives the notification information transmitted from the control server 4 (Yes at ST205 in FIG. 12), the controller 33 determines whether or not the instruction included in the notification information is the exclusion of a user terminal(s) from the transmitting targets (ST221 in FIG. 12), and determines whether the instruction is the addition of a user terminal (s) from the transmitting targets (ST222 in FIG. 12).

When the instruction is the exclusion of a user terminal(s) from the transmitting targets (Yes at ST221 in FIG. 12), the access point excludes the designated user terminal 1 from the transmitting targets to stop transmitting the control information (CTS) to the user terminal 1 (ST233 in FIG. 12). When the instruction is the addition of a user terminal(s) to the transmitting targets (Yes at ST222 in FIG. 12), the access point adds the designated user terminal 1 to the transmitting targets to transmit the control information (CTS) to the user terminal 1 (ST224 in FIG. 12).

In FIG. 12, the processing step (ST206) of the first embodiment shown in FIG. 6 is omitted. However, the processing step is performed to the user terminal 1 which transmits control information. In FIG. 13, the processing steps (ST304 to ST308) of the first embodiment shown in FIG. 7 are omitted. However, these processing steps are performed to the user terminal 1 which transmits control information.

In the present embodiment, based on information on the coverage area of the access point 2 and the terminal information (location, speed, and movement direction) of the user terminal 1, the control server 4 determines a terminal movement state; that is, a possibility that the user terminal 1 moves out of or enters into the coverage area, and then transmits notification information including an instruction to add or exclude the user terminal to and from the transmitting targets to the access point 2. However, in other possible embodiments, the control server 4 may transmit the location information of the user terminal 1 and information on the coverage area of the access point 2 to the access point 2 so that the access point 2 can determine a possibility that the user terminal 1 moves out of or enters into the coverage area.

Third Embodiment

Figure 14:
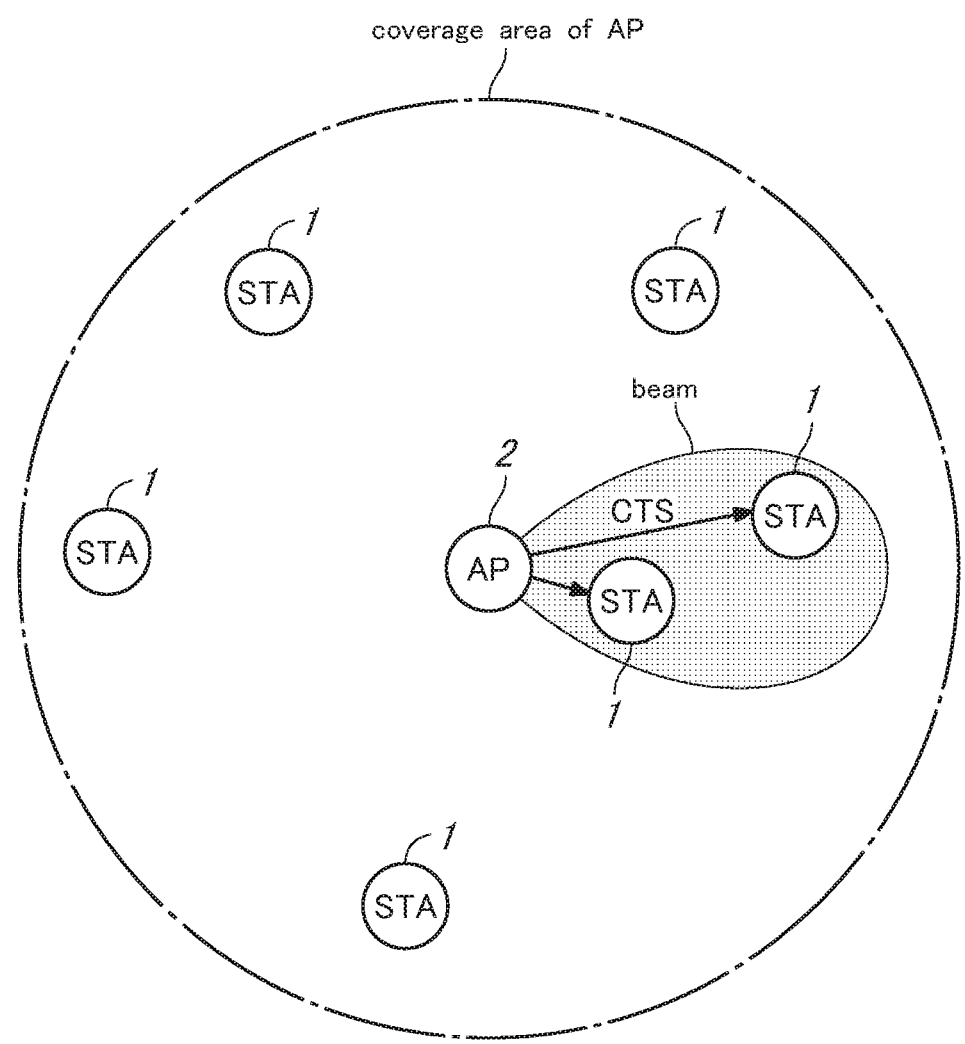
FIG. 14 is an explanatory diagram showing how control information is transmitted in a communication system according to a third embodiment of the present invention.

Next, a third embodiment of the present invention will be described. Except for what will be discussed here, this embodiment is the same as the above-described embodiments. FIG. 14 is an explanatory diagram showing how control information is transmitted in a communication system according to the third embodiment of the present invention. Although CTS is used here as an example of control information to explain how control information is transmitted, the description will also apply to the transmission of RTS.

When the directions towards multiple user terminals 1 as viewed from the access point 2 are close to each other, control information (CTS) can be simultaneously transmitted to the multiple user terminals 1. Thus, in the present embodiment, when the directions towards multiple user terminals 1 as viewed from the access point 2 are close to each other, a beam control condition (beam width, beam angle and transmission power) is determined such that control information can be transmitted simultaneously to the multiple user terminals 1 using a single directional beam, and then the directional beam is controlled based on the determined control condition so that control information can be transmitted accordingly.

In this case, the control information can be transmitted simultaneously to the multiple user terminals 1 as long as the directions towards the multiple user terminals 1 as viewed from the access point 2 are close to each other and the user terminals 1 are located within the reachable range of a single directional beam. The user terminals 1 may be adjacent to or separated from each other. The transmission is controlled such that the transmission power is lowered and the beam width is increased compared to the cases of transmission to a single user terminal 1, whereby the multiple user terminals 1 to be transmitting targets are included within the reachable range of a single directional beam.

Thus, in the present embodiment, control information is allowed to be transmitted simultaneously to multiple user terminals using a single directional beam, which enables the reduction in communication time.

Furthermore, in the present embodiment, the beam pattern (directional or non-directional) can be switched according to the distance from the access point 2 to the user terminal 1. When a directional beam pattern is used for communication, the beam angle is set based on the directions towards the user terminals 1 as viewed from the access point 2. This eliminates the need for a negotiation to determine a beam angle, thereby enabling the reduction in communication time.

However, even when a directional beam pattern is used for communication, a negotiation on beam forming may be performed in order to determine the optimal beam angle (sector ID), thereby enabling more reliable communication. Also, the transmission can be controlled to transmit control information simultaneously to multiple user terminals 1 using a single directional beam without acquiring the location information of the user terminals 1. Specifically, when beam angles (sector IDs) acquired for multiple user terminals 1 by negotiations are adjacent to each other, control information can be transmitted simultaneously to multiple user terminals 1 using a single directional beam by setting a beam angle which is determined by combining these beam angles into one beam angle.

Figure 15:
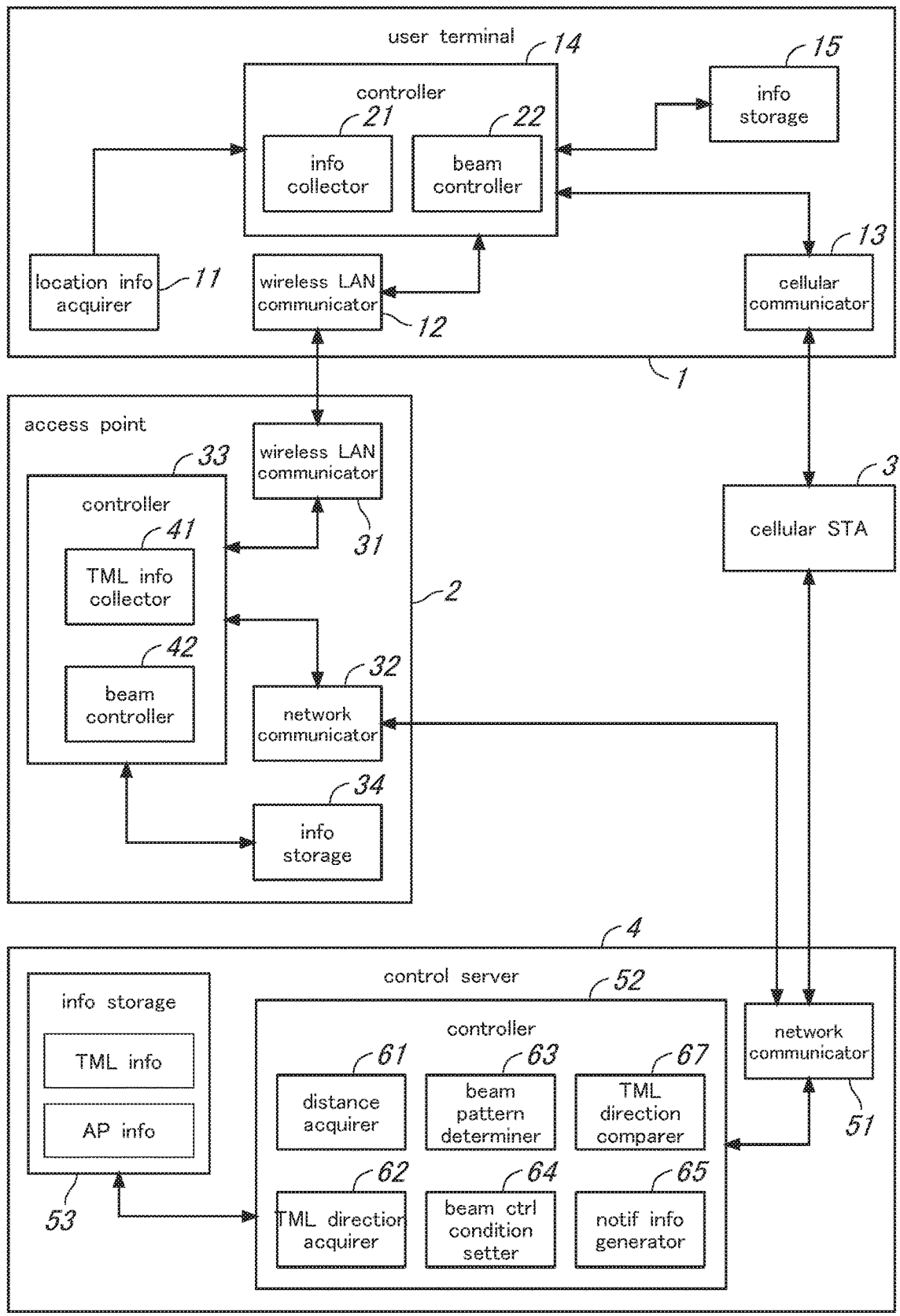
FIG. 15 is a block diagram showing schematic general configurations of a user terminal 1, an access point 2, and a control server 4 according to the third embodiment of the present invention.

Next, schematic general configurations of the user terminal 1, the access point 2, and a control server 4 according to the third embodiment of the present invention will be described. FIG. 15 is a block diagram showing schematic general configurations of the user terminal 1, the access point 2, and the control server 4 according to the third embodiment of the present invention. In the following description, the description of the same parts as in the first embodiment will be omitted as appropriate.

A beam controller 42 of the access point 2 controls the transmission beam based on beam control information (beam width, beam angle and transmission power) included in notification information received by a network communicator 32.

A controller 52 of the control server 4 includes a distance acquirer 61, a terminal direction acquirer 62, a beam pattern determiner 63, a beam controlling condition setter 64, a notification information generator 65. In addition, the controller 52 includes a terminal direction comparer 67.

The terminal direction comparer 67 compares the directions towards the user terminals 1 as viewed from the access point 2 acquired by the terminal direction acquirer 62 with each other to find multiple user terminals 1 located in the directions which are close to each other within a prescribed range determined based on the reachable range of a single directional beam. The beam controlling condition setter 64 acquires beam control information (beam width, beam angle, and transmission power) for a single directional beam which can be transmitted simultaneously to the multiple user terminals 1 which are determined to be located in the directions closed to each other by the terminal direction comparer 67.

The notification information generator 65 generates notification information including terminal IDs and beam control information, which includes a beam pattern determination result for determining which of the directional and non-directional beam patterns is to be used, and beam control conditions (beam width, beam angle and transmission power) for when the directional beam pattern is used.

Figure 16:
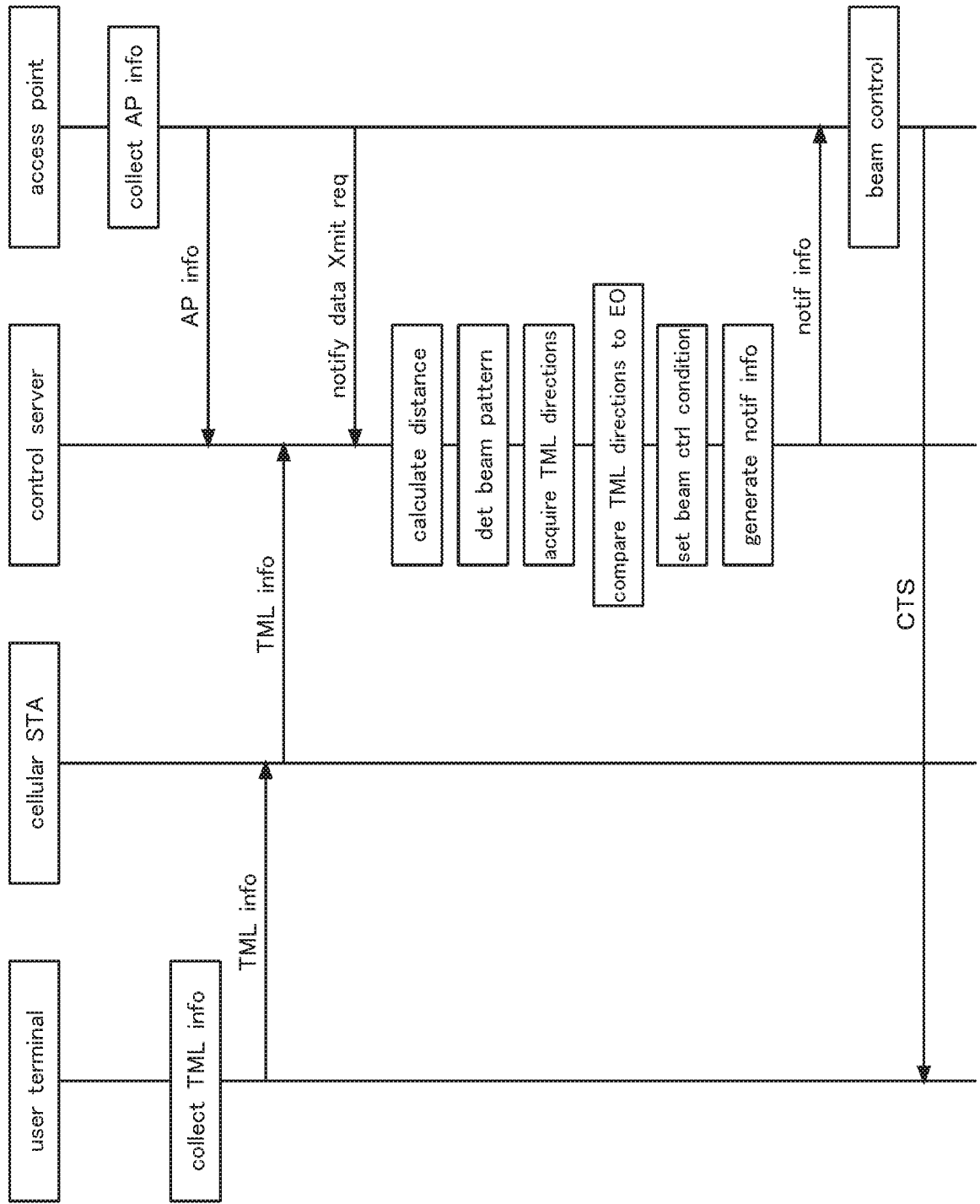
FIG. 16 is a sequence diagram showing processing procedures performed by a user terminal 1, the access point 2, a cellular base station 3, and the control server 4 according to the third embodiment of the present invention.
Figure 17:
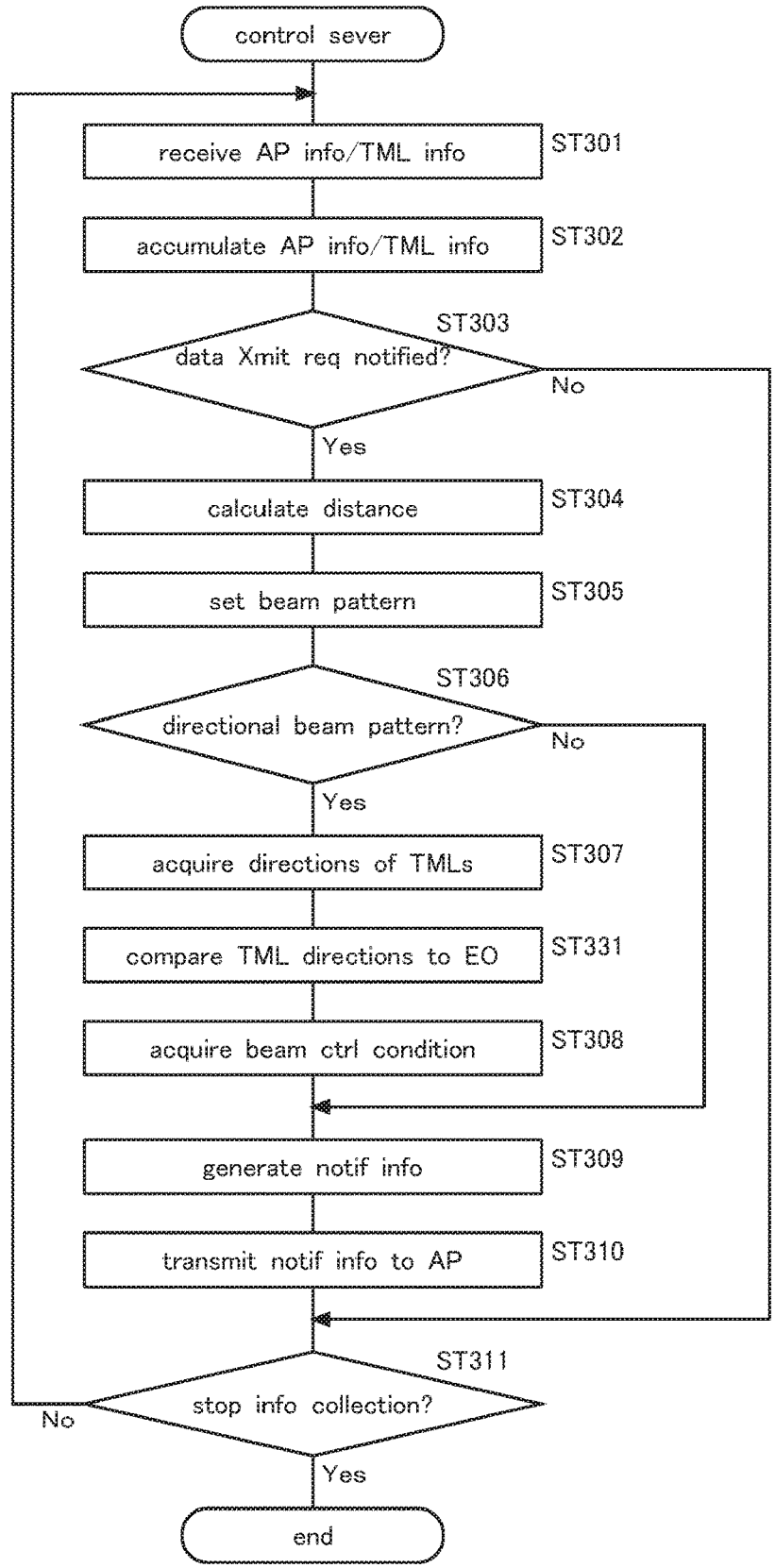
FIG. 17 is a flow diagram showing a processing procedure performed by the control server 4 according to the third embodiment of the present invention.

Next, processing procedures performed by a user terminal 1, the access point 2, the cellular base station 3 and the control server 4 according to the third embodiment of the present invention will be described. FIG. 16 is a sequence diagram showing processing procedures performed by a user terminal 1, the access point 2, the cellular base station 3, and the control server 4 according to the third embodiment of the present invention. FIG. 17 is a flow diagram showing a processing procedure performed by the control server 4.

The processing procedure performed by a user terminal 1 is the same as in the first embodiment (shown in FIG. 5), and thus a flow diagram showing the procedure is omitted. The processing procedure performed by the access point 2 is also the same as in the first embodiment (shown in FIG. 6), and thus a flow diagram showing the procedure is omitted. In the following description, the description of the same procedures as in the first embodiment will be omitted as appropriate.

In the control server 4, when a network communicator 51 receives a notification notifying a data transmission request transmitted from the access point 2 (Yes at ST303 in FIG. 17), the distance acquirer 61 acquires the distance from the access point 2 to a user terminal 1 (ST304 in FIG. 17). Then, the beam pattern determiner 63 compares the distance acquired by the distance acquirer 61 with a prescribed threshold value to determine which of the directional beam pattern and the non-directional beam pattern (omni pattern) is to be used (ST305 in FIG. 17).

When the directional beam pattern is used for communication (Yes at ST306 in FIG. 17), the terminal direction acquirer 62 acquires the directions towards the user terminals 1 as viewed from the access point 2 (ST307 in FIG. 17). Then, the terminal direction comparer 67 compares the directions towards the user terminals 1 as viewed from the access point 2 acquired by the terminal direction acquirer 62 to find multiple user terminals 1 towards which the directions from the access point are close to each other (ST331 in FIG. 17).

The beam controlling condition setter 64 acquires beam control conditions (beam width, beam angle, and transmission power) for a single directional beam which can be transmitted simultaneously to the multiple user terminals 1 towards which the directions from the access point are determined to be closed to each other by the terminal direction comparer 67 (ST308 in FIG. 17).

The notification information generator 65 generates notification information including terminal IDs and beam control information, which includes a beam pattern determination result for determining which of the directional and non-directional beam patterns is to be used, and beam control conditions (beam width, beam angle and transmission power) for when the directional beam pattern is used (ST309 in FIG. 17). The network communicator 51 transmits the notification information generated by the notification information generator 65 to the access point 2 (ST310 in FIG. 17).

In the access point 2, when the network communicator 32 receives the notification information transmitted from the control server 4 (Yes at ST205 of FIG. 6), the beam controller 42 sets which of the directional or non-directional beam patterns is to be used based on the beam pattern determination result and the beam control conditions included in the notification information, and the beam controller performs beam control to set the beam angle when the directional beam pattern is used (ST206 in FIG. 6), and then the wireless LAN communicator 31 transmits control information (CTS) to the user terminal 1 (ST207 in FIG. 6).

In the present embodiment, the control server 4 performs the processing step of terminal direction comparison and other processing steps and transmits the notification information including the beam control information, which is the result of the processing, to the access point 2. However, in other possible embodiments, the access point 2 performs the processing step of terminal direction comparison.

Fourth Embodiment

Figure 18:
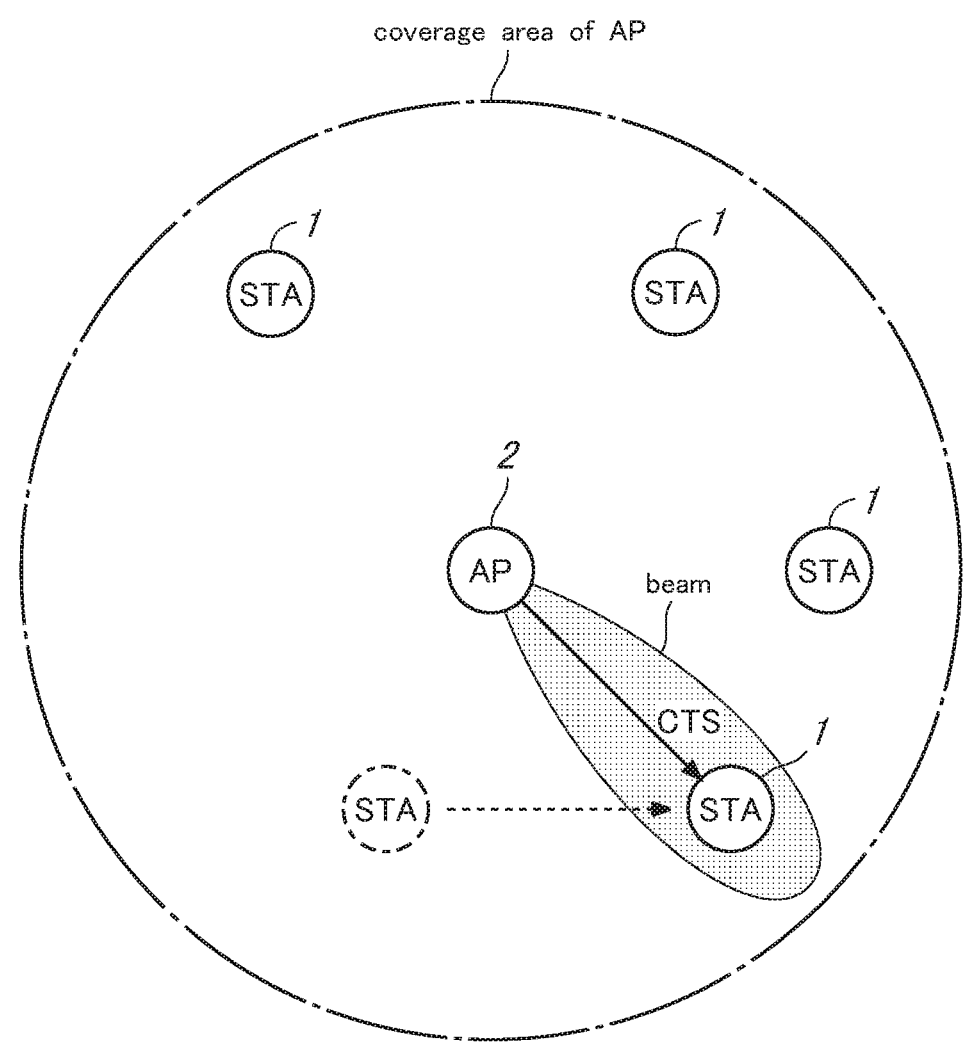
FIG. 18 is an explanatory diagram showing how control information is transmitted in a communication system according to a fourth embodiment of the present invention.

Next, a fourth embodiment of the present invention will be described. Except for what will be discussed here, this embodiment is the same as the above-described embodiments. FIG. 18 is an explanatory diagram showing how control information is transmitted in a communication system according to the fourth embodiment of the present invention. Although CTS is used here as an example of control information to describe how control information is transmitted, the description will also apply to the transmission of RTS.

In cases where communication is performed using a directional beam pattern, when the user terminal 1 moves, it is necessary to acquire beam control conditions in order to perform optimal communication at the destination location of a moving user terminal 1. In the present embodiment, a control server 4 collects from the user terminal 1 terminal information including beam control information used when the user terminal 1 communicated with the access point 2 in the past, and accumulates the collected information in an information storage as historical information. Then, the control server 4 refers to the historical information associated with the location information of the user terminal 1 to acquire appropriate communication conditions associated with the user terminal 1 which is to be a communication partner of the access point 2, and transmits the acquired communication conditions associated with the user terminal 1 to the access point 2. The access point 2 transmits CTS based on the communication conditions. Desirably, the historical information includes information on communication quality when the user terminal 1 communicated with the access point 2 in the past. In this case, it is possible to select a piece of the historical information associated with the best communication quality from multiple pieces of the historical information for locations close to the current terminal locations of the user terminal 1.

In particular, in the present embodiment, terminal information including beam control information (beam pattern, beam angle (sector ID), etc.) is accumulated as historical information. As in the above-described embodiments, when long distance communication is performed using a directional beam pattern, beam control conditions for the user terminal 1 are determined from the location information of the user terminal 1 with reference to the historical information, and control information (CTS) is transmitted by controlling the beam based on the beam control condition. Also, when short distance communication is performed, a non-directional beam pattern (omni pattern) is used, as in the first embodiment. In this case, communication control information may be determined based on the distance obtainable from the location information of the user terminal 1 without referring to the historical information.

Thus, in the present embodiment, for the user terminal 1 which is to be a communication partner of the access point 2, communication control conditions can be determined based on the historical information on the communication control conditions which were stored when one or more other user terminals 1 communicated with the access point 2 in the past. This eliminates the need for a negotiation to acquire appropriate communication control conditions associated with a moving user terminal at a destination location of the user terminal.

Figure 19:
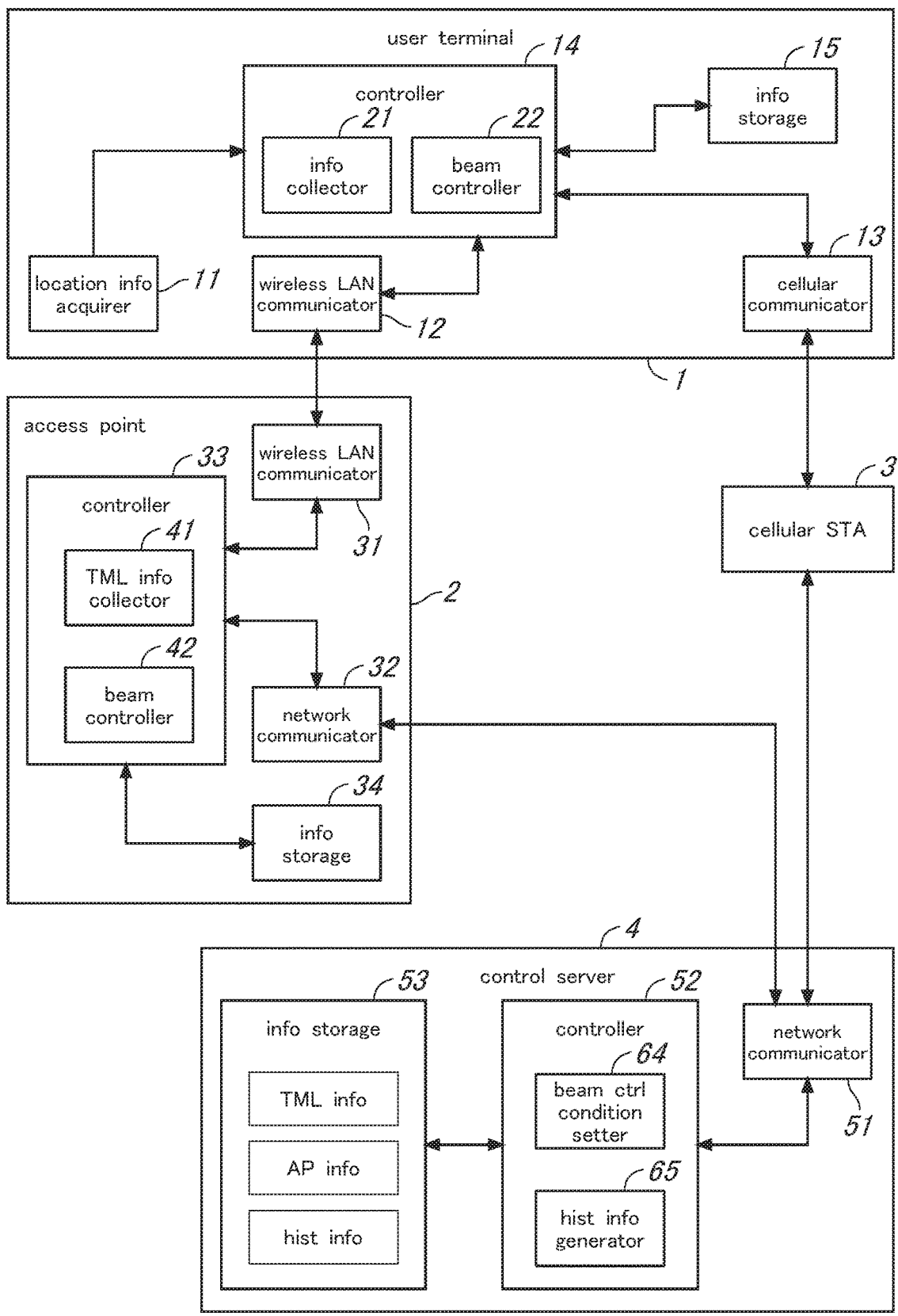
FIG. 19 is a block diagram showing schematic general configurations of a user terminal 1, an access point 2, and a control server 4 according to the fourth embodiment of the present invention.

Next, schematic general configurations of the user terminal 1, the access point 2, and a control server 4 according to the fourth embodiment of the present invention will be described. FIG. 19 is a block diagram showing schematic general configurations of the user terminal 1, the access point 2, and the control server 4 according to the fourth embodiment of the present invention.

The user terminal 1 transmits the terminal information including the user terminal's location information and terminal ID to the control server 4, as in the first embodiment, and in the present invention, the terminal information transmitted by the user terminal further includes beam control information on beam control conditions (beam pattern, beam angle, etc.) acquired when the beam controller 22 performed beam control for communication between the wireless LAN communicator 12 and the access point 2.

In the control server 4, an information storage 53 stores terminal information (terminal ID, location information, beam control information) received by the network communicator 51 as historical information. That is, beam control conditions, which were acquired when one or more user terminals 1 communicated with the access point 2 in the past at respective locations within the coverage area of the access point 2, are stored in such a manner that the stored beam control conditions are associated with the location information of the user terminal 1.

The controller 52 of the control server 4 includes a beam controlling condition setter 64 and a notification information generator 65.

The beam controlling condition setter 64 determines beam control conditions corresponding to the current location of the user terminal 1 based on the current location information of the user terminal 1 and the historical information stored in the information storage 53. That is, from the historical information stored in the information storage 53, the beam controlling condition setter 64 acquires beam control conditions acquired when communication was performed in the past at the current location of a user terminal 1 or at a location close to the current location of the user terminal 1 within a prescribed range. In some embodiments, the historical information also includes information on communication quality acquired when communication was performed between a user terminal 1 and the access point 2 in the past. From historical information for locations close to the current location (location information) of the user terminal 1, the beam controlling condition setter 64 selects a piece of historical information with the best communication quality. From the selected piece of historical information, the beam controlling condition setter 64 acquires beam control conditions.

The notification information generator 65 generates notification information including beam control information on the beam control conditions acquired by the beam controlling condition setter 64.

Figure 20:
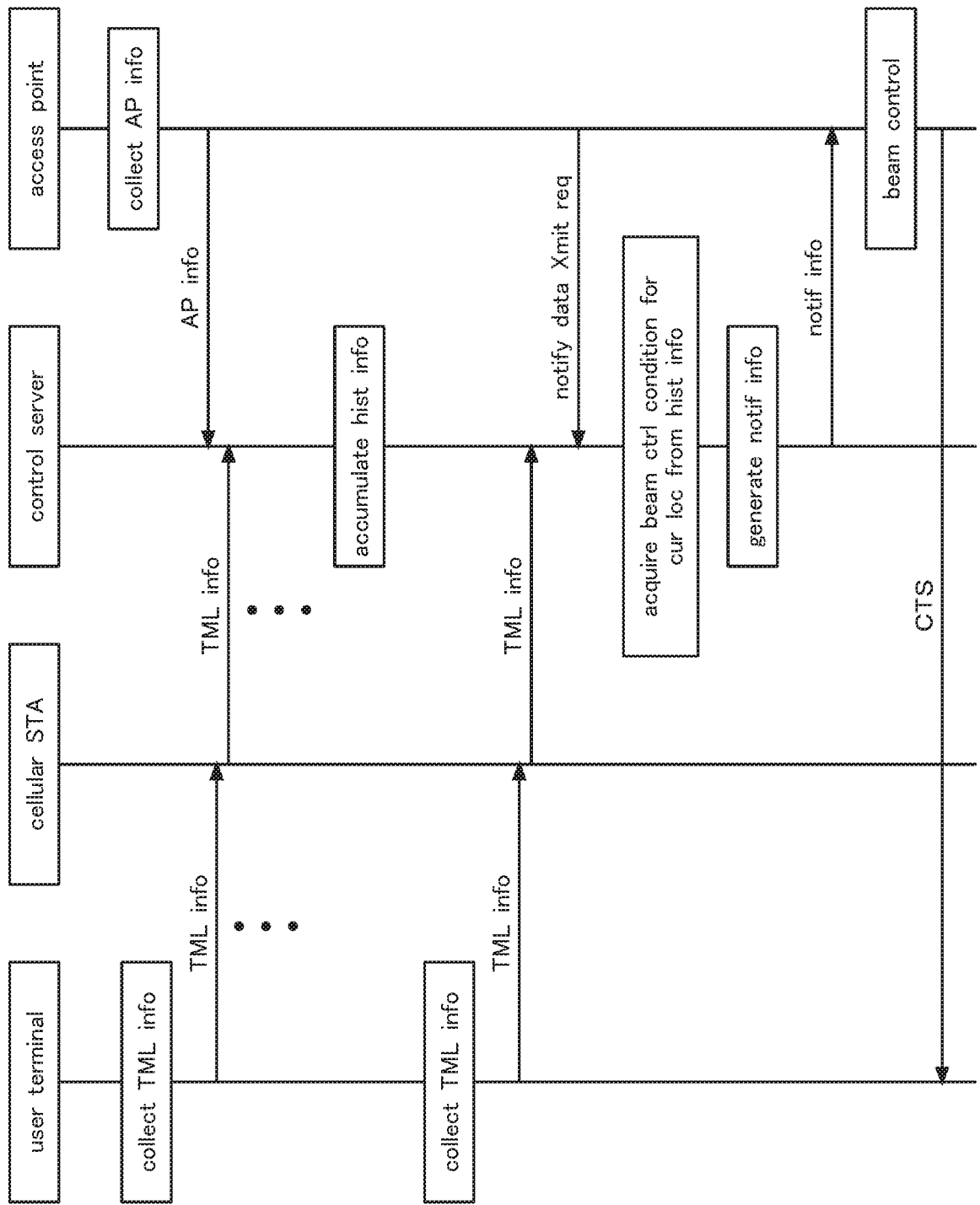
FIG. 20 is a sequence diagram showing processing procedures performed by a user terminal 1, the access point 2, a cellular base station 3, and the control server 4 according to the fourth embodiment of the present invention.
Figure 21:
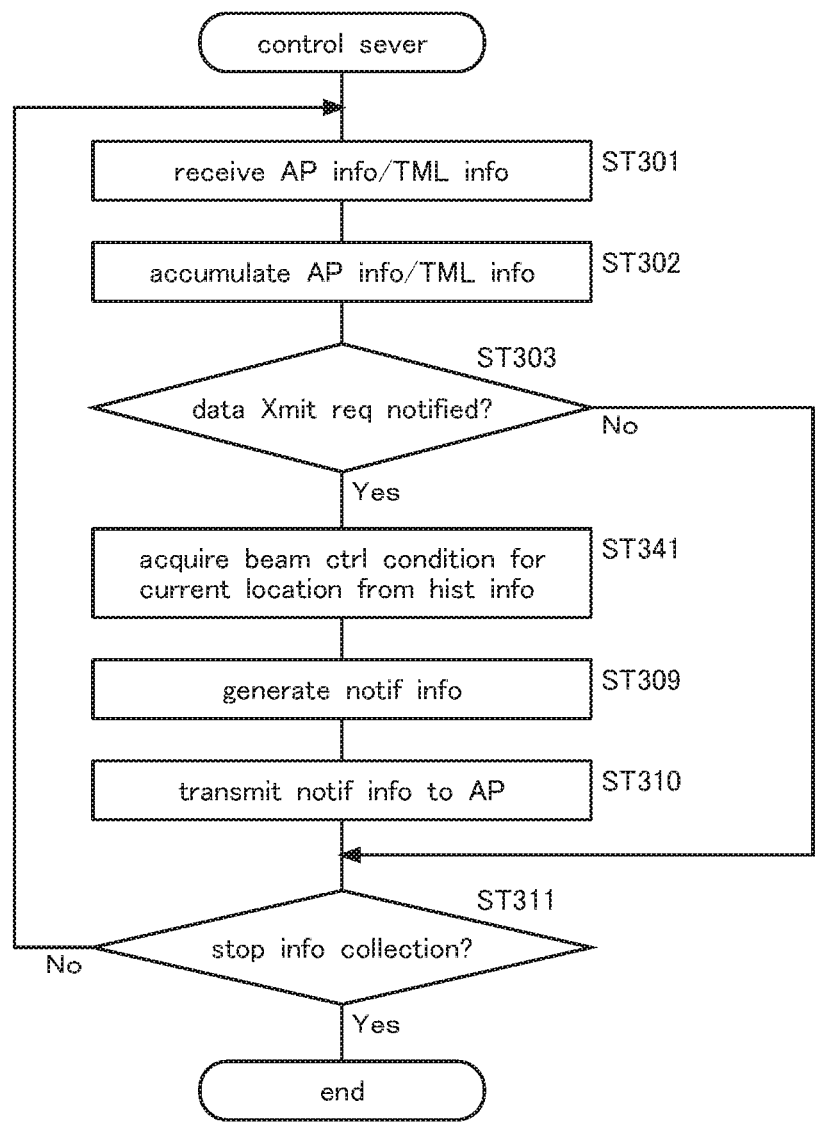
FIG. 21 is a flow diagram showing a processing procedure performed by the control server 4 according to the fourth embodiment of the present invention.

Next, processing procedures performed by a user terminal 1, the access point 2, the cellular base station 3 and the control server 4 according to the fourth embodiment of the present invention will be described. FIG. 20 is a sequence diagram showing processing procedures performed by a user terminal 1, the access point 2, the cellular base station 3, and the control server 4 according to the fourth embodiment of the present invention. FIG. 21 is a flow diagram showing a processing procedure performed by the control server 4.

The processing procedure performed by a user terminal 1 is the same as in the first embodiment (shown in FIG. 5), and thus a flow diagram showing the procedure is omitted. The processing procedures performed by the access point 2 is also the same as in the above-described embodiment (shown in FIG. 6), and thus a flow diagram showing the procedure is omitted. In the following description, the description of the same procedures as in the first embodiment will be omitted as appropriate.

In the control server 4, when a network communicator 51 receives terminal information (terminal ID, location information, beam control information) transmitted from the user terminal 1 via the cellular base station 3 (ST301 in FIG. 21), the information storage 53 stores the terminal information as historical information (ST302 in FIG. 21).

Then, when the network communicator 51 receives a notification notifying a data transmission request transmitted from the access point 2 (Yes at ST303 in FIG. 21), the beam controlling condition setter 64 determines beam control conditions associated with the current location of the user terminal 1 based on the current location of the user terminal and the historical information stored in the information storage 53 (ST341 in FIG. 21).

Next, the notification information generator 65 generates notification information including terminal IDs and beam control information (ST309 in FIG. 21). Then, the network communicator 51 transmits the notification information generated by the notification information generator 65 to the access point 2 (ST310 in FIG. 21).

In the access point 2, when the network communicator 32 receives the notification information transmitted from the control server 4 (Yes at ST205 of FIG. 6), the beam controller 42 sets which of the directional or non-directional beam patterns is to be used based on the beam control information included in the notification information, and the beam controller performs beam control to set the beam angle when the directional beam pattern is used (ST206 in FIG. 6), and the wireless LAN communicator 31 transmits control information (CTS) to the user terminal 1 (ST207 in FIG. 6).

In the present embodiment, the beam control information acquired when communication was performed between the user terminal 1 and the access point 2 in the past is transmitted from the user terminal 1 to the control server 4 and the beam control information is accumulated in the control server 4 as historical information. However, in other possible embodiments, the beam control information stored in the control server 4 may include optimal beam control conditions as well as other appropriate beam control conditions.

Specifically, although, in most cases, optimal beam control conditions are acquired by a negotiation on beam forming and communication is performed according to the acquired optimal beam control conditions. However, in the present embodiment, appropriate beam control conditions other than the optimal beam control conditions (for example, the second and third most appropriate beam control conditions) are acquired by negotiations, and the control server 4 is configured to manage beam control information based on sets of the beam control conditions with their respective priority orders.

In this case, when the transmission of the control information (CTS) fails by using the beam control conditions with the highest priority order, it is possible to transmit the control information by using the beam control conditions with the next priority order, which ensures the reliable transmission of control conditions.

Fifth Embodiment

Figure 22:
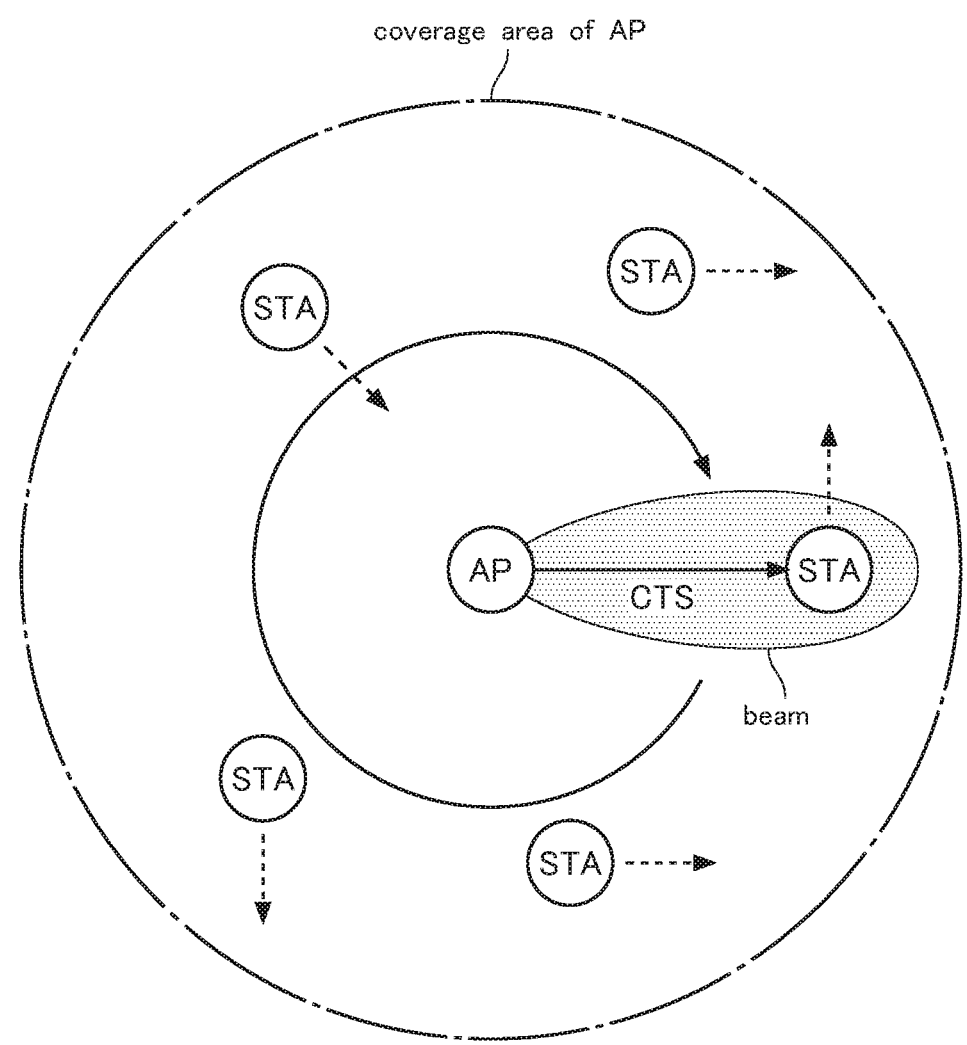
FIG. 22 is an explanatory diagram showing how control information is transmitted in a communication system according to a fifth embodiment of the present invention.

Next, a fifth embodiment of the present invention will be described. Except for what will be discussed here, this embodiment is the same as the above-described embodiments. FIG. 22 is an explanatory diagram showing how control information is transmitted in a communication system according to the fifth embodiment of the present invention. Although CTS is used here as an example of control information to explain how control information is transmitted, the description will also apply to the transmission of RTS.

In cases where communication is performed using a directional beam pattern, when the user terminals 1 moves, it is necessary to perform a negotiation on beam forming between the user terminal and the access point 2 in order to acquire the optimal beam control conditions for the destination location of the moving user terminal. In such cases, when a number of user terminals 1 are moving, it can be time consuming to perform a negotiation separately with a user terminal. Thus, in the present embodiment, control information (CTS) is transmitted with a directional beam which is being rotated.

This rotating beam type control, in which control information is transmitted with a directional beam which is being rotated, effectively reduces communication time when a lot of user terminals 1 are moving within the coverage area of the access point 2. In the present embodiment, the rotating beam type control is used when the number of the user terminals moving within the coverage area is more than a prescribed threshold value.

The threshold value may be a prescribed fixed value, or the threshold value may be defined as the ratio of the number of moving user terminals 1 to the total number of the user terminals 1. For example, the condition for performing rotating beam type control may be based on three states; that is, when only one user terminal 1 is moving, when a majority of user terminals 1 are moving, and when all the user terminals 1 are moving. In this case, when no user terminal is moving, control information may be individually transmitted to a user terminal 1 using a corresponding direction of the directional beam.

Figure 23:
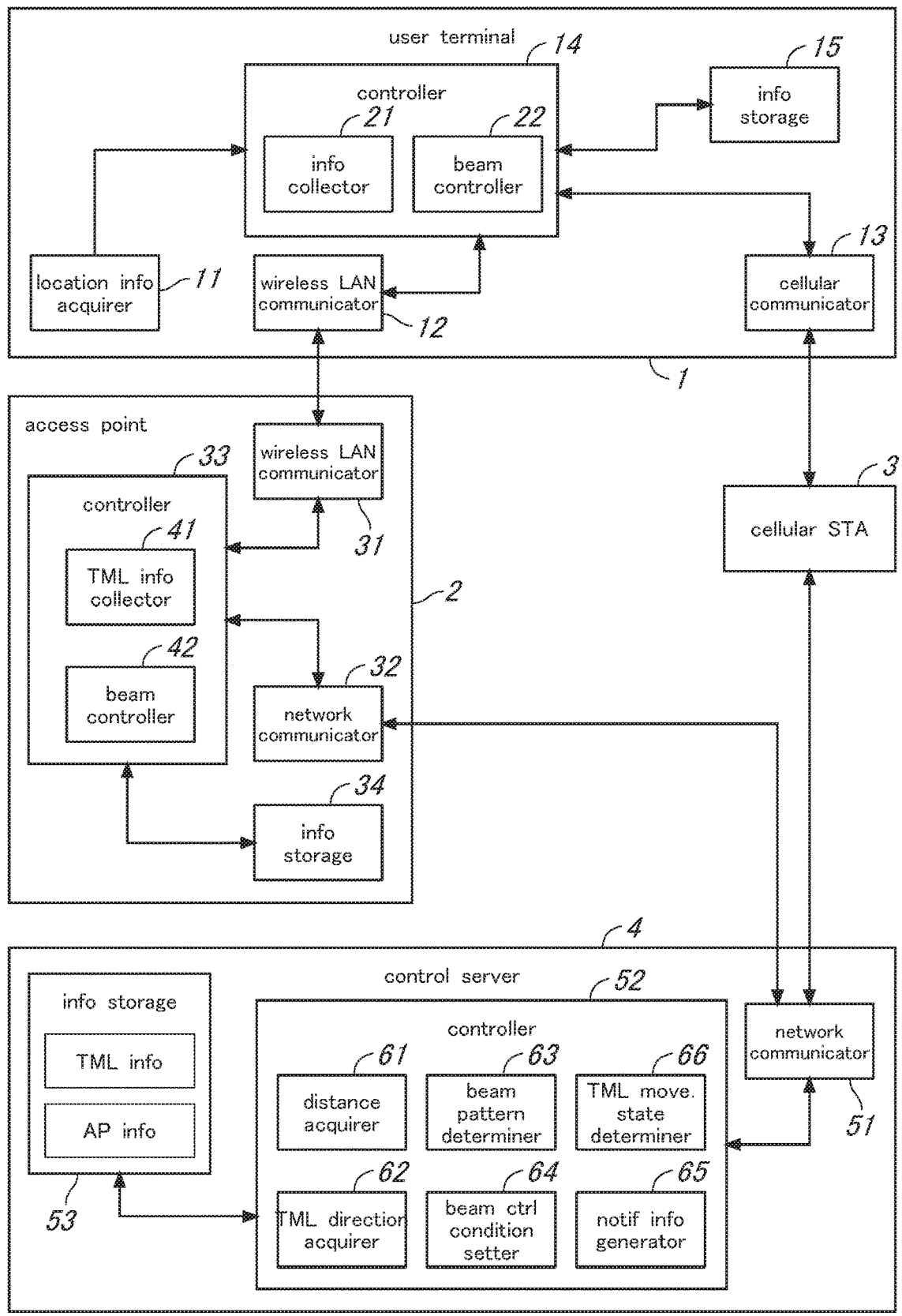
FIG. 23 is a block diagram showing schematic general configurations of a user terminal 1, an access point 2, and a control server 4 according to the fifth embodiment of the present invention.

Next, schematic general configurations of the user terminal 1, the access point 2, and a control server 4 according to the fifth embodiment of the present invention will be described. FIG. 23 is a block diagram showing schematic general configurations of the user terminal 1, the access point 2, and the control server 4 according to the fifth embodiment of the present invention. In the following description, the description of the same parts as in the first embodiment will be omitted as appropriate.

The beam controller 42 of the access point 2 performs beam control based on beam control information (such as the presence or absence of the rotating beam type control) included in the notification information received by the network communicator 32. When the rotating beam type control is instructed to be used in the beam control information, the rotating beam type control is performed in which the control information is transmitted with a directional beam which is being rotated.

The controller of the control server 4 includes a terminal movement state determiner 66. The terminal movement state determiner 66 determines whether or not each user terminal 1 is moving based on the location information of the user terminal 1, compares the value associated with moving user terminals 1 (the number of moving use terminals or its ratio to the total number) with a prescribed threshold value, and determines whether or not to perform the rotating beam type control in which control information is transmitted with a directive beam which is being rotated.

The notification information generator 65 generates notification information including information on whether or not the rotating beam type control is performed. The notification information on the user terminal 1 for which the rotating beam type control is not performed includes, as in the first embodiment, the terminal ID, the beam pattern determination result for determining which of the directional and non-directional beam patterns is to be used, and beam control information on the beam control condition (beam angle (sector ID)) for when a directional beam pattern is used.

Figure 24:
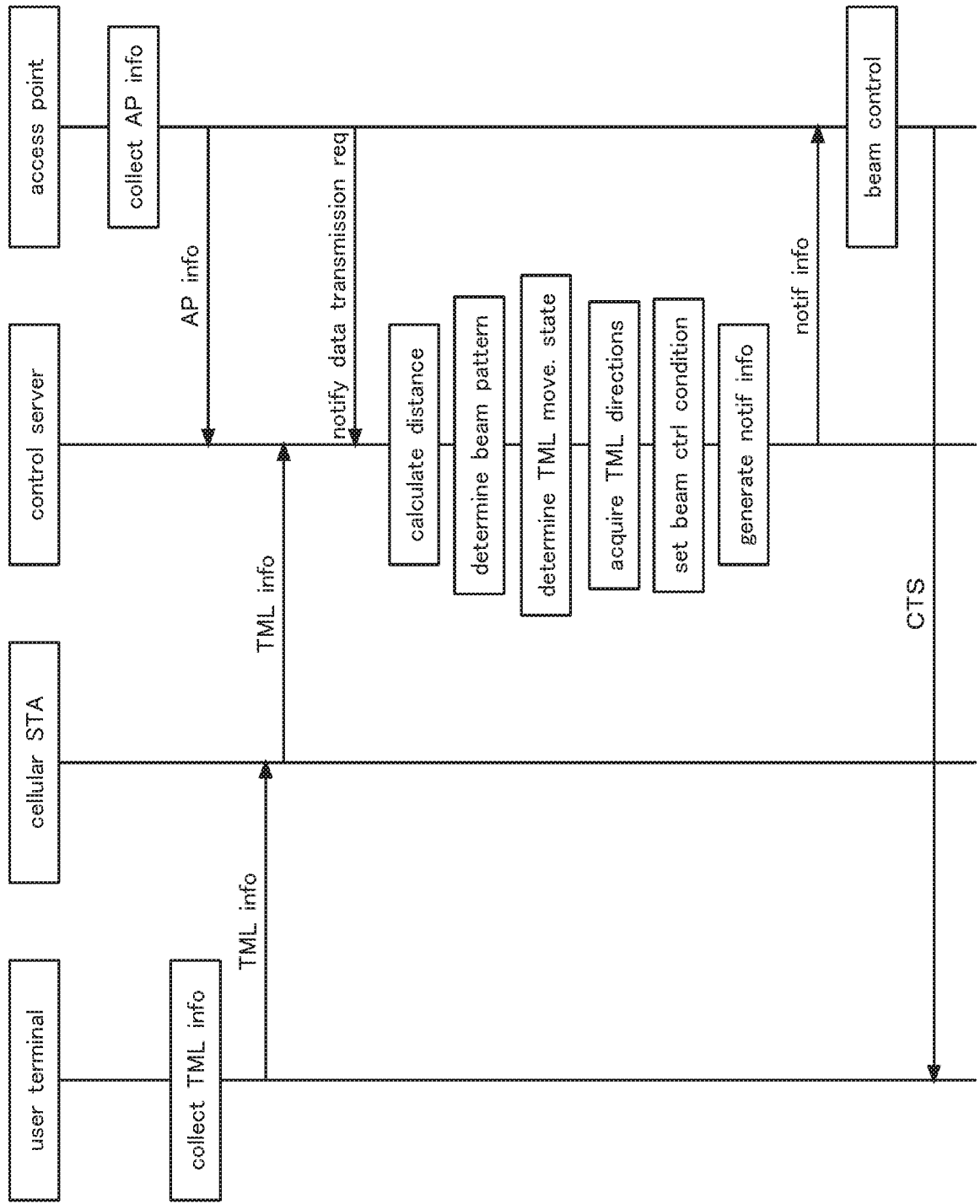
FIG. 24 is a sequence diagram showing processing procedures performed by a user terminal 1, the access point 2, a cellular base station 3, and the control server 4 according to the fifth embodiment of the present invention.
Figure 25:
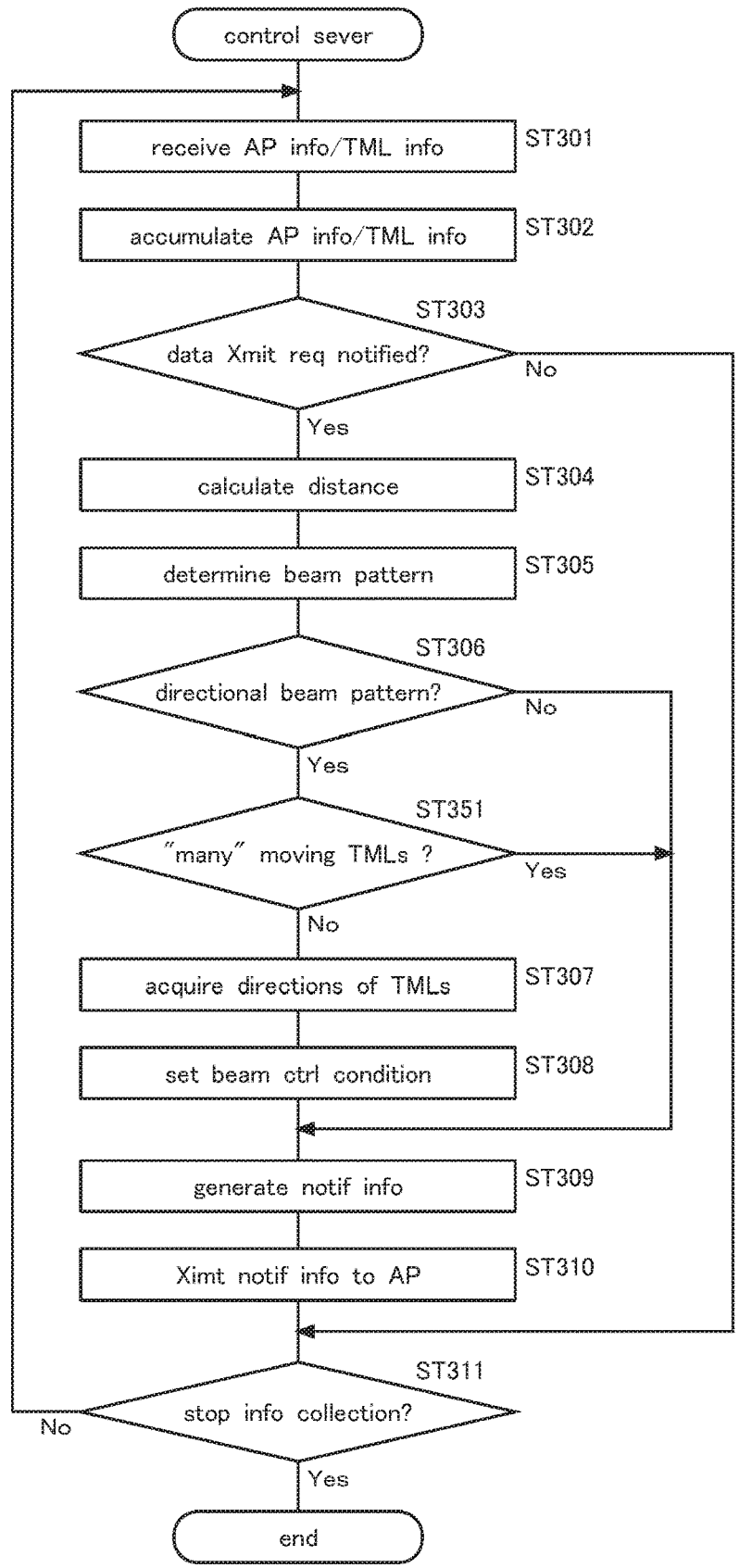
FIG. 25 is a flow diagram showing a processing procedure performed by the control server 4 according to the fifth embodiment of the present invention.

Next, processing procedures performed by a user terminal 1, the access point 2, the cellular base station 3 and the control server 4 according to the fifth embodiment of the present invention will be described. FIG. 24 is a sequence diagram showing processing procedures performed by a user terminal 1, the access point 2, a cellular base station 3, and the control server 4. FIG. 25 is a sequence diagram showing processing procedures performed by the control server 4.

The processing procedure performed by a user terminal 1 is the same as in the first embodiment (shown in FIG. 5), and thus a flow diagram showing the procedure is omitted. In the following description, the description of the same procedures as in the first embodiment will be omitted as appropriate.

In the control server 4, when a network communicator 51 receives a notification notifying a data transmission request transmitted from the access point 2 (Yes at ST303 in FIG. 25), a distance acquirer 61 acquires the distance from the access point 2 to the user terminal 1 (ST304 in FIG. 25). Then, a beam pattern determiner 63 compares the distance acquired by the distance acquirer 61 with a prescribed threshold value to determine which of the directional beam pattern and the non-directional beam pattern (omni pattern) is to be used (ST305 in FIG. 25).

When the directional beam pattern is used for communication (Yes at ST306 in FIG. 25), the terminal movement state determiner 66 determines whether or not there are a lot of moving user terminals 1; that is, whether or not the number of the moving user terminals 1 is not less than a prescribed threshold value (ST351 in FIG. 25).

When the number of the moving user terminals 1 is less than the prescribed threshold value (No at ST351 in FIG. 25), a terminal direction acquirer 62 acquires the direction towards the user terminal 1 as viewed from the access point 2 (ST307 in FIG. 25). Then, a beam controlling condition setter 64 sets a beam angle (sector ID) based on the direction towards the user terminal 1 as viewed from the access point 2 acquired by the terminal direction acquirer 62 (ST308 in FIG. 25).

When the non-directional beam pattern is used for communication (No at ST306 in FIG. 25) and/or when the number of the moving user terminals 1 is not less than a prescribed threshold value (Yes at ST351 in FIG. 25), the steps of terminal direction acquisition processing (ST307) and beam control condition setting processing (ST308 in FIG. 25) are omitted.

Next, a notification information generator 65 generates notification information including the terminal ID, the beam pattern determination result for determining which of the directional and non-directional beam patterns is to be used, information on the presence or absence of the rotating beam type control, and the beam control information on the beam control condition set by the beam controlling condition setter 64 (ST309 in FIG. 25). Then, the network communicator 51 transmits the notification information generated by the notification information generator 65 to the access point 2 (ST310 in FIG. 25).

In the access point 2, when a network communicator 32 receives the notification information transmitted from the control server 4 (Yes at ST205 of FIG. 6), a beam controller 42 sets which of the directional or non-directional beam patterns is to be used based on the beam control information included in the notification information, and, when the directional beam pattern is used and the rotating beam type control is instructed to be used, a wireless LAN communicator 31 transmits control information (CTS) to the user terminal 1 (ST206 in FIG. 6) with a directional beam which is being rotated.

Sixth Embodiment

Figure 26:
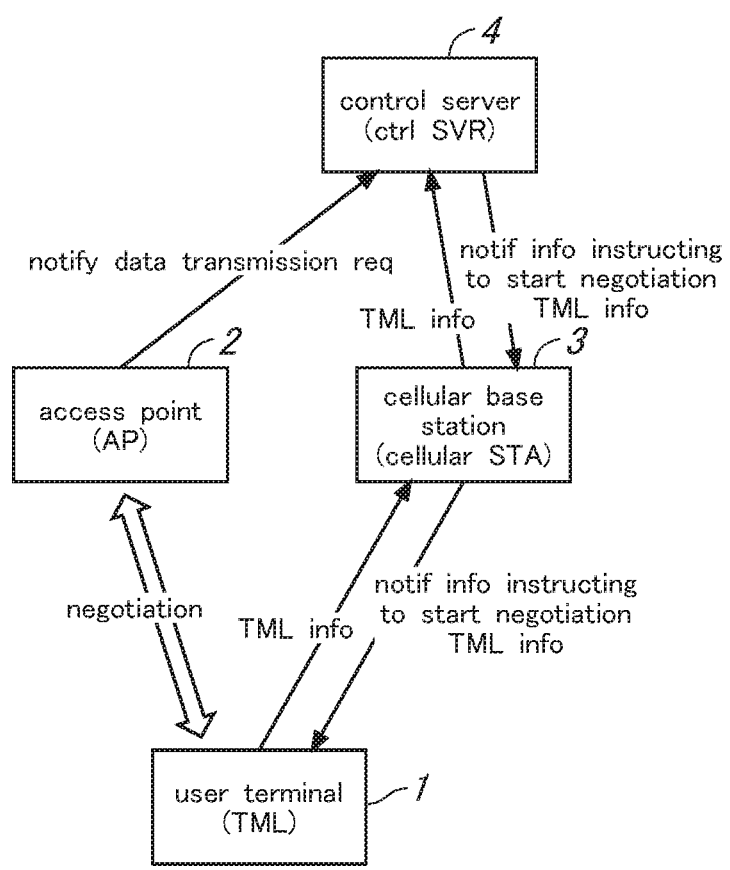
FIG. 26 is an explanatory diagram showing how negotiation is performed between a user terminal 1 and an access point 2 in a communication system according to a sixth embodiment of the present invention.

Next, a sixth embodiment of the present invention will be described. Except for what will be discussed here, this embodiment is the same as the above-described embodiments. FIG. 26 is an explanatory diagram showing how negotiation is performed between a user terminal 1 and an access point 2 in a communication system according to a sixth embodiment of the present invention.

When there are a lot of moving user terminals 1, control information could be transmitted with a directional beam which is being rotated, as in the fifth embodiment (See FIG. 22). However, when the number of moving user terminals 1 is small, it is more efficient to individually transmit the control information (CTS) to a user terminal 1. In this case, before control information is transmitted, it is necessary to perform a negotiation on beam forming between the first user terminal and the access point 2 in order to acquire optimal beam control conditions at the destination location of the moving terminal 1.

Thus, in the present embodiment, when only a prescribed number (for example, one) of user terminal(s) is moving, notification information for instructing the moving user terminal 1 to start a negotiation is transmitted from a control server 4 to the user terminal 1 via a cellular base station 3. Then, a negotiation request is transmitted from the user terminal 1 to the access point 2 to conduct a negotiation between the user terminal 1 and the access point 2.

Although, in the present embodiment, a negotiation request is transmitted from the access point 2 to the user terminal 1, it is also possible to transmit a negotiation request from the user terminal 1 to the access point 2.

Figure 27:
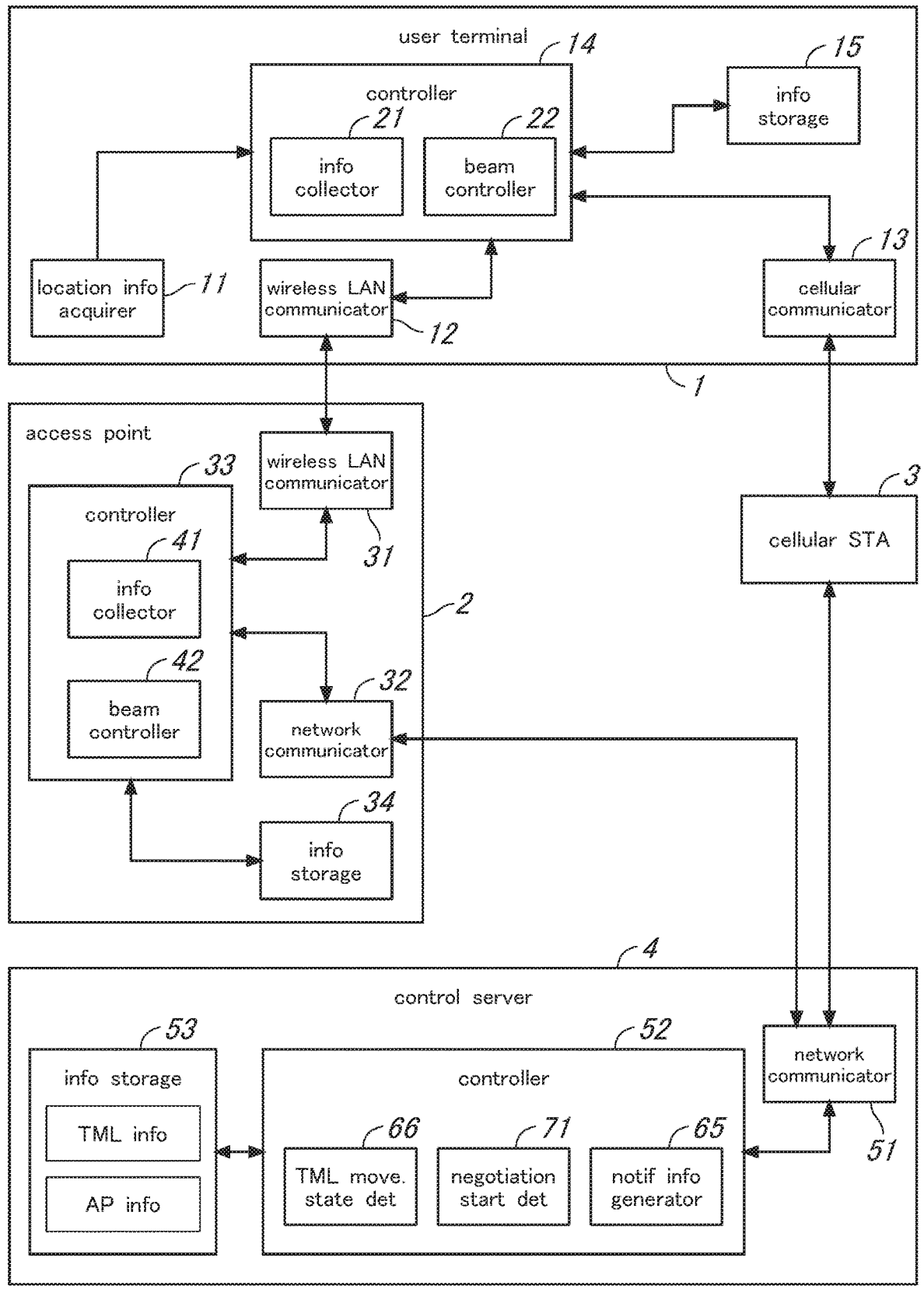
FIG. 27 is a block diagram showing schematic general configurations of the user terminal 1, the access point 2, and a control server 4 according to the sixth embodiment of the present invention.

Next, schematic general configurations of the user terminal 1, the access point 2, and the control server 4 according to the sixth embodiment of the present invention will be described. FIG. 27 is a block diagram showing schematic general configurations of the user terminal 1, the access point 2, and the control server 4 according to the sixth embodiment of the present invention. In the following description, the description of the same parts as in the first embodiment will be omitted as appropriate.

In a controller 14 of the user terminal 1, when a cellular communicator 13 receives notification information transmitted from the control server 4 via the cellular base station 3, the controller starts a negotiation with the access point in response to an instruction to do so included in the communication information, and a wireless LAN communicator 12 transmits a negotiation request to the access point 2.

A controller 52 of the control server 4 includes a terminal movement state determiner 66 and a negotiation start determiner 71 as well as a notification information generator 65.

The terminal movement state determiner 66 determines whether or not each user terminal 1 within the coverage area of the access point 2 is moving based on the location information of the user terminal 1. The negotiation start determiner 71, based on the determination result of the terminal movement state determiner 66, determines whether or not to cause the controller to start a negotiation. In this case, the negotiation start determiner determines to cause the controller to start a negotiation when the number of moving user terminals 1 is equal to or less than a prescribed number.

The notification information generator 65 generates notification information to instruct to start a negotiation. A network communicator 51 transmits the notification information generated by the notification information generator 65 to the user terminal 1 via the cellular base station.

Figure 28:
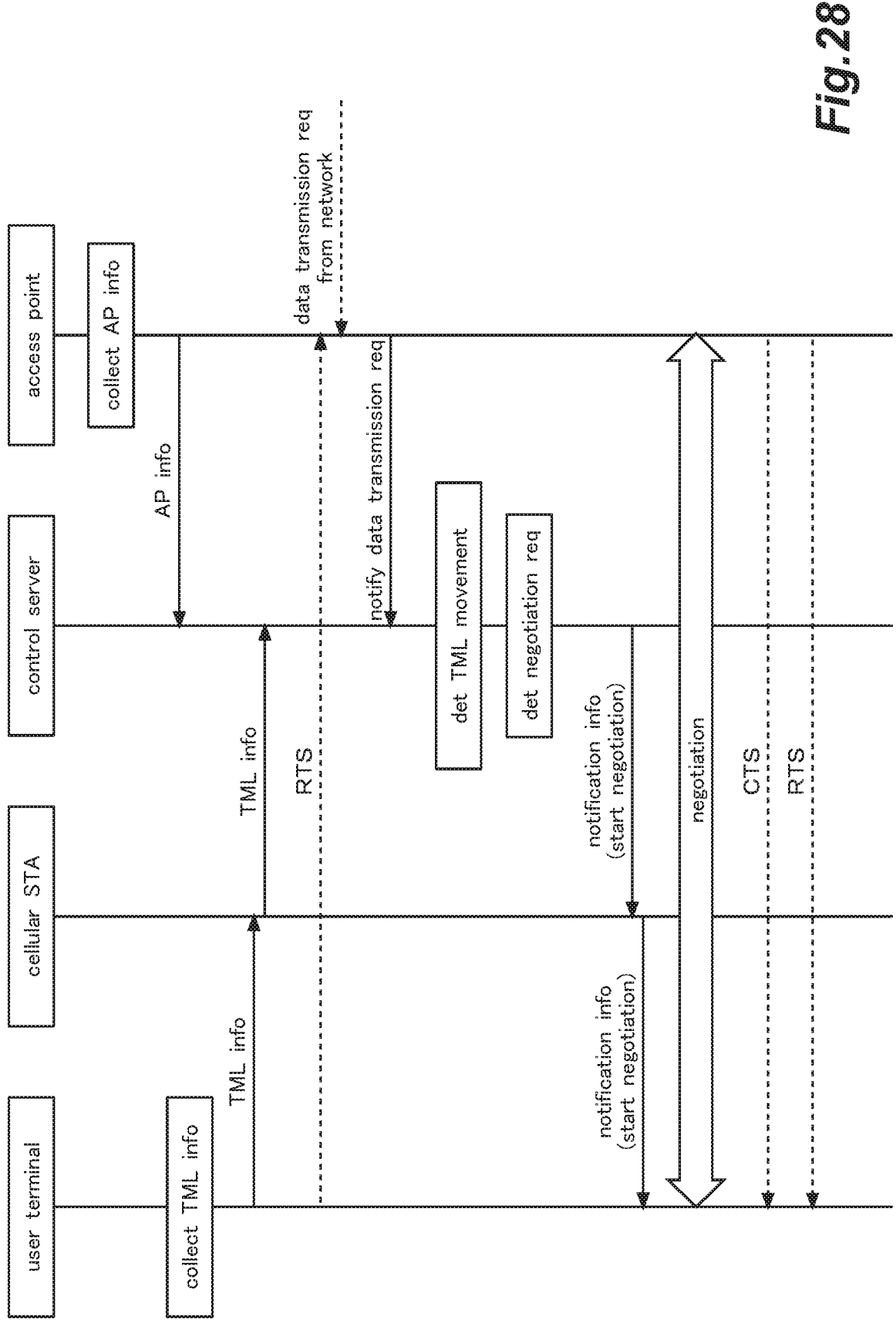
FIG. 28 is a sequence diagram showing processing procedures performed by a user terminal 1, the access point 2, a cellular base station 3, and the control server 4 according to the sixth embodiment of the present invention.
Figure 29:
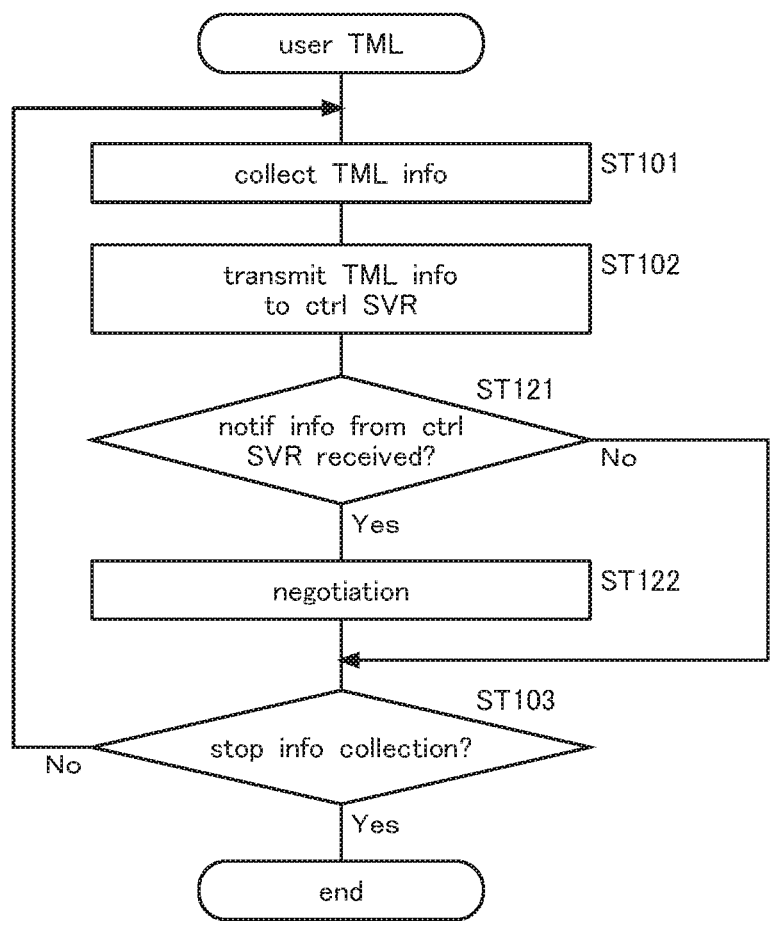
FIG. 29 is a flow diagram showing a processing procedure performed by a user terminal 1 according to the sixth embodiment of the present invention.
Figure 30:
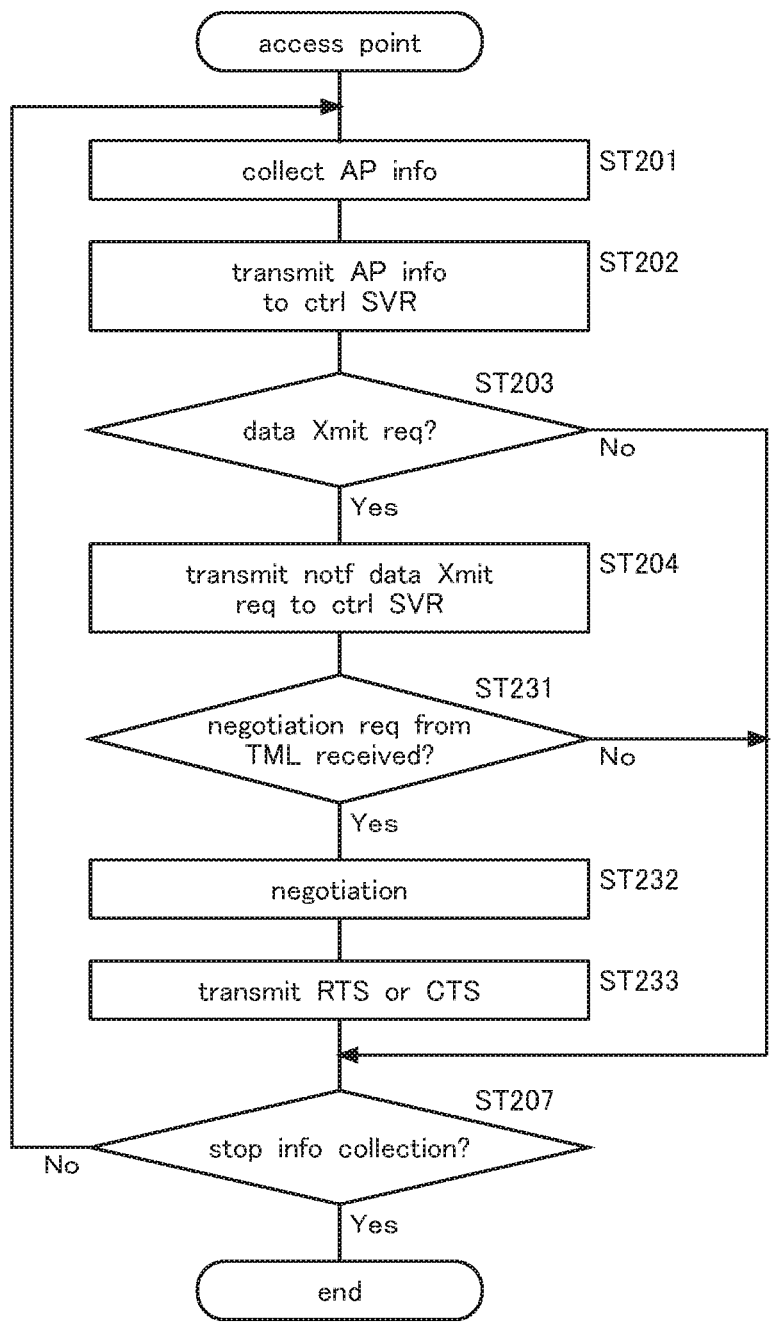
FIG. 30 is a flow diagram showing a processing procedure performed by the access point 2 according to the sixth embodiment of the present invention.
Figure 31:
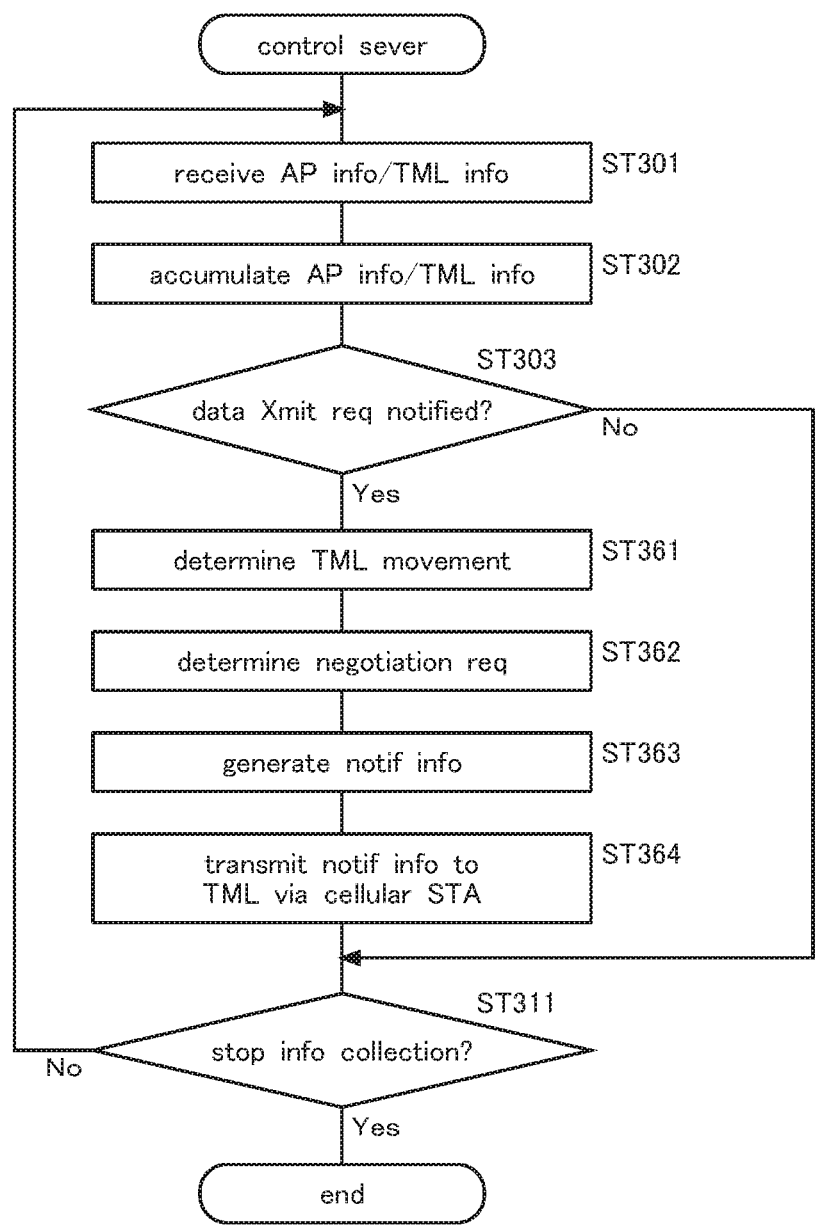
FIG. 31 is a flow diagram showing a processing procedure performed by the control server 4 according to the sixth embodiment of the present invention.

Next, processing procedures performed by a user terminal 1, the access point 2, the cellular base station 3 and the control server 4 according to the sixth embodiment of the present invention will be described. FIG. 28 is a sequence diagram showing processing procedures performed by a user terminal 1, the access point 2, the cellular base station 3, and the control server 4 according to six first embodiment of the present invention. FIG. 29 is a flow diagram showing a processing procedure performed by a user terminal 1. FIG. 30 is a flow diagram showing a processing procedure performed by the access point 2. FIG. 31 is a flow diagram showing a processing procedure performed by the control server 4.

In the following description, the description of the same procedures as in the first embodiment will be omitted as appropriate.

In the control server 4, when the network communicator 51 receives a notification notifying a data transmission request transmitted from the access point 2 (Yes at ST303 in FIG. 31), the terminal movement state determiner 66 determines whether or not each user terminal 1 in the coverage area of the access point 2 is moving (ST361 in FIG. 31). Next, the negotiation start determiner 71 determines that negotiation is to be started when the number of mobile user terminals 1 is equal to or less than the prescribed number (ST362 in FIG. 31).

Next, when the negotiation is started, the notification information generator 65 generates notification information instructing to start negotiation (ST363 in FIG. 31). Then, the network communicator 51 transmits the notification information generated by the notification information generator 65 to the user terminal 1 via the cellular base station 3 (ST364 in FIG. 31).

In the user terminal 1, when the cellular communicator 13 receives notification information transmitted from the control server 4 via the cellular base station 3 (Yes at ST121 in FIG. 29), the controller starts a negotiation with the access point 2 in response to an instruction to start negotiation included in the communication information, and the wireless LAN communicator 12 transmits a negotiation request to the access point 2 (ST122 in FIG. 29).

Upon receiving the negotiation request transmitted from the user terminal 1 (Yes at ST231 in FIG. 30), the access point 2 starts a negotiation with the user terminal 1 (ST232 in FIG. 30). When the negotiation is completed, the access point transmits control information (RTS, CTS) to the user terminal 1 (ST233 in FIG. 30). In this case, when receiving RTS from the user terminal 1, the access point transmits CTS to the user terminal 1, and when receiving a transmission request from the network, the access point transmits RTS to the user terminal 1.

Preferably, as in the first embodiment, the control server acquires the distance from the access point 2 to the user terminal 1, compares the acquired distance with a prescribed threshold value, and when the distance is equal to or greater than the prescribed threshold value Dt, the control server causes a negotiation to be started between the user terminal 1 and the access point 2. In this case, when the distance is less than the prescribed threshold value Dt, the access point preferably transmits control information using a non-directional beam pattern (omni pattern) to the user terminal 1.

Seventh Embodiment

Figure 32:
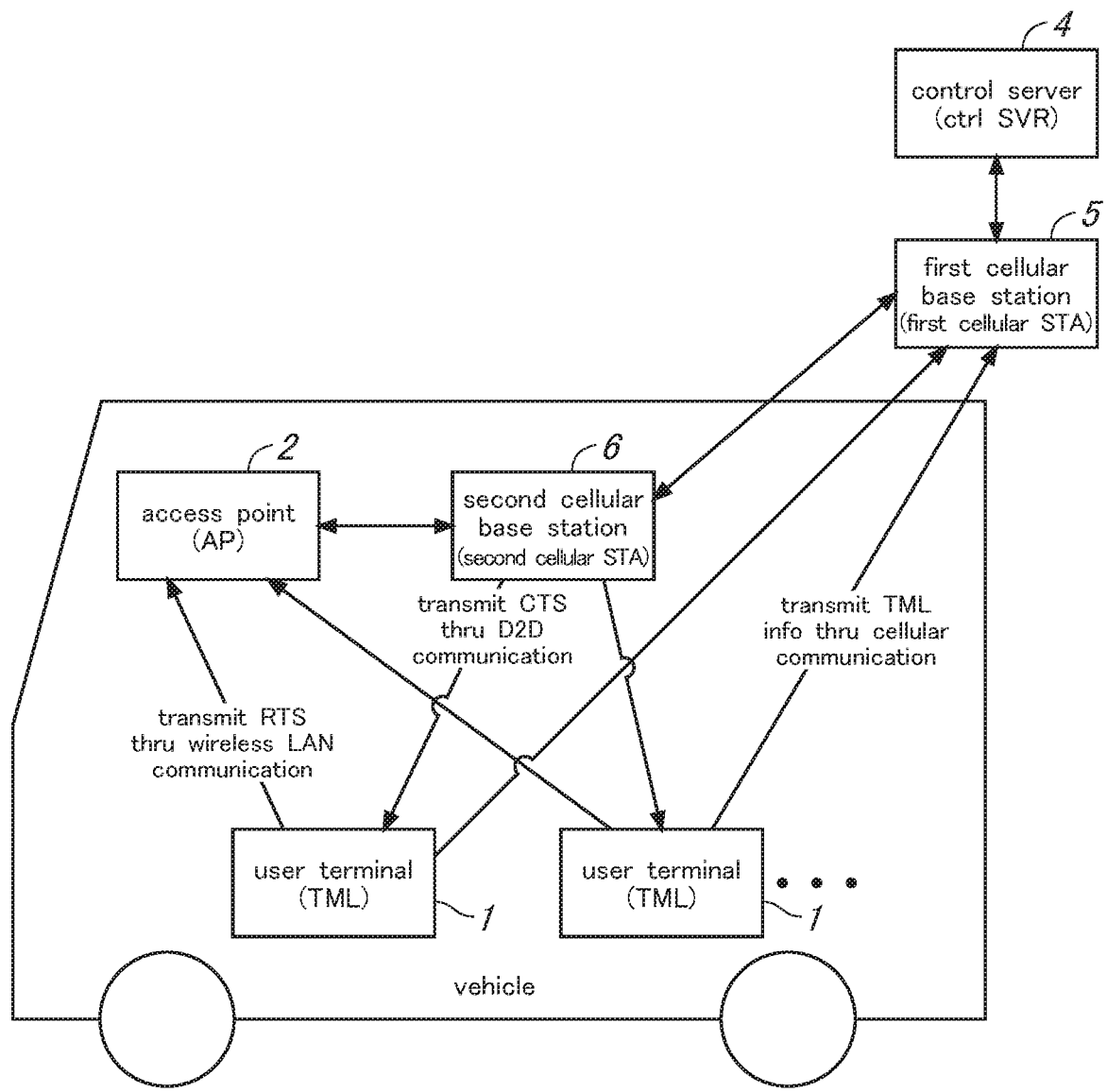
FIG. 32 is a diagram showing a general configuration of a communication system according to a seventh embodiment of the present invention.

Next, a seventh embodiment of the present invention will be described. Except for what will be discussed here, this embodiment is the same as the above-described embodiments. FIG. 32 is a flow diagram showing a general configuration of a communication system according to the seventh embodiment of the present invention.

The communication system includes a first cellular base station 5 and a second cellular base station 6. The first cellular base station 5 is the same as the cellular base station 3 in the above-described embodiments. The second cellular base station 6 has a function of Device-to-Device (D2D) communication. The second cellular base station 6 is mounted on a vehicle (such as a bus). The vehicle is also provided with a WiGig access point 2. A user who carriers the user terminal 1 gets on the vehicle, and as a result, the user terminal 1 is in the vehicle.

The user terminal 1 also has a function of D2D communication, and transmits and receives control information to and from the second cellular base station 6 through D2D communication. In particular, in the present embodiment, RTS is transmitted from the user terminal 1 to the access point 2 through WiGig-based communication, and CTS is transmitted from the second cellular base station 6 to the user terminal 1 through D2D communication. As in the first embodiment, user data is transmitted and received between the user terminal 1 and the access point 2 through WiGig-based communication.

D2D communication (communication between cellular devices) is a data communication method based on a cellular (LTE) system, which allows devices located nearby to each other to perform direct communication with each other without communication via the cellular base station 3. In this D2D communication system, the user terminal 1 and the second cellular base station 6 perform D2D communication with each other with assistance provided by the first cellular base station 5, and the assistance involves the allocation of channels to be used, for example.

In the present embodiment, the distance from the second cellular base station 6 to the user terminal 1 is calculated, and the transmission power is controlled based on the calculated distance when the second cellular base station 6 transmits control information to other entities through D2D communication.

In this way, in the present embodiment, since control information is transmitted from the second cellular base station 6 to other entities through D2D communication using lower frequencies than those used in WiGig communication, the transmission of control information can be more reliable. Moreover, since the power for the transmission of control information from the second cellular base station 6 through D2D communication is controlled based on the distance from the second cellular base station 6 to the user terminal 1, the transmission of control information from the second cellular base station 6 can be conducted in a more efficient manner.

Figure 33:
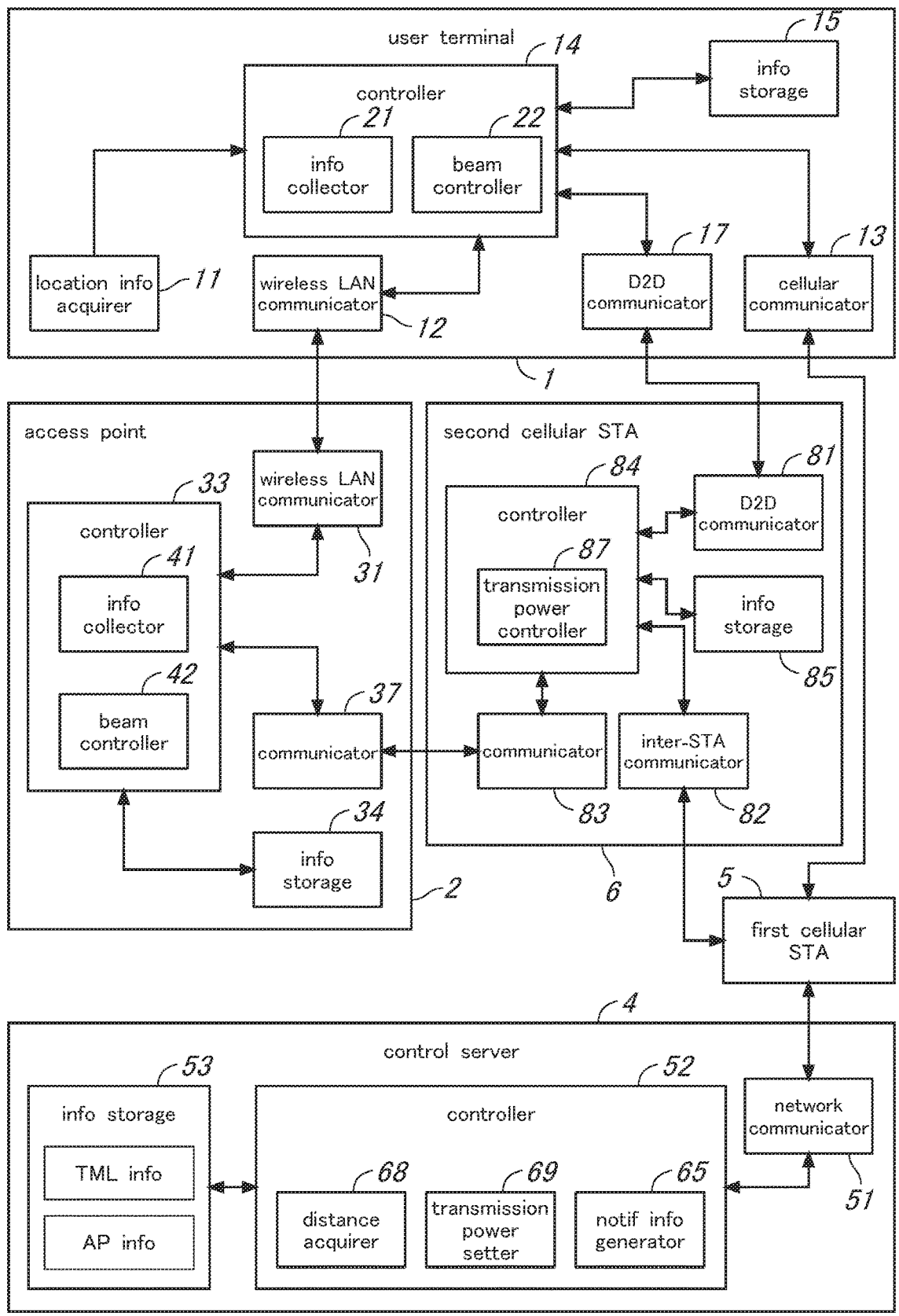
FIG. 33 is a block diagram showing schematic general configurations of a user terminal 1, an access point 2, and a control server 4 according to the seventh embodiment of the present invention.

Next, schematic general configurations of the user terminal 1, the access point 2, the second cellular base station 6, and a control server 4 according to the seventh embodiment of the present invention will be described. FIG. 33 is a block diagram showing schematic general configurations of the user terminal 1, the access point 2, the second cellular base station 6, and the control server 4 according to the seventh embodiment of the present invention. In the following description, the description of the same parts as in the first embodiment will be omitted as appropriate.

The user terminal 1 includes a D2D communicator (third communicator) 17 configured to perform D2D communication with the second cellular base station.

The access point 2 includes a communicator 37 for communicating with the second cellular base station 6.

The second cellular base station 6 includes a D2D communicator 81, an inter-base-station communicator 82, a communicator 83, a controller 84, and an information storage 85.

The D2D communicator 81 performs D2D communication with the user terminal 1. The inter-base-station communicator 82 communicates with the first cellular base station 5. The communicator 83 communicates with the access point 2.

The controller 84 includes a transmission power controller 87. The transmission power controller 87 controls the transmission power when the D2D communicator 81 transmits control information through D2D communication. The information storage 85 stores one or more programs executed by the controller 84 and other information.

A controller 52 of the control server 4 includes a distance acquirer 68, a transmitting power setter 69, and an notification information generator 65. The distance acquirer 68 calculates the distance from the second cellular base station 6 to the user terminal 1 based on location information of the user terminal 1 and that of the second cellular base station 6.

The transmitting power setter 69 sets the transmission power, based on the distance acquired by the distance acquirer 68, for the transmission of control information from the second cellular base station 6 through D2D communication. That is, when the distance from the second cellular base station 6 to the user terminal 1 is short, the transmission power is lowered, and when the distance from the second cellular base station 6 to the user terminal 1 is long, the transmission power is increased.

The notification information generator 65 generates notification information to be transmitted to the second cellular base station 6. The notification information includes the terminal ID of a user terminal 1 to be a control information transmitting target and the information on the transmission power acquired by the transmitting power setter 69.

Figure 34:
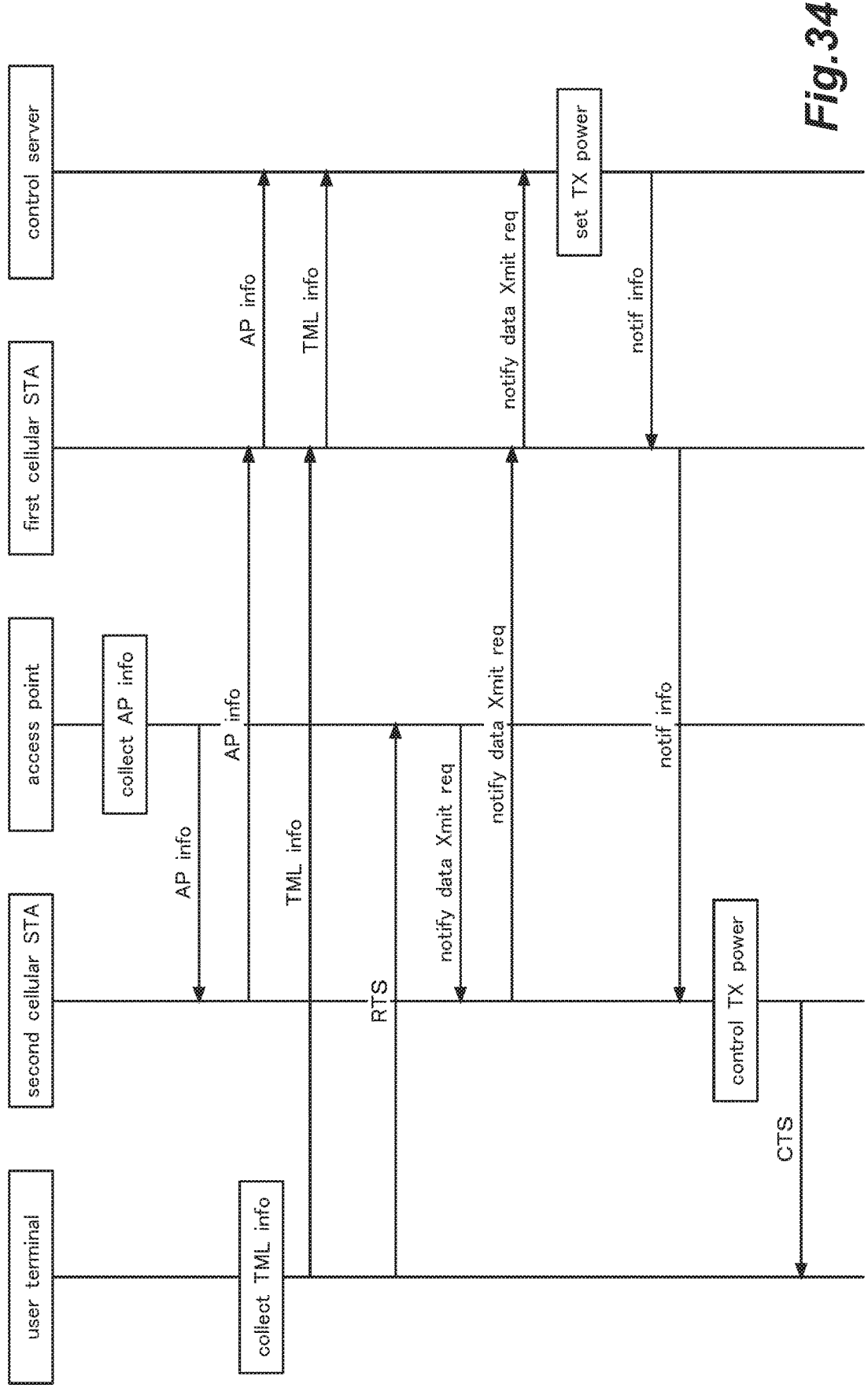
FIG. 34 is a sequence diagram showing processing procedures performed by a user terminal 1, the access point 2, a first cellular base station 5, a second cellular base station 6, and the control server 4 according to the seventh embodiment of the present invention.
Figure 35:
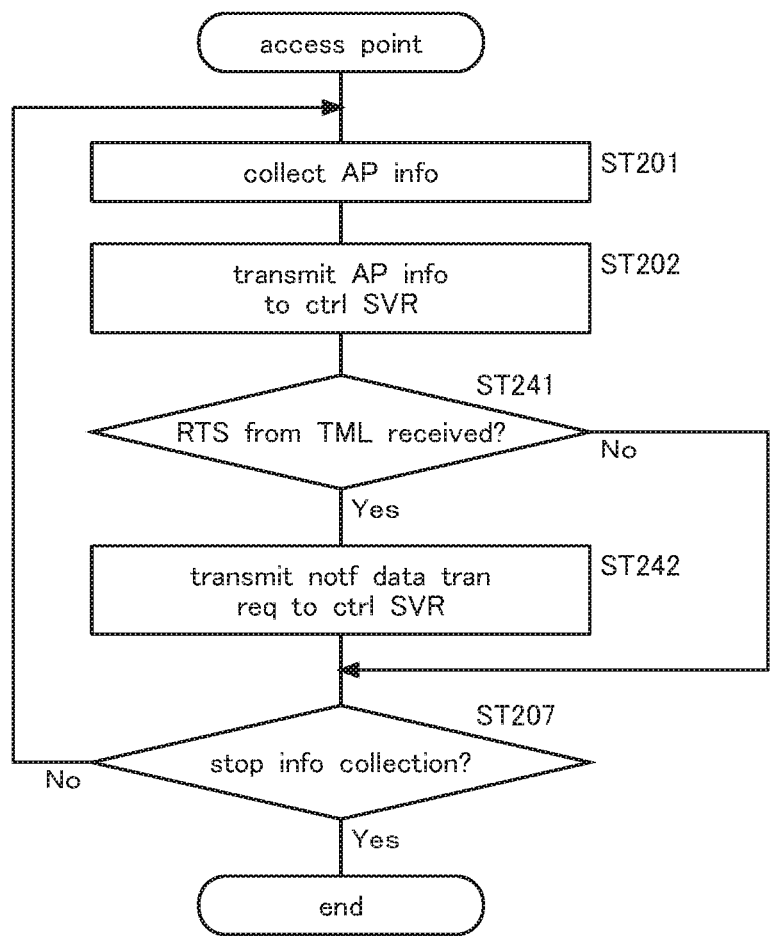
FIG. 35 is a flow diagram showing a processing procedure performed by the access point 2 according to the seventh embodiment of the present invention.
Figure 36:
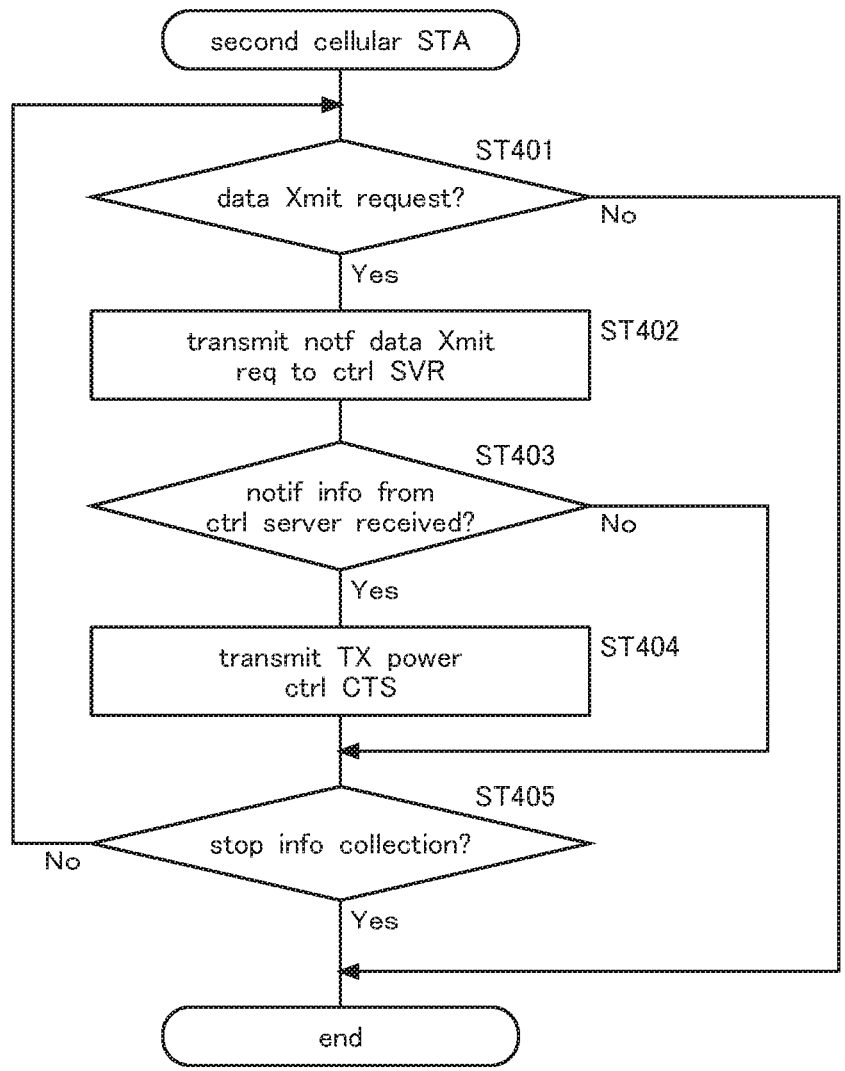
FIG. 36 is a flow diagram showing a processing procedure performed by the second cellular base station 6 according to the seventh embodiment of the present invention.
Figure 37:
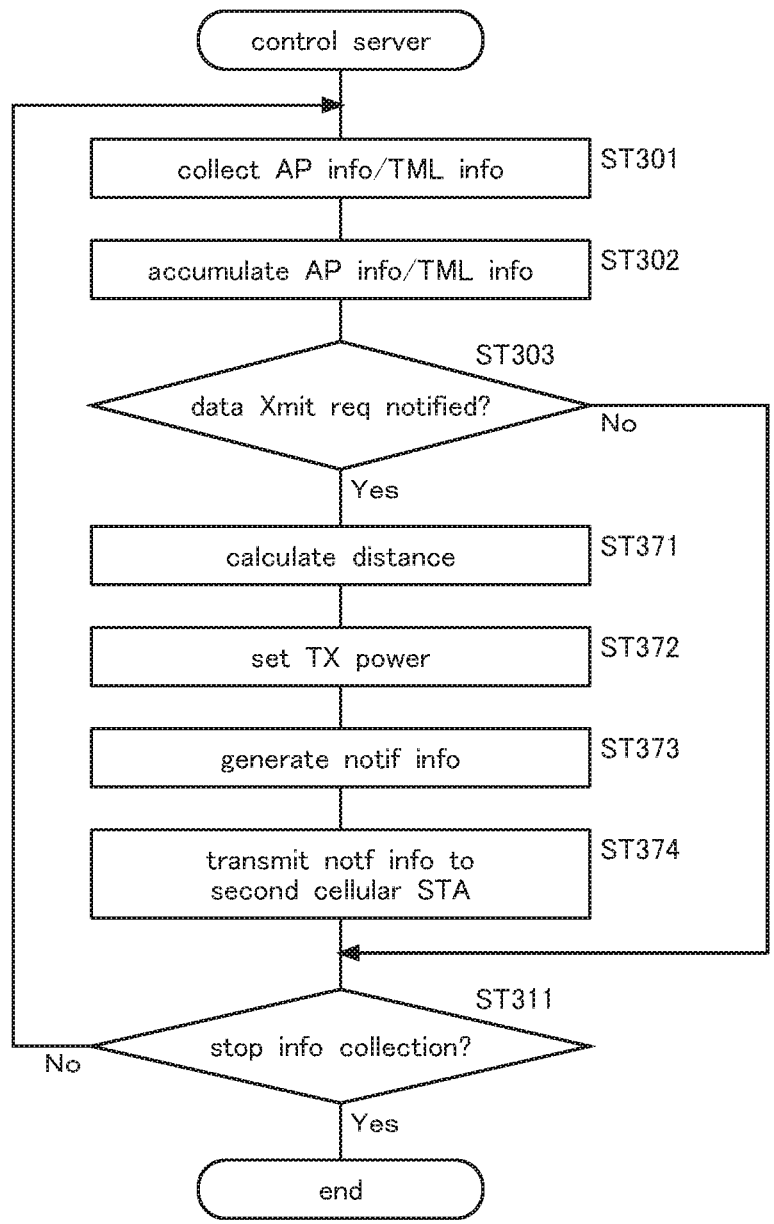
FIG. 37 is a flow diagram showing a processing procedure performed by the control server 4 according to the seventh embodiment of the present invention.

Next, processing procedures performed by a user terminal 1, the access point 2, the first cellular base station 5, the second cellular base station 6, and the control server 4 according to the seventh embodiment of the present invention will be described. FIG. 34 is a sequence diagram showing processing procedures performed by a user terminal 1, the access point 2, the first cellular base station 5, the second cellular base station 6, and the control server 4 according to the seventh embodiment of the present invention. FIG. 35 is a flow diagram showing a processing procedure performed by the access point 2. FIG. 36 is a flow diagram showing a processing procedure performed by the second cellular base station 6. FIG. 37 is a flow diagram showing a processing procedure performed by the control server 4.

The processing procedure performed by a user terminal 1 is the same as in the first embodiment (shown in FIG. 5), and thus a flow diagram showing the procedure is omitted. In the following description, the description of the same procedures as in the first embodiment will be omitted as appropriate.

The access point 2 transmits the access point information to the control server 4 via the second cellular base station 6 and the first cellular base station 5 (ST202 in FIG. 35). Along with this transmission, in response to receiving the access point information transmitted from the access point 2, the second cellular base station 6 transmits the access point information to the control server 4 via the first cellular base station 5. However, this processing step is omitted in FIG. 36, the flow chart showing the processing procedure performed by the second cellular base station 6.

Next, in the access point 2, when a wireless LAN communicator 31 receives RTS transmitted from the user terminal 1 (Yes at ST241 in FIG. 35), the communicator 37 transmits a notification of a data transmission request to the control server 4 via the second cellular base station 6 and the first cellular base station 5 (ST242 in FIG. 35). When no RTS is received from the user terminal 1 (No at ST241 in FIG. 35), no particular processing is performed.

Next, in the second cellular base station 6, when a communicator 63 receives the notification of the data transmission request transmitted from the access point 2 (Yes at ST401 in FIG. 36), the communicator 63 transmits the data transmission request to the control server 4 via the cellular base station 5 (ST402 in FIG. 36).

Next, in the control server 4, when a network communicator 51 receives the notification of the data transmission request transmitted from the access point 2 via the second cellular base station 6 (Yes at ST303 in FIG. 37), the distance acquirer 68 acquires the distance from the second cellular base station 6 to the user terminal 1 based on the terminal information and the location information of the second cellular base station 6 (ST371 in FIG. 37). Next, the transmitting power setter 69 sets the transmission power for the transmission of the control information from the second cellular base station based on the distance acquired by the distance acquirer 68 (ST372 in FIG. 37).

Next, the notification information generator 65 generates notification information including information on the transmission power set by the transmitting power setter 69 (ST373 in FIG. 37). The communicator transmits the notification information generated by the notification information generator to the second cellular base station 6 via the first cellular base station 5 (ST374 in FIG. 37).

Next, when receiving the notification information transmitted from the control server 4 (Yes at ST403 in FIG. 36), the second cellular base station 6, based on the information on the transmission power included in the notification information, controls the transmission power of the D2D communicator 81 and transmits control information to the user terminal 1 through D2D communication (ST404 in FIG. 36).

Modification of Seventh Embodiment

Figure 38:
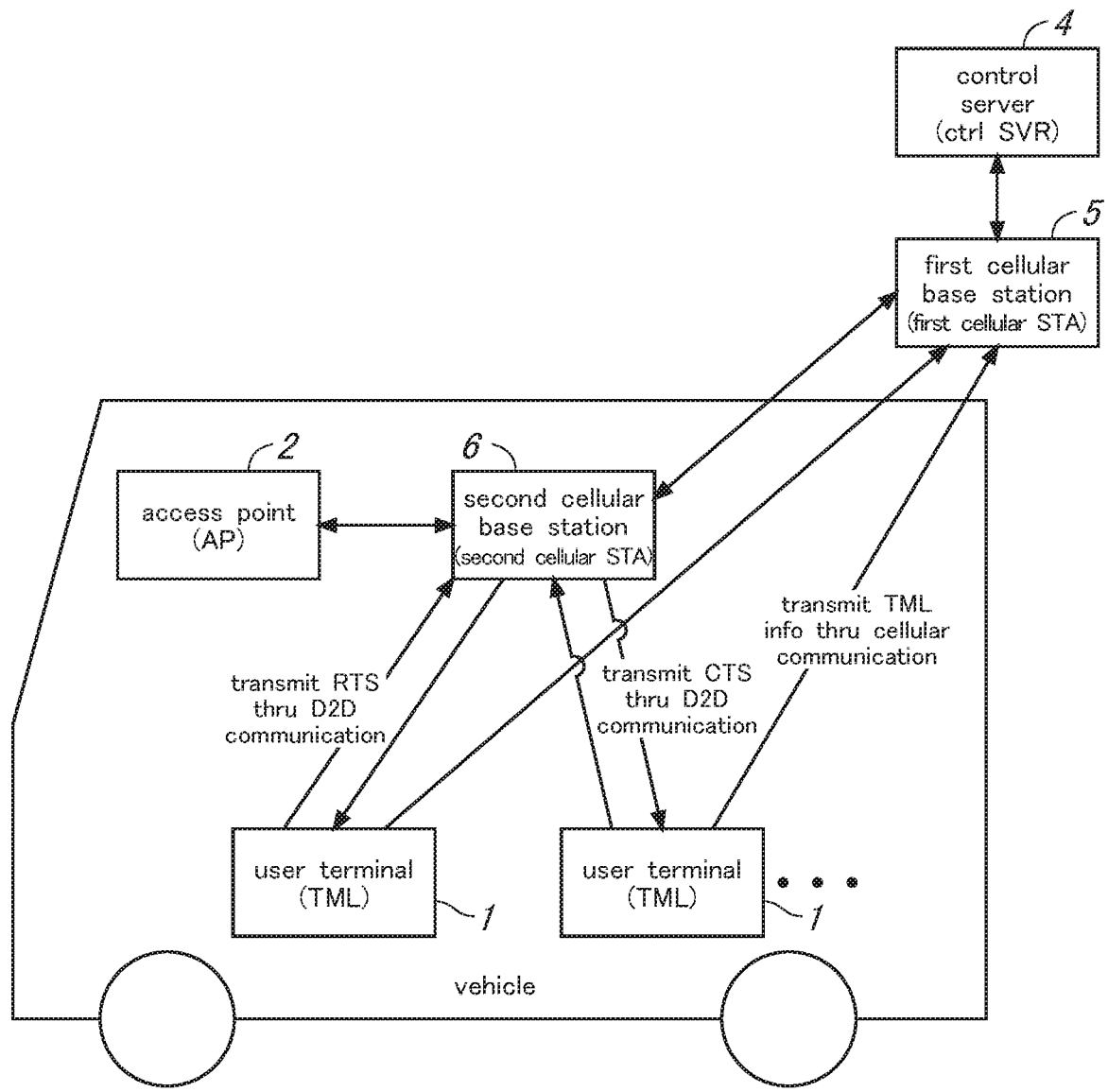
FIG. 38 is a diagram showing a general configuration of a communication system according to a modification of the seventh embodiment of the present invention.

Next, a modification of the seventh embodiment of the present invention will be described. Except for what will be discussed here, this modification is the same as the above-described embodiment. FIG. 38 is a flow diagram showing a general configuration of a communication system according the modification of the seventh embodiment of the present invention.

While, in the seventh embodiment of the present invention, a user terminal 1 is configured to transmit RTS to an access point 2, in the modification of the seventh embodiment, a user terminal 1 transmits RTS to a second cellular base station 6 through D2D communication and the second cellular base station 6 transmits a notification notifying that the second cellular base station 6 has received RTS from the user terminal 1 to the access point 2. CTS is transmitted from the second cellular base station 6 through D2D communication in the same way as in the seventh embodiment.

Figure 39:
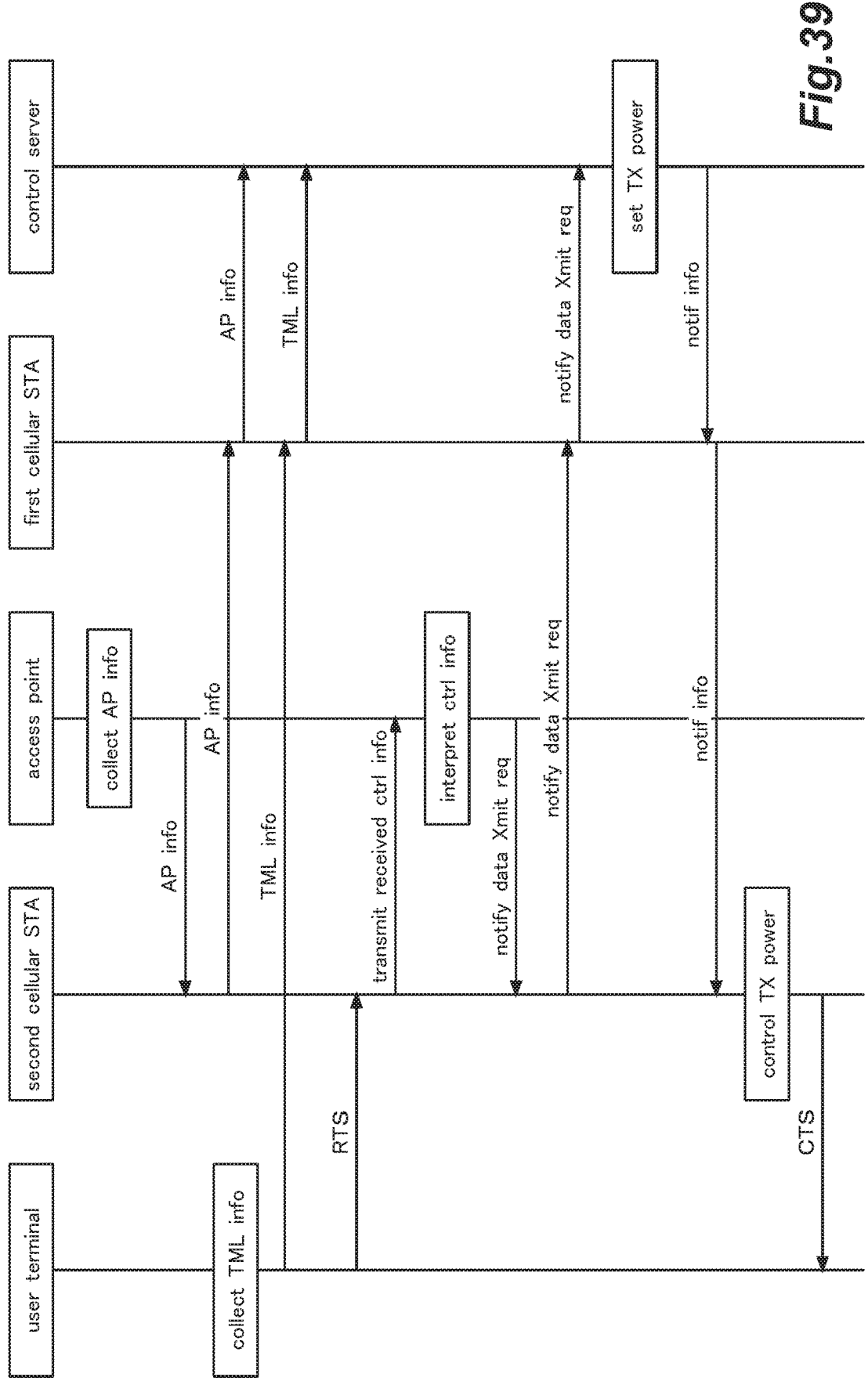
FIG. 39 is a sequence diagram showing processing procedures performed by a user terminal 1, an access point 2, a cellular base station 3, and a control server 4 according to the modification of the seventh embodiment of the present invention.
Figure 40:
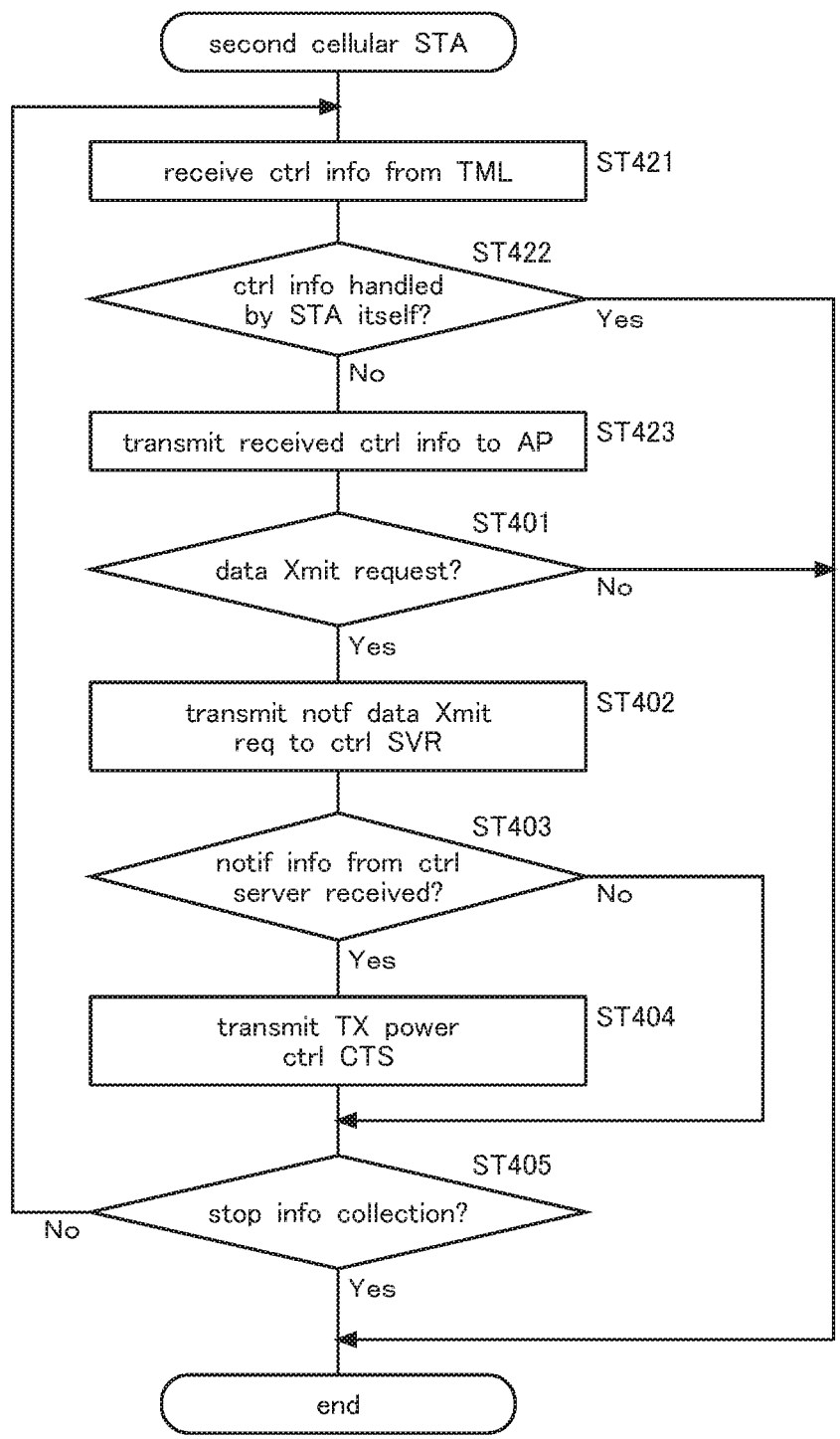
FIG. 40 is a flow diagram showing a processing procedure performed by a second cellular base station 6 according to the modification of the seventh embodiment of the present invention.
Figure 41:
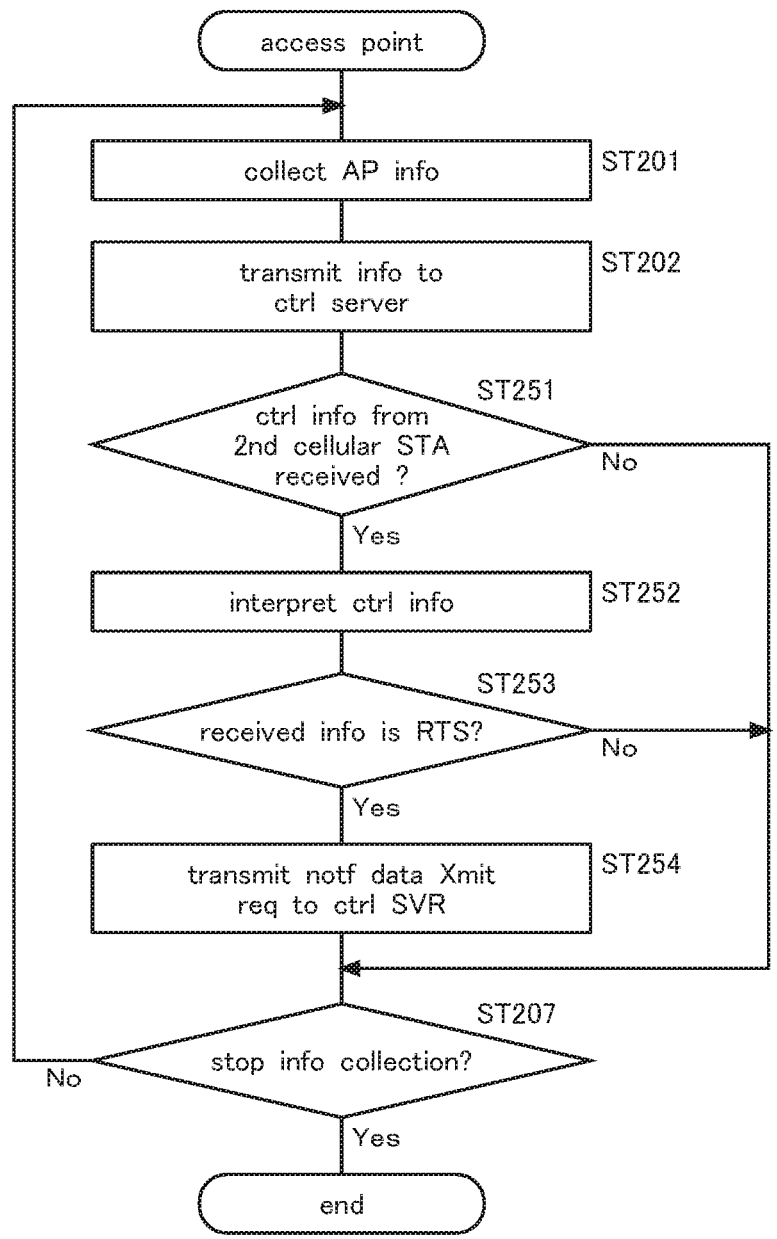
FIG. 41 is a flow diagram showing a processing procedure performed by the access point 2 according to the modification of the seventh embodiment of the present invention.

Next, processing procedures performed by a user terminal 1, the access point 2, a first cellular base station 5, the second cellular base station 6, and a control server 4 according to the modification of the seventh embodiment of the present invention will be described. FIG. 39 is a sequence diagram showing processing procedures performed by a user terminal 1, the access point 2, the first cellular base station 5, the second cellular base station 6, and the control server 4. FIG. 40 is a flow diagram showing a processing procedure performed by the second cellular base station 6. FIG. 41 is a flow diagram showing a processing procedure performed by the access point 2.

The processing procedure performed by a user terminal 1 is the same as in the first embodiment (shown in FIG. 5), and thus a flow diagram showing the procedure is omitted. The processing procedure performed by the control server 4 is the same as in the seventh embodiment (shown in FIG. 36), and thus a flow diagram showing the procedure is omitted. In the following description, the description of the same procedures as in the first and seventh embodiments will be omitted as appropriate.

In the second cellular base station 6, when a D2D communicator 81 receives control information transmitted from the user terminal 1 (ST421 in FIG. 40), a controller 64 determines whether or not the received control information is to be handled by the second cellular base station itself (ST422 in FIG. 40), and when the control information is not to be handled by the second cellular base station itself (No at ST422 in FIG. 40), a communicator 63 transmits the control information to the access point 2 (ST423 in FIG. 40).

Next, in the access point 2, when a communicator 37 receives the control information transmitted from the second cellular base station 6 (Yes at ST251 in FIG. 41), the controller 64 interprets the control information (ST252 in FIG. 41), when the control information is RTS (Yes at ST253 in FIG. 41), the communicator 37 transmits a notification of a data transmission request to the control server 4 via the second cellular base station 6 and the first cellular base station 5 (ST254 in FIG. 41). When the control information is not RTS (No at ST253 in FIG. 41), no particular processing is performed.

The subsequent processing procedures are the same as in the seventh embodiment.

Eighth Embodiment

Figure 42:
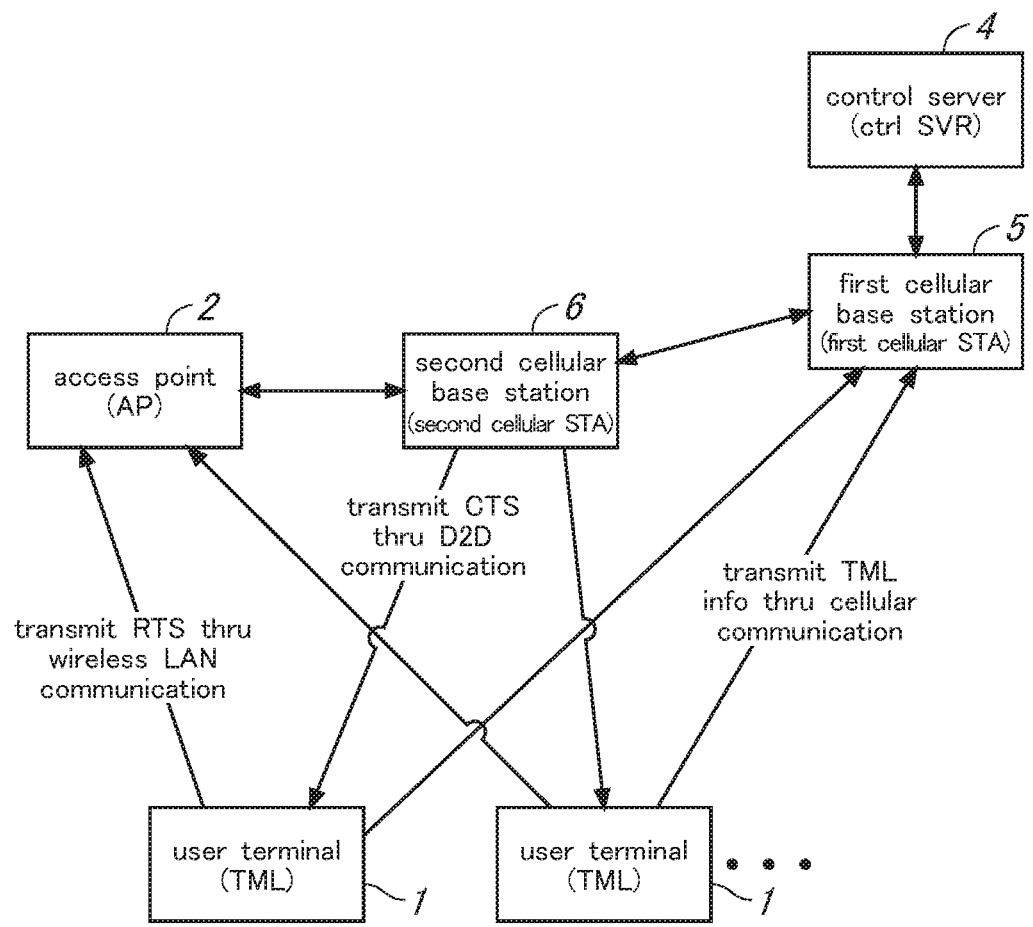
FIG. 42 is a diagram showing a general configuration of a communication system according to an eighth embodiment of the present invention.

Next, an eighth embodiment of the present invention will be described. Except for what will be discussed here, this embodiment is the same as the above-described embodiments. FIG. 42 is a flow diagram showing a general configuration of a communication system according to the eighth embodiment of the present invention.

The communication system includes a cellular base station 6 having a function of D2D communication. However, unlike the seventh embodiment, the second cellular base station 6 is not mounted on a vehicle (such as a bus), but disposed in the vicinity of an access point 2. A user terminal 1, as in the seventh embodiment, has a function of D2D communication, transmits RTS from the user terminal 1 to the access point 2 through WiGig communication, and the second cellular base station 6 transmits RTS to the user terminal 1 through D2D communication.

Alternatively, as in the modification of the seventh embodiment, the user terminal 1 transmits RTR through D2D communication, and the second cellular base station 6 transmits RTS to the user terminal 1 through D2D communication.

Ninth Embodiment

Figure 43:
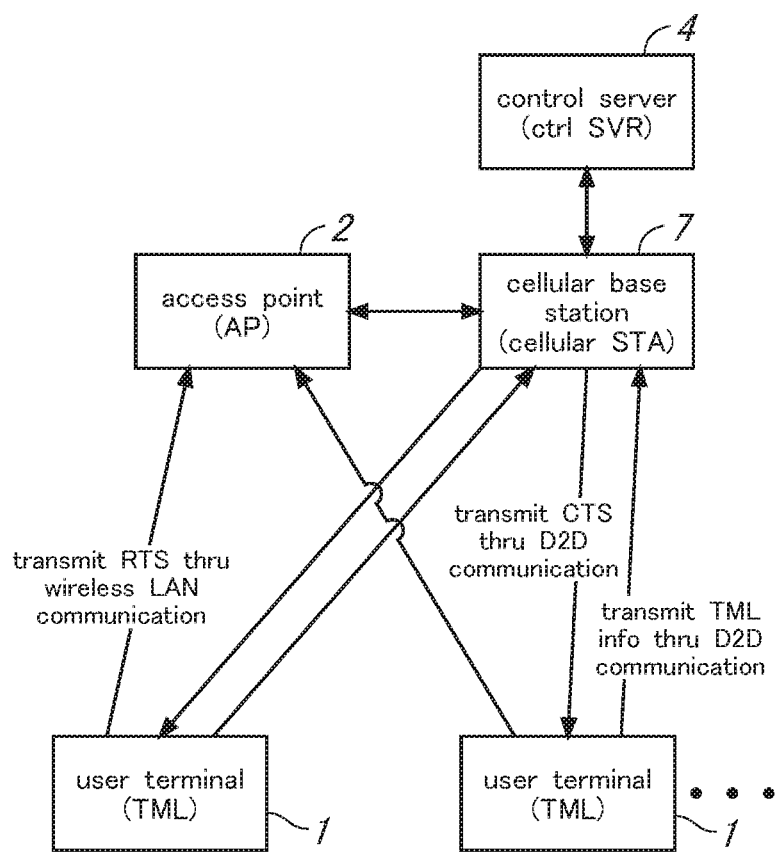
FIG. 43 is a diagram showing a general configuration of a communication system according to a ninth embodiment of the present invention.

Next, a ninth embodiment of the present invention will be described. Except for what will be discussed here, this embodiment is the same as the above-described embodiments. FIG. 43 is a flow diagram showing a general configuration of a communication system according to the ninth embodiment of the present invention.

The communication system includes a cellular base station 6 having a function of D2D communication. A cellular base station 7 is disposed in the vicinity of an access point 2.

In the seventh embodiment, a user terminal 1 transmits the terminal information to a control server 4 through cellular communication via a first cellular base station 5 which does not have a function of D2D communication. However, in the ninth embodiment, the user terminal 1 transmits the terminal information to the control server 4 through D2D communication via a cellular base station 7 which has a function of D2D communication. The user terminal 1, as in the seventh embodiment, has a function of D2D communication, and transmits and receives control information (RTS, CTS, or other types of information) to and from the cellular base station 7 through D2D communication.

In this case, as in the seventh embodiment, the user terminal 1 may transmit RTS to the access point 2 using WiGig communication and the cellular base station 7 may transmit CTS from to the user terminal 1 thought D2D communication. Alternatively, the user terminal 1 transmits RTS to the cellular base station 7 through D2D communication, and the cellular base station 7 transmits CTS to the user terminal 1 through D2D communication.

While specific embodiments of the present invention are described herein for illustrative purposes, the present invention is not limited thereto. It will be understood that various changes, substitutions, additions, and omissions may be made for elements of the embodiments without departing from the scope of the invention. In addition, elements and features of the different embodiments may be combined with each other as appropriate to yield an embodiment which is within the scope of the present invention.

For example, although in the above-described embodiments, a first base station apparatus is a WiGig access point and a second base station apparatus is a cellular base station, the second base station apparatus may be a base station apparatus adapted for communication in conformity with a wireless communication method other than the cellular communication method, e.g. a Wifi wireless LAN (excluding WiGig) access point. Furthermore, the second base station apparatus may communicate with a terminal apparatus not only thorough wireless communication, but also thorough wired communication. The first base station apparatus may adopt, in addition to a WiGig based wireless communication system, a wireless communication system using a high frequency band such as millimeter waves.

In addition, although, in the above-described embodiments, control information to be transmitted and controlled over its transmission includes RTS and CTS, control information to be transmitted may be a wireless LAN beacon signal. Furthermore, systems and methods of the present invention may be used for, in addition to the transmission of control information, the transmission of user data.

INDUSTRIAL APPLICABILITY

A communication system, a server apparatus, a base station apparatus, and a communication control method according to the present invention enable quick establishment of a communication link between a terminal apparatus and a base station apparatus under an appropriate communication condition without the need to directly transmit notification information on the presence of the terminal apparatus from the user terminal apparatus to the base station apparatus, thereby reducing communication time, and are useful as a communication system including a terminal apparatus and a base station apparatus configured to communicate with a terminal apparatus, a base station apparatus configured to communicate with a terminal apparatus, a communication control method for controlling communication between a terminal apparatus and a base station apparatus, or other applications.

Glossary

1 user terminal (terminal apparatus)
2 access point (first base station apparatus)
3 cellular base station (second base station apparatus)
4 control server (server apparatus)
11 location information acquirer
12 wireless LAN communicator
13 cellular communicator
14 controller
15 information storage
21 terminal information collector
22 beam controller
23 movement speed calculator
24 movement direction calculator
31 wireless LAN communicator (first communicator)
32 network communicator (second communicator)
33 controller
34 information storage
37 communicator
42 beam controller
51 network communicator (communicator)
52 controller
53 information storage
61 distance acquirer
62 terminal direction acquirer
63 beam pattern determiner
64 beam controlling condition setter
65 notification information generator
66 terminal movement state determiner
67 terminal direction comparer
68 distance acquirer
69 transmitting power setter
71 negotiation start determiner

The invention claimed is:
1. A communication system comprising:
a terminal apparatus;

a first base station apparatus configured to perform wireless communication with the terminal apparatus in conformity with a first communication method using a directional beam pattern, the first base station apparatus being configured to transmit and receive user data to and from the terminal apparatus;
a second base station apparatus configured to perform wireless communication with the terminal apparatus in conformity with a second communication method using a non-directional beam pattern so as to assist wireless communication between the terminal apparatus and the first base station apparatus; and
a server apparatus,
wherein the terminal apparatus comprises:
a communicator configured to transmit terminal information including location information of the terminal apparatus itself to the server apparatus via the second base station apparatus,
wherein the server apparatus comprises:
a controller configured to generate communication control information based on the location information of the terminal apparatus; and
a communicator configured to transmit notification information including the communication control information to the first base station apparatus, and
wherein the first base station apparatus comprises:
a communication controller configured to control wireless communication between the first base station and the terminal apparatus based on the communication control information,
wherein the controller determines whether or not the terminal apparatus is moving based on the location information of the terminal apparatus, and
wherein, when a ratio of moving terminal apparatuses among a plurality of terminal apparatuses is more than a prescribed threshold value, the controller generates the communication control information which causes the first base station apparatus to perform transmission to the plurality of terminal apparatuses using a directional beam simultaneously with rotating the directional beam so that the first base station is able to connect to the plurality of terminal apparatuses to acquire communication conditions.

2. A communication system comprising:
a terminal apparatus;
a first base station apparatus configured to perform wireless communication with the terminal apparatus in conformity with a first communication method using a directional beam pattern, the first base station apparatus being configured to transmit and receive user data to and from the terminal apparatus;
a second base station apparatus configured to perform wireless communication with the terminal apparatus in conformity with a second communication method using a non-directional beam pattern so as to assist wireless communication between the terminal apparatus and the first base station apparatus; and
a server apparatus,
wherein the terminal apparatus comprises:
a communicator configured to transmit terminal information including location information of the terminal apparatus itself to the server apparatus via the second base station apparatus,
wherein the server apparatus comprises:
a controller configured to generate communication control information based on the location information of the terminal apparatus; and
a communicator configured to transmit notification information including the communication control information to the first base station apparatus, and
wherein the first base station apparatus comprises:
a communication controller configured to control wireless communication between the first base station and the terminal apparatus based on the communication control information,
wherein the server apparatus determines whether or not the terminal apparatus is moving based on the location information of the terminal apparatus,
wherein, when a number of one or more terminal apparatuses is not more than a prescribed threshold value, the server apparatus transmits notification information to the terminal apparatus via the second base station apparatus, the notification information instructing the one or more terminal apparatuses to start a negotiation to acquire a communication condition for beam forming of the directional beam pattern, and
wherein the terminal apparatus starts the negotiation with the first base station apparatus based on the notification information.

3. A server apparatus comprising:
a communicator configured to perform wireless communication with first and second base station apparatuses, wherein the first base station apparatus is configured to perform wireless communication with a terminal apparatus in conformity with a first communication method using a directional beam pattern, and wherein the second base station apparatus is configured to perform wireless communication with the terminal apparatus in conformity with a second communication method using a non-directional beam pattern; and
a controller,
wherein the communicator is configured to receive terminal information transmitted from the terminal apparatus via the second base station apparatus,
wherein the controller is configured to generate communication control information based on location information of the terminal apparatus, the location information being included in the terminal information,
wherein the communicator is configured to transmit notification information including the communication control information to the first base station apparatus,
wherein the communication control information is used for exercising control on wireless communication between the first base station and the terminal apparatus,
wherein the controller determines whether or not the terminal apparatus is moving based on the location information of the terminal apparatus, and
wherein, when a ratio of moving terminal apparatuses among a plurality of terminal apparatuses is more than a prescribed threshold value, the controller generates the communication control information which causes the first base station apparatus to perform transmission to the plurality of terminal apparatuses using a directional beam simultaneously with rotating the directional beam so that the first base station is able to connect to the plurality of terminal apparatuses to acquire communication conditions.

4. A communication control method for controlling communication between a terminal apparatus and a base station apparatus, the base station apparatus including a first base station apparatus configured to perform wireless communication with the terminal apparatus in conformity with a first communication method using a directional beam pattern, wherein a second base station apparatus is configured to perform wireless communication with the terminal apparatus in conformity with a second communication method using a non-directional beam pattern, which is different from the first communication method, the communication control method comprising:

the terminal apparatus transmitting terminal information including location information of the terminal apparatus to a server apparatus via the second base station apparatus in conformity with the second communication method;

the server apparatus transmitting notification information including communication control information to the first base station apparatus, the communication control information being generated by the server apparatus based on the location information of the terminal apparatus; and the first base station apparatus controlling wireless communication between the first base station and the terminal apparatus based on the communication control information, wherein the controller determines whether or not the terminal apparatus is moving based on the location information of the terminal apparatus, and wherein, when a ratio of moving terminal apparatuses among a plurality of terminal apparatuses is more than a prescribed threshold value, the controller generates the communication control information which causes the first base station apparatus to perform transmission to the plurality of terminal apparatuses using a directional beam simultaneously with rotating the directional beam so that the first base station is able to connect to the plurality of terminal apparatuses to acquire communication conditions.

5. A server apparatus comprising:
a communicator configured to perform wireless communication with first and second base station apparatuses, wherein the first base station apparatus is configured to perform wireless communication with a terminal apparatus in conformity with a first communication method using a directional beam pattern, and wherein the second base station apparatus is configured to perform wireless communication with the terminal apparatus in conformity with a second communication method using a non-directional beam pattern; and
a controller,
wherein the communicator is configured to receive terminal information transmitted from the terminal apparatus via the second base station apparatus,
wherein the controller is configured to generate communication control information based on location information of the terminal apparatus, the location information being included in the terminal information,
wherein the communicator is configured to transmit notification information including the communication control information to the first base station apparatus,
wherein the communication control information is used for exercising control on wireless communication between the first base station and the terminal apparatus,
wherein the server apparatus determines whether or not the terminal apparatus is moving based on the location information of the terminal apparatus,
wherein, when a number of one or more terminal apparatuses is not more than a prescribed threshold value, the server apparatus transmits notification information to the terminal apparatus via the second base station apparatus, the notification information instructing the one or more terminal apparatuses to start a negotiation to acquire a communication condition for beam forming of the directional beam pattern, and
wherein the terminal apparatus starts the negotiation with the first base station apparatus based on the notification information.

6. A communication control method for controlling communication between a terminal apparatus and a base station apparatus, the base station apparatus including a first base station apparatus configured to perform wireless communication with the terminal apparatus in conformity with a first communication method using a directional beam pattern, wherein a second base station apparatus is configured to perform wireless communication with the terminal apparatus in conformity with a second communication method using a non-directional beam pattern, which is different from the first communication method, the communication control method comprising:

the terminal apparatus transmitting terminal information including location information of the terminal apparatus to a server apparatus via the second base station apparatus in conformity with the second communication method;

the server apparatus transmitting notification information including communication control information to the first base station apparatus, the communication control information being generated by the server apparatus based on the location information of the terminal apparatus; and the first base station apparatus controlling wireless communication between the first base station and the terminal apparatus based on the communication control information, wherein the server apparatus determines whether or not the terminal apparatus is moving based on the location information of the terminal apparatus, wherein, when a number of one or more terminal apparatuses is not more than a prescribed threshold value, the server apparatus transmits notification information to the terminal apparatus via the second base station apparatus, the notification information instructing the one or more terminal apparatuses to start a negotiation to acquire a communication condition for beam forming of the directional beam pattern, and wherein the terminal apparatus starts the negotiation with the first base station apparatus based on the notification information.

* * * * *